United States Patent [19]
Masreliez et al.

[11] Patent Number: 6,054,851
[45] Date of Patent: Apr. 25, 2000

[54] INDUCED CURRENT ABSOLUTE POSITION TRANSDUCER METHOD USING A CODE-TRACK-TYPE SCALE AND READ HEAD

[75] Inventors: Karl G. Masreliez, Bellevue; Nils Ingvar Andermo; Kim W. Atherton, both of Kirkland, all of Wash.

[73] Assignee: Mitutoyo Corporation, Kanagawa, Japan

[21] Appl. No.: 09/009,130

[22] Filed: Jan. 20, 1998

Related U.S. Application Data

[62] Division of application No. 08/790,494, Jan. 29, 1997, Pat. No. 5,841,274.

[51] Int. Cl.[7] .............................. G01B 7/02; G01B 7/14; G01D 5/20; H03M 1/22
[52] U.S. Cl. .............................. 324/207.17; 324/207.24; 336/45; 340/870.32; 341/15
[58] Field of Search .......................... 324/207.15–207.19, 324/207.24; 336/45, 130, 131, 136; 340/870.32, 870.33, 870.35, 870.36; 341/9–11, 13, 15, 16; 318/653

[56] References Cited

U.S. PATENT DOCUMENTS

| | | |
|---|---|---|
| 4,009,377 | 2/1977 | Elms . |
| 4,014,015 | 3/1977 | Gundlach ..................... 324/207.16 |
| 4,350,883 | 9/1982 | Lagarde . |
| 4,410,798 | 10/1983 | Breslow . |
| 4,628,298 | 12/1986 | Hafle et al. . |
| 4,697,144 | 9/1987 | Howbrook . |
| 4,725,777 | 2/1988 | Tousch . |
| 4,737,698 | 4/1988 | McMullin et al. . |
| 4,743,786 | 5/1988 | Ichikawa et al. . |
| 4,833,919 | 5/1989 | Saito et al. . |
| 4,853,604 | 8/1989 | McMullin et al. . |
| 4,879,508 | 11/1989 | Andermo . |
| 4,883,949 | 11/1989 | Kokubo et al. . |
| 4,893,077 | 1/1990 | Auchterlonie . |
| 4,914,437 | 4/1990 | Kibrick et al. . |
| 4,970,387 | 11/1990 | Kubo et al. . |
| 4,985,691 | 1/1991 | Pulyer et al. ..................... 336/130 |
| 5,012,238 | 4/1991 | Hayashi et al. . |
| 5,023,559 | 6/1991 | Andermo . |
| 5,027,526 | 7/1991 | Crane . |

(List continued on next page.)

FOREIGN PATENT DOCUMENTS

| | | |
|---|---|---|
| 2-064-125 | 6/1981 | United Kingdom . |
| 2 126 444 | 3/1984 | United Kingdom . |
| 2 220 314 | 1/1990 | United Kingdom . |
| WO 95/31696 | 11/1995 | WIPO . |

*Primary Examiner*—Gerard Strecker
*Attorney, Agent, or Firm*—Oliff & Berridge, PLC

[57] ABSTRACT

A high-accuracy inductive absolute position transducer system has two members movable relative to each other and includes a code track transducer and may include a fine track transducer. The code track transducers includes a code track transmitter winding and at least one set of code track receiver windings. Each set of code track receiver windings includes n balanced pairs. Each balanced pair extends along the measuring axis and includes a positive polarity winding and a negative polarity winding. A code track has a plurality of flux modulator zones distributed along the measuring axis. Flux modulators are formed in at least some of the flux modulator zones. A signal generating and processing circuit is connected to the transmitter winding and each balanced pair. The code track transmitter winding and each balanced pair form an inductive coupling. The flux modulators modulate the inductive coupling between each balanced pair and the code track transmitter winding based on the relative position between the read head member and the scale member. The flux modulators are distributed along the measuring axis such that each pair of adjacent flux modulator zones forms one of a set of output states in an overlying balanced pair. The pairs of adjacent flux modulator zones form a series of code elements extending along the measuring axis such that each set of m adjacent code elements forms a unique codeword. Each unique codeword defines an absolute position of the read head member relative to the scale member to a first resolution.

15 Claims, 47 Drawing Sheets

U.S. PATENT DOCUMENTS

| | | |
|---|---|---|
| 5,049,879 | 9/1991 | Symonds . |
| 5,117,105 | 5/1992 | Nagase et al. . |
| 5,173,693 | 12/1992 | Fry . |
| 5,233,294 | 8/1993 | Dreoni . |
| 5,279,044 | 1/1994 | Bremer . |
| 5,293,031 | 3/1994 | Goto et al. . |
| 5,438,330 | 8/1995 | Yamazaki et al. . |
| 5,444,613 | 8/1995 | Tani et al. . |
| 5,739,775 | 4/1998 | Brandestini . |

FIG. 26

| CODE | POS# | CODE | POS# | CODE | POS# | CODE | POS# | CODE | POS# | CODE | POS# |
|---|---|---|---|---|---|---|---|---|---|---|---|
| 0 | 0 | 43 | 141 | 87 | 209 | 130 | 20 | 174 | 210 | 217 | 188 |
| 1 | 1 | 44 | 55 | 88 | 56 | 131 | 36 | 175 | 224 | 218 | 220 |
| 2 | 2 | 45 | 149 | 89 | 144 | 132 | 44 | 176 | 57 | 219 | 231 |
| 3 | 13 | 46 | 94 | 90 | 150 | 133 | 52 | 177 | 113 | 220 | 179 |
| 4 | 3 | 47 | 157 | 91 | 217 | 134 | 60 | 178 | 145 | 221 | 239 |
| 5 | 21 | 48 | 17 | 92 | 95 | 135 | 68 | 179 | 189 | 222 | 234 |
| 6 | 14 | 49 | 81 | 93 | 211 | 136 | 8 | 180 | 151 | 223 | 243 |
| 7 | 37 | 50 | 102 | 94 | 158 | 137 | 76 | 181 | 221 | 224 | 251 |
| 8 | 4 | 51 | 165 | 95 | 225 | 138 | 84 | 182 | 218 | 225 | 42 |
| 9 | 45 | 52 | 63 | 96 | 18 | 139 | 92 | 183 | 232 | 226 | 74 |
| 10 | 22 | 53 | 169 | 97 | 58 | 140 | 100 | 184 | 96 | 227 | 98 |
| 11 | 53 | 54 | 110 | 98 | 82 | 141 | 108 | 185 | 180 | 228 | 130 |
| 12 | 15 | 55 | 177 | 99 | 114 | 142 | 116 | 186 | 212 | 229 | 138 |
| 13 | 61 | 56 | 40 | 100 | 103 | 143 | 124 | 187 | 240 | 230 | 162 |
| 14 | 38 | 57 | 136 | 101 | 146 | 144 | 49 | 188 | 159 | 231 | 182 |
| 15 | 69 | 58 | 118 | 102 | 166 | 145 | 105 | 189 | 235 | 232 | 120 |
| 16 | 9 | 59 | 185 | 103 | 190 | 146 | 28 | 190 | 226 | 233 | 196 |
| 17 | 5 | 60 | 71 | 104 | 64 | 147 | 132 | 191 | 244 | 234 | 206 |
| 18 | 46 | 61 | 193 | 105 | 152 | 148 | 31 | 192 | 252 | 235 | 214 |
| 19 | 77 | 62 | 126 | 106 | 170 | 149 | 140 | 193 | 19 | 236 | 187 |
| 20 | 23 | 63 | 201 | 107 | 222 | 150 | 148 | 194 | 43 | 237 | 230 |
| 21 | 85 | 64 | 11 | 108 | 111 | 151 | 156 | 195 | 59 | 238 | 238 |
| 22 | 54 | 65 | 35 | 109 | 219 | 152 | 80 | 196 | 75 | 239 | 242 |
| 23 | 93 | 66 | 51 | 110 | 178 | 153 | 164 | 197 | 83 | 240 | 250 |
| 24 | 16 | 67 | 67 | 111 | 233 | 154 | 168 | 198 | 99 | 241 | 73 |
| 25 | 101 | 68 | 7 | 112 | 41 | 155 | 176 | 199 | 115 | 242 | 129 |
| 26 | 62 | 69 | 91 | 113 | 97 | 156 | 135 | 200 | 104 | 243 | 161 |
| 27 | 109 | 70 | 107 | 114 | 137 | 157 | 184 | 201 | 131 | 244 | 195 |
| 28 | 39 | 71 | 123 | 115 | 181 | 158 | 192 | 202 | 139 | 245 | 205 |
| 29 | 117 | 72 | 48 | 116 | 119 | 159 | 200 | 203 | 147 | 246 | 229 |
| 30 | 70 | 73 | 27 | 117 | 213 | 160 | 34 | 204 | 163 | 247 | 237 |
| 31 | 125 | 74 | 30 | 118 | 186 | 161 | 66 | 205 | 167 | 248 | 249 |
| 32 | 10 | 75 | 155 | 119 | 241 | 162 | 90 | 206 | 183 | 249 | 128 |
| 33 | 50 | 76 | 79 | 120 | 72 | 163 | 122 | 207 | 191 | 250 | 204 |
| 34 | 6 | 77 | 175 | 121 | 160 | 164 | 26 | 208 | 65 | 251 | 228 |
| 35 | 106 | 78 | 134 | 122 | 194 | 165 | 154 | 209 | 121 | 252 | 248 |
| 36 | 47 | 79 | 199 | 123 | 236 | 166 | 174 | 210 | 153 | 253 | 203 |
| 37 | 29 | 80 | 33 | 124 | 127 | 167 | 198 | 211 | 197 | 254 | 247 |
| 38 | 78 | 81 | 89 | 125 | 227 | 168 | 88 | 212 | 171 | 255 | 246 |
| 39 | 133 | 82 | 25 | 126 | 202 | 169 | 172 | 213 | 207 |  |  |
| 40 | 32 | 83 | 173 | 127 | 245 | 171 | 208 | 214 | 215 |  |  |
| 41 | 24 | 84 | 87 | 128 | 253 | 172 | 143 | 215 | 223 |  |  |
| 42 | 86 | 86 | 142 | 129 | 12 | 173 | 216 | 216 | 112 |  |  |

FIG. 27

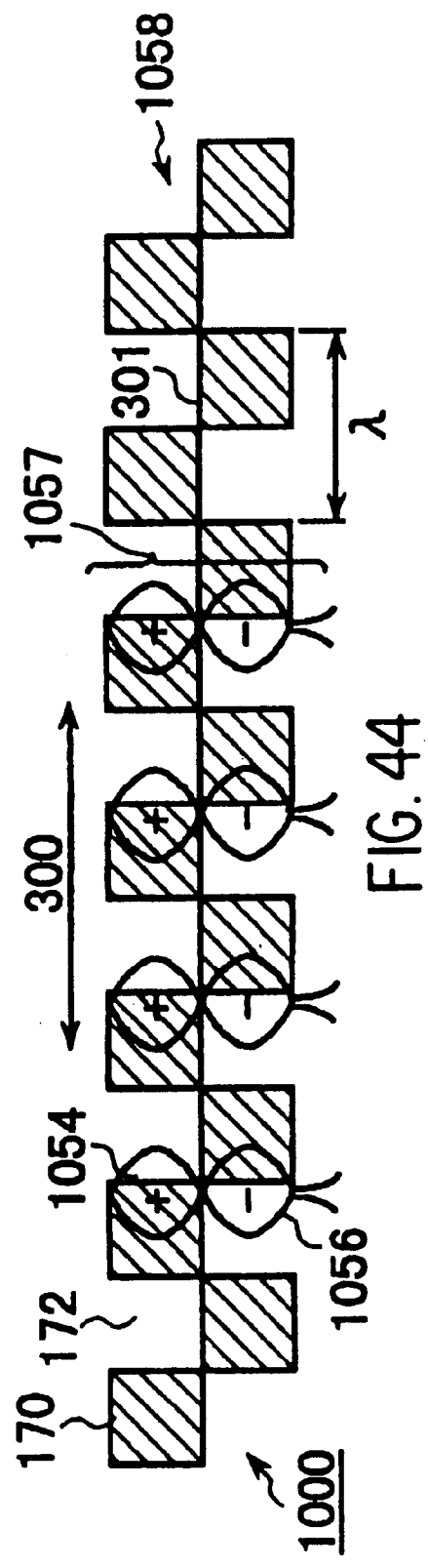
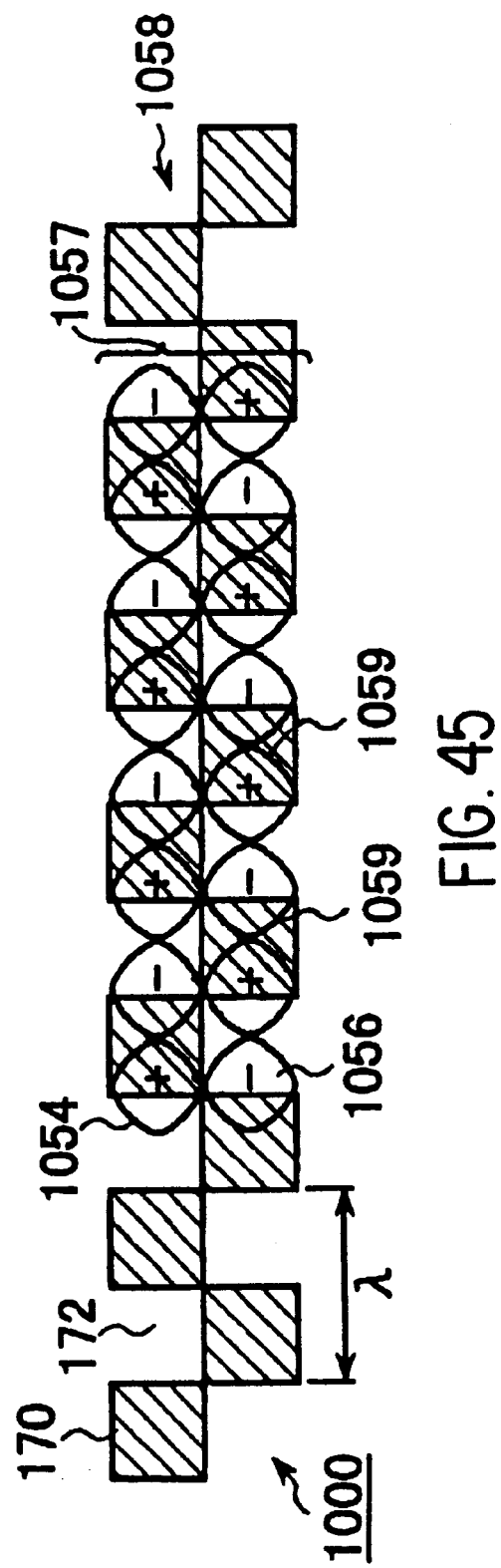

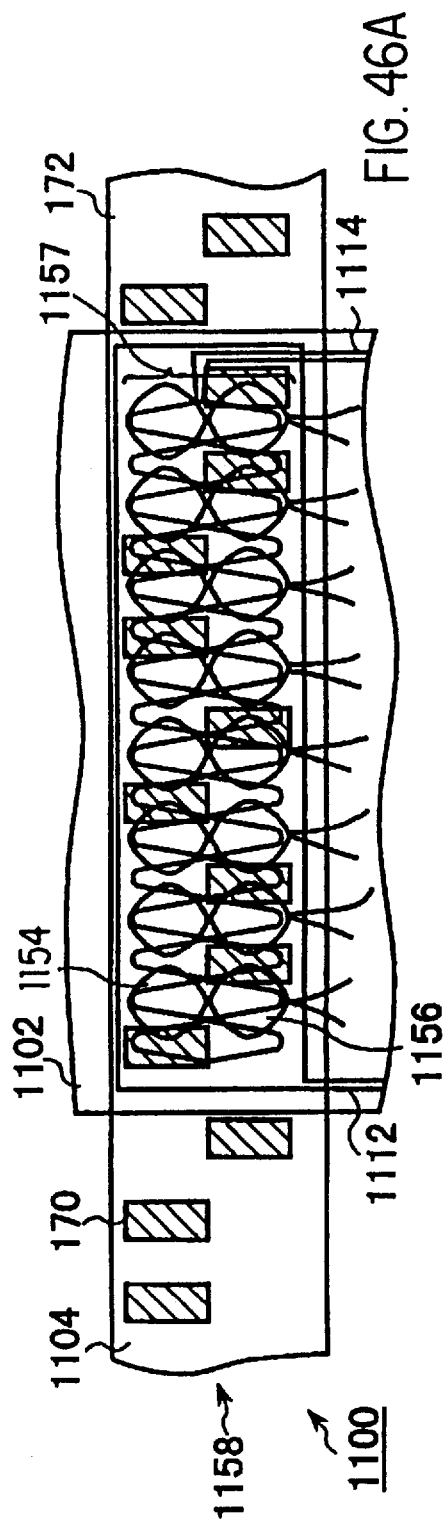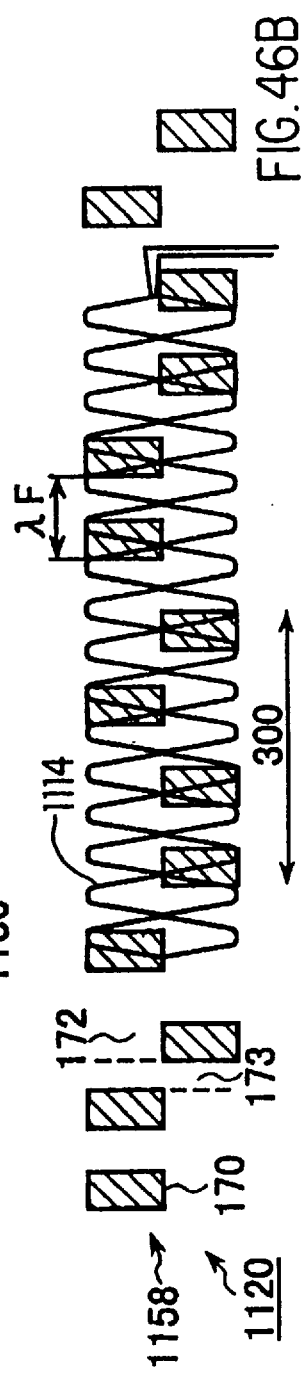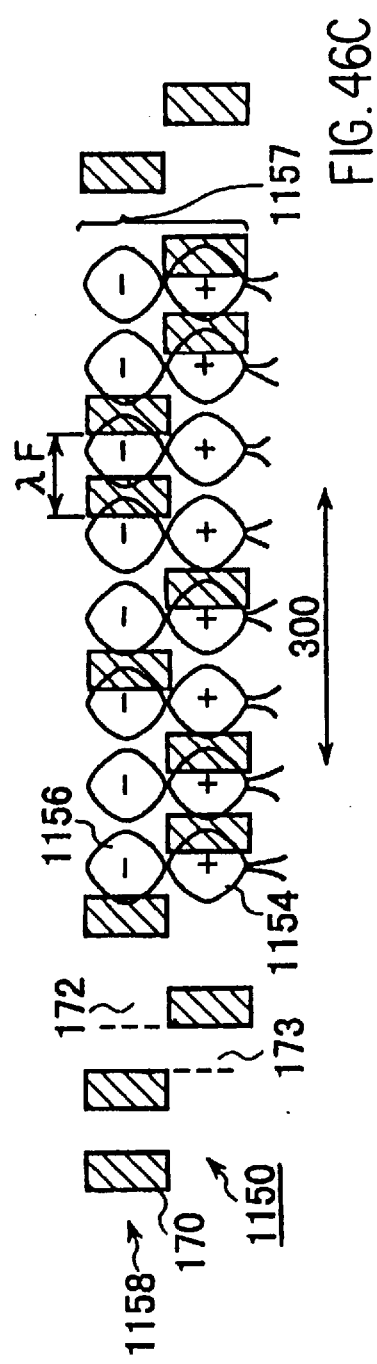

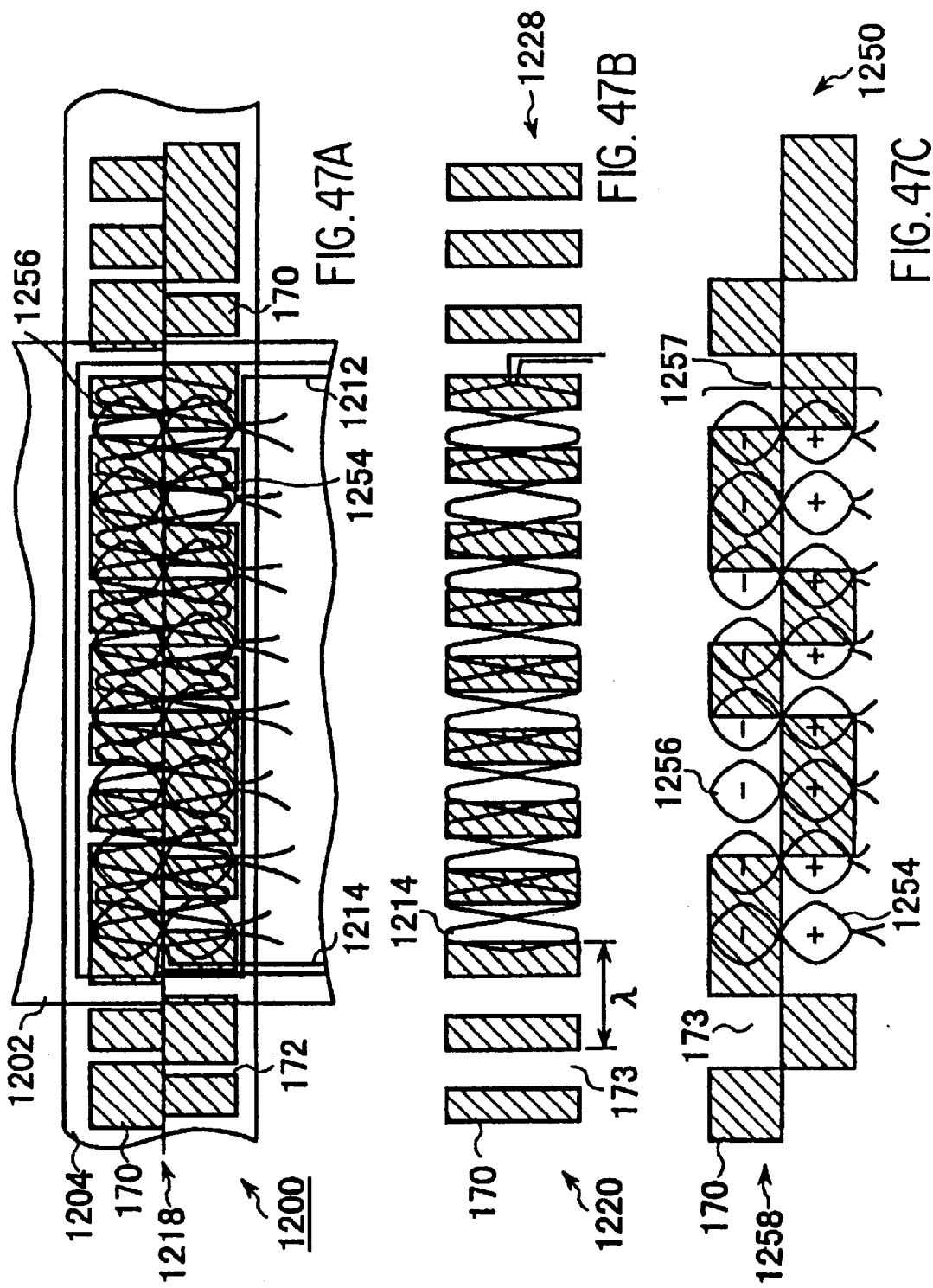

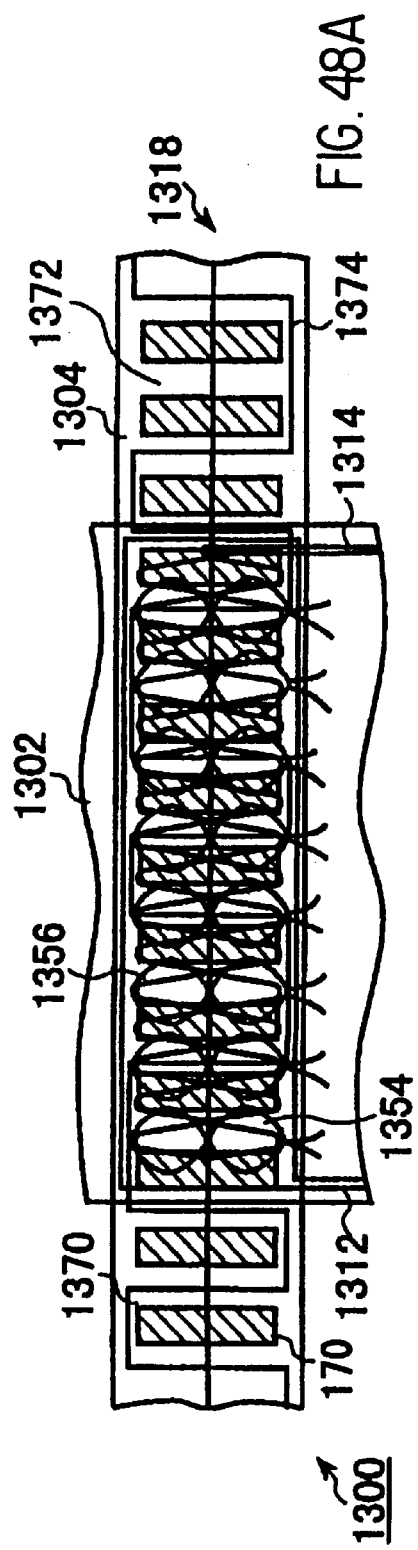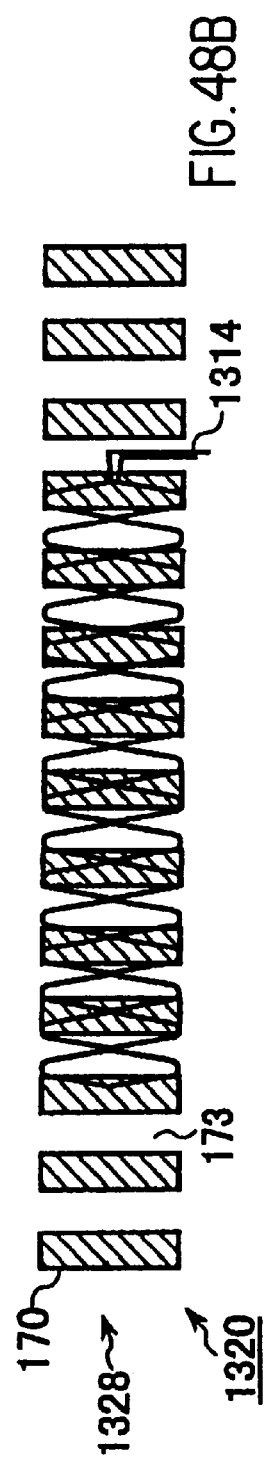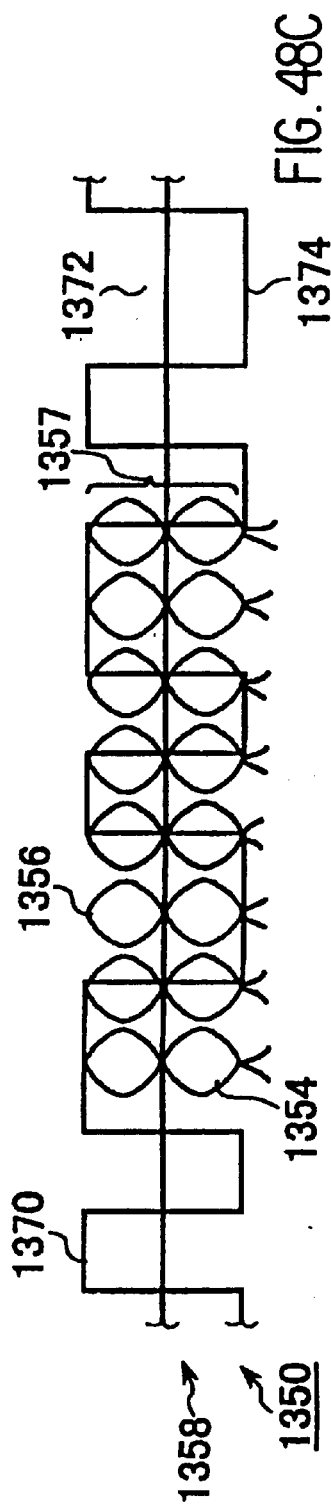

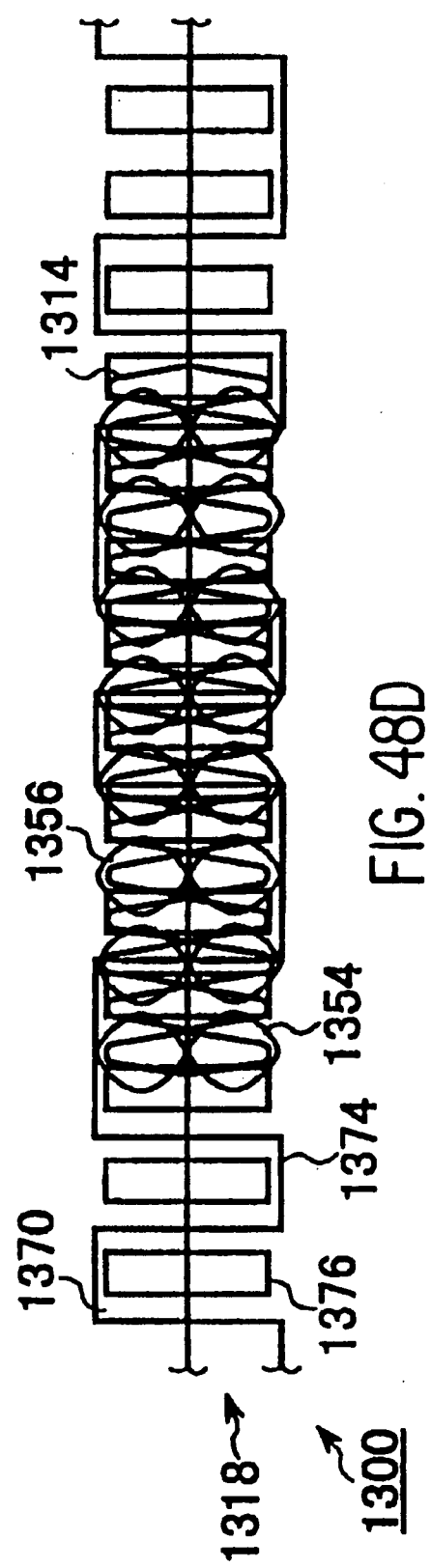

INDUCED CURRENT ABSOLUTE POSITION TRANSDUCER METHOD USING A CODE-TRACK-TYPE SCALE AND READ HEAD

This is a divisional application of U.S. application Ser. No. 08/790,494, filed Jan. 29, 1997, now U.S. Pat. No. 5,841,274.

BACKGROUND OF THE INVENTION

1. Field of the Invention

This invention relates to an absolute position electronic transducer, and, more particularly, to such a transducer using a plurality of inductively coupled transducer windings.

2. Description of Related Art

Various movement or position transducing systems are currently available. Most of these transducers are able to sense linear, rotary or angular movement. Optical transducers usually have a scanning unit and a glass scale having a grating applied to the glass scale. The scanning unit generally includes a light source, a condenser lens for collimating light from the light source, a scanning reticle with index gratings, and a photodetector. The scale is moved relative to the scanning unit. The lines of the scale coincide alternately with lines or spaces in the index grating to produce periodic light intensity fluctuations. The periodic intensity fluctuations are converted by the photodetector into electrical signals, which are then processed to determine position. Optical transducers can provide position measurements with very high accuracy, particularly if laser light sources are used.

Currently, to improve efficiency, most manufacturers prefer using hand-held encoders and other measurement tools on the workshop floor, rather than in contaminant-free inspection rooms. Optical transducers, however, are sensitive to contamination and are therefore impractical to use openly in most manufacturing or shop environments. Therefore, these optical transducers use expensive and sometimes unreliable environmental seals or other methods of encapsulating the optical transducer to keep dust and oils from reaching the transducer. Furthermore, the light source often requires a fairly large current. Thus, battery-powered measuring tools, for example, hand-held encoders, generally cannot use optical transducers.

Capacitive transducers draw very little current. Therefore, they are well suited for battery-powered measurement tools. Capacitive transducers use a plurality of capacitors formed by parallel plates. The transmitter plate and the receiver plates are mounted on a first member. Appropriate voltage generating and read circuits are coupled to these plates, respectively. Each of these plates form one plate of a capacitor. The other plate for each capacitor is provided on a relatively moveable member or scale, as one of many spaced-apart plates. As the scale is moved relative to the first member, the transmitter and receiver plates capacitively couple to various ones of the plates on the scale. The read circuitry detects changes in voltage in the receiver plate as the plates in the scale move relative to the transmitter and receiver plates.

Capacitive transducers, however, require a small gap between the plates on the stationary member and the plates on the scale. This small gap requires tight tolerances, resulting in increased manufacturing costs. Additionally, capacitive transducers are sensitive to contamination, particularly dielectric fluids, such as oils, and conductive fluids, such as water or coolants. Therefore, as with optical transducers, capacitive transducers require expensive and unreliable seals in many environments.

Magnetic transducers are insensitive to contamination caused by oil, water and other fluids. Magnetic transducers (e.g., Sony Magnescale encoders™) employ a read head detecting magnetic fields and a ferromagnetic scale selectively magnetized with periodic, magnetic patterns. The read head senses magnetic field changes in the magnetic scale pattern as the scale is moved to determine position. However, magnetic transducers are affected by small particles, particularly ferromagnetic particles, attracted to the magnetized scale. Consequently, magnetic transducers, as with capacitive and optical transducers, must be sealed, encapsulated or otherwise protected to prohibit dust from diminishing their effectiveness.

Inductive transducers are insensitive to cutting oil, water or other fluids and are insensitive to dust, ferromagnetic particles, and so forth. Inductive transducers (e.g., INDUCTOSYN® type transducers) employ multiple windings on one member, such as a series of parallel hairpin turns repeated on a printed circuit board. The multiple windings transmit a varying magnetic field that is received by similar windings on another member. An alternating current flowing in the windings of the first member generates the varying magnetic field. The signal received by the second member varies periodically with the relative position between the two members. Therefore, the appropriate circuits are able to determine the relative position between the two members. Both members, however, are active. Therefore, both members are electrically coupled to their respective circuits.

Electrically coupling both members increases manufacturing and installation costs. Additionally, because inductive transducers require both members to be electrically coupled, inductive transducers are difficult to incorporate into hand-held devices, such as calipers. Furthermore, in the case of rotary encoders, the moving member is connected via slip rings, which increase the cost and decrease the reliability of the encoder.

Several conventional encoders attempt to provide a motion or position transducer insensitive to contaminants, yet more inexpensively manufactured than the optical, capacitive, magnetic or inductive transducers described above. U.S. Pat. No. 4,697,144 to Howbrook, U.S. Pat. No. 5,233,294 to Dreoni, and U.S. Pat. No. 4,743,786 to Ichikawa et al., and British Patent Application 2,064,125 to Thatcher show position detection devices that sense position between an inactive or unenergized member and an energized member. These transducers eliminate electrical coupling between the two moving members. However, they generally fail to provide a sufficiently refined transducer matching the high accuracy provided by the conventional transducers, such as optical or inductive encoders. They also have other drawbacks, such as limited measuring range, expensive and comparatively bulky construction, and/or inherently weak signal strength.

To provide sufficient signal strength, the inactive member is preferably ferromagnetic to produce a strong magnetic field. Alternately, the inactive member moves within a bulky structure that concentrates the magnetic field generated by the active member. Furthermore, these transducers cannot be used in a wide variety of applications, such as in low-power hand-held measurement tools, or linear, rotary, angular and other types of position transducing applications that require accuracies of at worst on the order of 10 μm.

U.S. Pat. No. 4,893,077 to Auchterlonie describes an absolute position sensor employing several linear tracks of inductive transducers. Each track of this sensor has a slightly different wavelength or frequency. The circuits in the sensor analyze the phase difference between the tracks to determine the absolute position of the read head. Similar known systems employ capacitive transducers having multiple tracks of capacitive elements, such as U.S. Pat. Nos. 4,879,508 and 5,022,599 to Andermo. The absolute position sensors of Auchterlonie and Andermo, however, suffer from the traditional problems of inductive and capacitive transducers described above.

Howbrook's transducer employs several pitches of coils (each pitch representing 360° of phase change) to similarly provide an absolute position using an inactive member. This transducer, however, has a limited range within which to determine the absolute position of the inactive member. Additionally, this transducer fails to provide sufficient accuracy for most applications.

Several products by HEIDENHAHN employ optical transducers having a photodetector and a scale. The scale has optical markers on it for identifying a coarse absolute position relative to the scale. Some HEIDENHAHN products, however, require positioning and identifying the markers with great accuracy. Positioning such markers with great accuracy requires costly manufacturing techniques. In any case, these optical transducers suffer from the same limitations of contamination sensitivity and power consumption described above.

U.S. Pat. No. 5,027,526 to Crane describes an optical transducer that reads a bar code pattern printed on a coiled tape. This bar code pattern is the standard interleaved 2 of 5 bar code symbol that encodes several numbers between start and stop bar code patterns. The numbers, in turn, correspond to a coarse absolute position of the tape. Circuits read the bar code symbols and converts them to numbers representing the absolute position of the tape. Clockings based on the position of a drum that coils the tape determine a fine position measurement.

This absolute transducer, however, suffers from the traditional problems of optical transducers discussed above. Furthermore, this absolute transducer is not a true absolute transducer at every position, because the transducer requires a scanning motion through a range as long as the bar code in order to derive or update an absolute position measurement. This renders it unusable for many applications.

There is thus a need for an absolute position transducer system that: 1) is insensitive to contaminants such as oil and ferromagnetic particles; 2) is suitable for a wide variety of applications, including long measuring range applications and low-power applications; 3) is accurate; 4) is relatively inexpensive to manufacture compared to the conventional transducers described above; and 5) provides an absolute position output signal. A transducing system providing at least these five benefits has until now been unavailable.

SUMMARY OF THE INVENTION

This invention thus provides an absolute position transducer that is insensitive to contaminants.

This invention further provides an absolute position transducer that is suitable for a wide variety of applications, including battery-powered and/or rotary transducers.

This invention also provides an absolute position transducer that is relatively inexpensive to manufacture.

This invention additionally provides an absolute position transducer that is accurate.

The absolute position transducer of this invention is an inductive transducer system for high accuracy applications such as linear or rotary encoders. This high accuracy is on the order of 10 $\mu$m or better resolution and accuracy for displacement at the read head.

The absolute position transducer of this invention uses two members moveable relative to each other. An active first member induces eddy currents in a passive second member. No external power or electrical wires are connected to the passive second member. The first member contains at least one active transmitter for generating a magnetic field and at least two receivers for receiving the generated magnetic field. In a first embodiment, the two receivers have similar, but different, wavelengths. Thus, the phase difference between the two wavelengths at a given position defines a coarse wavelength much longer than either of the individual wavelengths.

The passive second member includes at least two sets of passive flux modulating elements that modulate the received field depending on their position relative to the two receivers. An electronic circuit coupled to the transmitter and the receivers compares the two outputs of the receivers, evaluates the absolute position between the two members, and exhibits the position on a display. The inductive absolute position transducer of this invention determines the absolute position between the two members.

The inductive absolute position transducer of this invention is readily and inexpensively manufactured by using, for example, printed circuit board technology. The gap between the first and second members can be easily fabricated and vary considerably without significantly reducing accuracy. This decreases the manufacturing tolerances and makes the inductive absolute position transducer even more inexpensive to manufacture.

Furthermore, the inductive absolute position transducer of this invention is insensitive to contamination by particles, including ferromagnetic particles, and oil, water, or other fluids. As a result, the inductive absolute position transducer is manufactured without expensive environmental seals, while remaining usable in most shop environments. A pulse-driven drive circuit of the inductive absolute position transducer of this invention allows the transducer to consume little power. Thus, it is readily incorporated into hand-held, battery-powered measurement tools.

More generally, the inductive absolute position transducer of this invention has a magnetic field source that preferably includes an alternating current source. The alternating current source is coupled to at least one conductive path. The at least one conductive path substantially encloses a flux region. The magnetic field source produces changing magnetic flux in the flux region. First and second sensing conductors positioned within the flux region each have a prescribed periodic pattern of flux receiving areas and are arranged along a measuring axis. Each sensing conductor generates an EMF across at least one output in response to the changing magnetic flux. One period of each of the prescribed periodic patterns in the first and second sensing conductors define first and second wavelengths, respectively.

The periodic pattern in each sensing conductor preferably has a plurality of first and second alternating loops. Each first loop produces a first EMF of a first polarity in response to the changing magnetic flux. Similarly, each second loop produces a second EMF of a second polarity in response to the changing magnetic flux. A first loop and an adjacent second loop, in each of the first and second sensing conductors, define first and second wavelengths, respectively. The first and second wavelengths are similar, but unequal. Thus, the relationship between the first and second wavelengths produces a third, coarse, wavelength much longer than either of the first or second wavelengths.

A support member has first and second sets of flux modulators of a prescribed shape regularly positioned at first and second predetermined intervals along the support member. The flux modulators are positionable within the magnetic flux. The flux modulators can be either flux disrupters or flux enhancers. The flux disrupters are formed of a conductive material. The magnetic flux creates eddy currents within the flux disrupters positioned within the flux region. The eddy currents disrupt the magnetic flux proximate to the flux disrupters. The first and second sets of flux disrupters are positioned at the first and second wavelengths of the first and second sensing conductors, respectively. The wavelength of the flux disrupter is defined by a flux disrupter and an adjacent space.

The first and second sets of flux disrupters are movable relative to the first and second sensing conductors from a first position to a second position. In the first position the first loops of the first and second sensing conductors are proximate to at least one flux disrupter in the first and second sets of flux disrupters. Thus, the flux disrupters generate a first altered EMF in each sensing conductor. At the second position, the second loops of the first and second sensing conductors are proximate to at least one flux disrupter in the first and second sets of disrupters. Thus, the flux disrupters generate a second altered EMF in each sensing conductor.

An analyzing circuit is coupled to the first and second sensing conductors. The analyzing circuit determines the absolute position of the first and second sensing conductors relative to the first and second sets of disrupters. The analyzing circuits determine the absolute position based on the first and second EMFs generated across the outputs of each of the first and second sensing conductors.

A second embodiment of the inductive absolute position transducer of this invention has a member with at least one path of conductive material that produces a first changing magnetic flux. A set of code sensing conductors are formed on this member and are arranged within the magnetic flux to produce an EMF at least one pair of output terminals in response to the changing magnetic flux.

A support member includes a set of flux disrupters and spaces, forming binary code elements. That is, each of the disrupters and the spaces between the disrupters defines one of a series of binary code bits. The binary code bits can be grouped into binary codewords. Each binary codeword defines a certain absolute position along the measuring axis. The set of flux disrupters are movable within the magnetic flux. The changing magnetic flux creates eddy currents in the flux disrupters that disrupt the magnetic flux proximate to the flux disrupters.

The set of code sensing conductors and the code elements are movable relative to each other along the measuring axis from a first position to a second position. At the first position, the set of code sensing conductors is proximate to a first group of the flux disrupters and the spaces. This first group generates a first set of altered EMFs in the code sensing conductors. The first set of altered EMFs defines a first codeword.

At the second position, the set of code sensing conductors is proximate to a second group of the flux disrupters and the spaces. This second group generates a second set of altered EMFs in the code sensing conductors. The second set of altered EMFs defines a second codeword. The first and second codewords define first and second absolute positions of the sensing conductors relative to the set of flux disrupters and the spaces comprising the code elements. The accuracy of this absolute position is related to the pitch of the code elements.

The code sensing conductors preferably include at least one sensor element formed by a conductive path having at least a first code loop and a second code loop producing first and second opposite polarity signal components, respectively, in response to the changing magnetic flux. Each sensor element is capable of sensing at least one flux disrupter in the operational set of code elements when the flux disrupter is proximate to the first or second code loop. Each sensor element of the set of code sensing conductors that is proximate to a flux disrupter receives an altered flux corresponding to the relative position of the code elements. This produces a corresponding altered EMF signal, forming at least a part of the corresponding first or second codewords.

This invention solves problems inherent in the conventional transducers by providing a high accuracy, absolute position transducer that is: 1) insensitive to contaminants such as oil and particles; 2) is suitable for a wide variety of applications; 3) provides high accuracy over an extended range; and 4) relatively inexpensive to manufacture compared to the conventional transducers.

These and other features and advantages of this invention are described in or apparent from the following detailed description of the preferred embodiments.

BRIEF DESCRIPTION OF THE DRAWINGS

The preferred embodiments of this invention will be described in detail, with reference to the following figures, wherein:

FIG. 26 is a diagram showing an 8-bit code pattern for use by the second, third, and fourth preferred embodiments of the inductive absolute position transducer of this invention;

FIG. 27 is a lookup table corresponding to the 8 bit code pattern of FIG. 26;

FIGS. 44 and 45 show a tenth preferred embodiment of the inductive absolute position transducer of this invention using another embodiment of the incremental fine wavelength transducer;

FIGS. 46A–46C show an eleventh preferred embodiment of the inductive absolute position transducer of this invention, wherein the fine wavelength transducer and the binary scale transducer are superimposed over each other;

FIGS. 47A–47C show a twelfth preferred embodiment of the inductive absolute position transducer of this invention, also have the fine wavelengths transducer and the binary scale transducer superimposed over each other;

FIGS. 48A–48D show a thirteenth preferred embodiment of the inductive absolute position transducer of this invention, also having the fine wavelength transducer and the binary scale transducer superimposed over each other, and having the flux modulators of at least the binary code scale formed by a winding;

DETAILED DESCRIPTION OF THE PREFERRED EMBODIMENTS

For simplicity and clarification, the operating principles, design factors, and layout of the transducer windings of this invention are explained with reference to an incremental-measuring type transducer employed in a caliper shown in FIGS. 1–3. The basic explanation of the operation of the incremental-type transducer winding is applicable for the understanding and design of the constituent windings employed in the absolute transducers of this invention.

Figure 1:
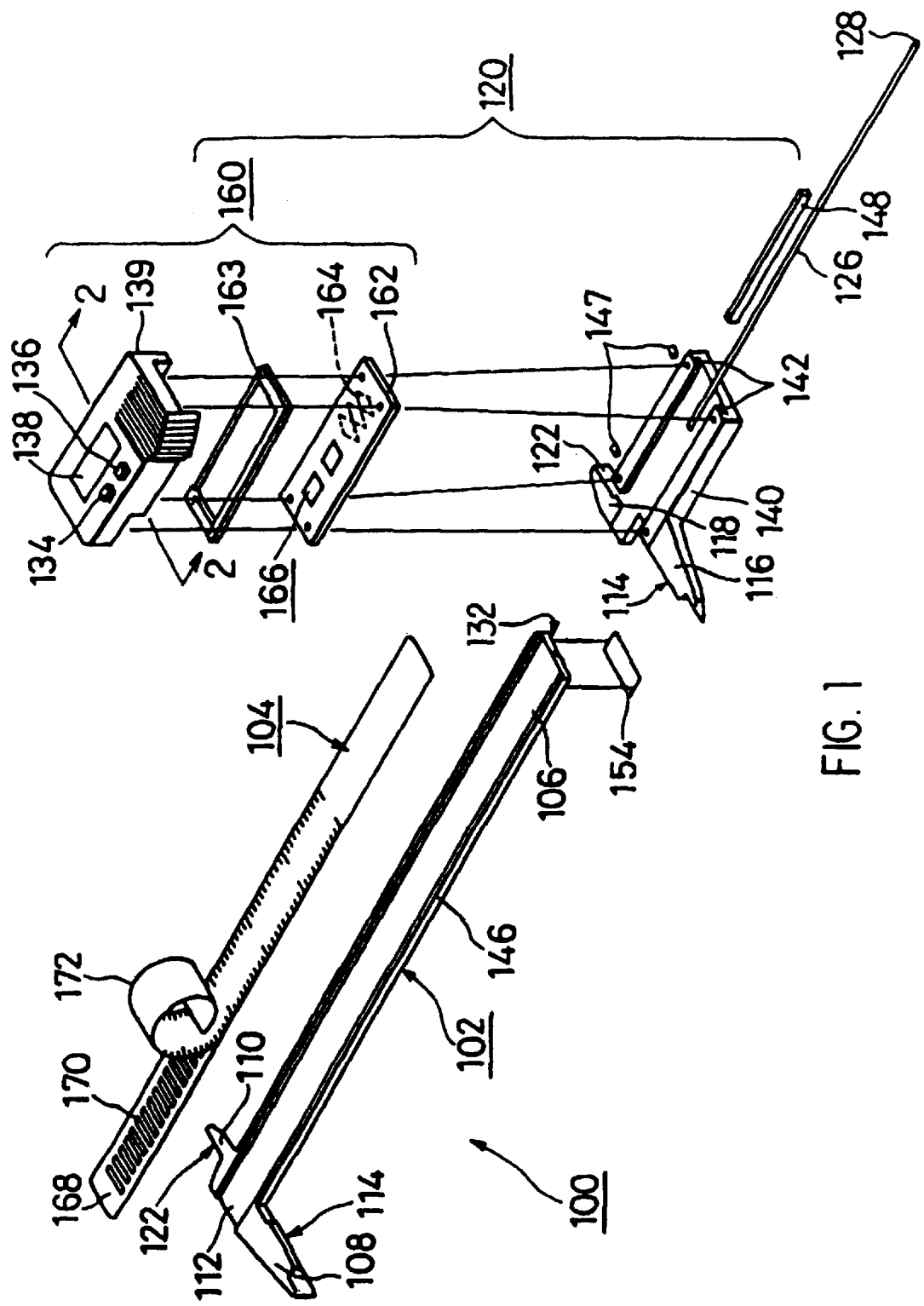
FIG. 1 is an exploded isometric view of an incremental-measuring type electronic caliper employing the basic sensing principle of this invention, using disrupter-type modulators.

As shown in FIG. 1, an inductive caliper 100 includes an elongated beam 102. The elongated beam 102 is a rigid or semi-rigid bar having a generally rectangular cross section. A groove 106 is formed in an upper surface of the elongated beam 102. An elongated measuring scale 104 is rigidly bonded to the elongated beam 102 in the groove 106. The groove 106 is formed in the beam 102 at a depth about equal to the thickness of the scale 104. Thus, the top surface of the scale 104 is very nearly coplanar with the top edges of beam 102.

A pair of laterally projecting, fixed jaws 108 and 110 are integrally formed near a first end 112 of the beam 102. A corresponding pair of laterally projecting movable jaws 116 and 118 are formed on a slider assembly 120. The outside dimensions of an object are measured by placing the object between a pair of engagement surfaces 114 on the jaws 108 and 116. Similarly, the inside dimensions of an object are measured by placing the jaws 110 and 118 within an object. The engagement surfaces 122 of the jaws 110 and 118 are positioned to contact the surfaces on the object to be measured.

The engagement surfaces 122 and 114 are positioned so that when the engagement surfaces 114 of the jaws 108 and 116 are contacting each other, the engagement surfaces 122 of the jaws 110 and 118 are aligned with each other. In this position, the zero position (not shown), both the outside and inside dimensions measured by the caliper 100 should be zero.

The caliper 100 also includes a depth bar 126 attached to the slider assembly 120. The depth bar 126 projects longitudinally from the beam 102 and terminates at an engagement end 128. The length of the depth bar 126 is such that the engagement end 128 is flush with a second end 132 of the beam 102 when the caliper 100 is at the zero position. By resting the second end 132 of the beam 102 on a surface in which a hole is formed and extending the depth bar 126 into the hole until the end 128 touches the bottom of the hole, the caliper 100 is able to measure the depth of the hole.

Whether a measurement is made using the outside measuring jaws 108 and 116, the inside measuring jaws 110 and 118, or the depth bar 126, the measured dimension is displayed on a conventional digital display 138, which is mounted in a cover 139 of the caliper 100. A pair of push button switches 134 and 136 are also mounted in the cover 139. The switch 134 turns on and off a signal processing and display electronic circuit 166 of the slider assembly 120. The switch 136 is used to reset the display 138 to zero.

As shown in FIG. 1, the slider assembly 120 includes a base 140 with a guiding edge 142. The guiding edge 142 contacts a side edge 146 of the elongated beam 102 when the slider assembly 120 straddles the elongated beam 102. This ensures accurate operation of the caliper 100. A pair of screws 147 biases a resilient pressure bar 148 against a mating edge of the beam 102 to eliminate free play between the slider assembly 120 and the elongated beam 102.

The depth bar 126 is inserted into a depth bar groove 152 formed on an underside of the elongated beam 102. The depth bar groove 152 extends along the underside of the elongated beam 102 to provide clearance for the depth bar 126. The depth bar 126 is held in the depth bar groove 152 by an end stop 154. The end stop 154 is attached to the underside of the beam 102 at the second end 132. The end stop 154 also prevents the slider assembly 120 from inadvertently disengaging from the elongated beam 102 at the second end 132 during operation.

The slider assembly 120 also includes a pickoff assembly 160 mounted on the base 140 above the elongated beam 102. Thus, the base 140 and pickoff assembly 160 move as a unit. The pickoff assembly 160 includes a substrate 162, such as a conventional printed circuit board. The substrate 162 bears an inductive read head 164 on its lower surface. A signal processing and display electronic circuit 166 is mounted on an upper surface of the substrate 162. A resilient seal 163 is compressed between the cover 139 and the substrate 162 to prevent contamination of the signal processing and display electronic circuit 166.

Figure 2:
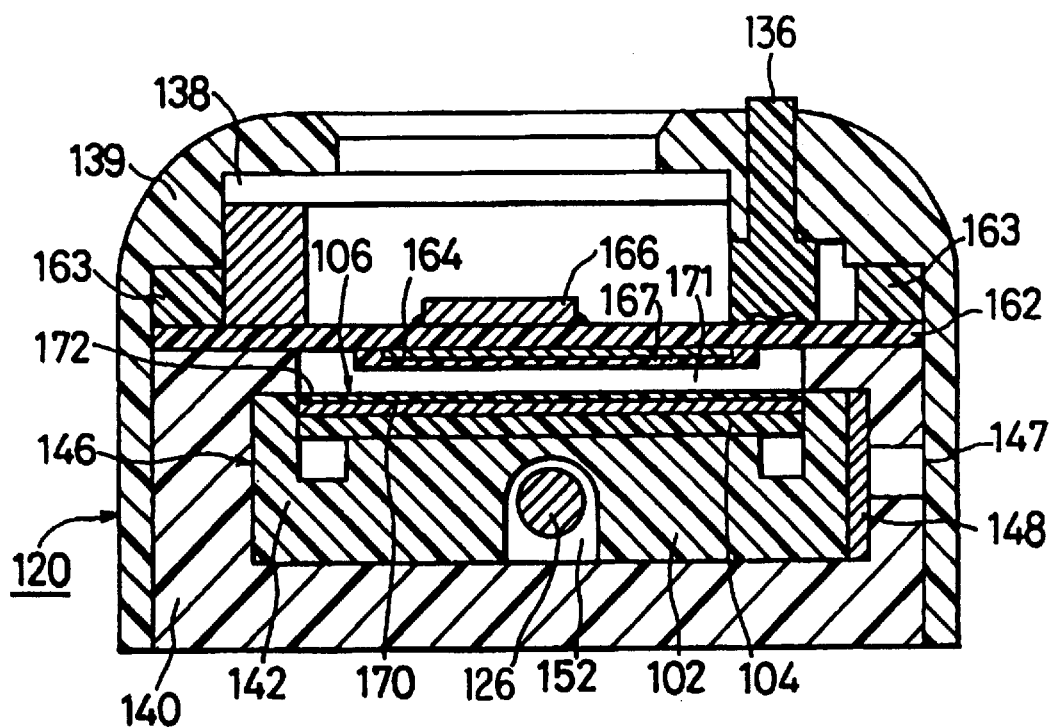
FIG. 2 is a cross-sectional view of the electronic caliper taken along the line 2—2 of FIG. 1.

As shown in FIG. 2, the read head 164 is covered by a thin, durable, insulative coating 167, which is preferably approximately 50 μm thick.

The scale 104 includes an elongated printed circuit board 168 as its primary transducing element. As shown in FIG. 1, a set of disrupters 170 are spaced apart along the printed circuit board 168 in a periodic pattern. The disrupters 170 are preferably formed of copper. The disrupters 170 are preferably formed according to conventional printed circuit board manufacturing techniques, although many other methods of fabrication may be used. As shown in FIG. 2, a protective insulating layer 172 (preferably being at most 100 μm thick) covers the disrupters 170. The protective layer 172 can include printed markings, as shown in FIG. 1.

The slider assembly 120 carries the read head 164 so that it is slightly separated from the beam 102 by an air gap 171 formed between the insulative coatings 167 and 172. The air gap 171 is preferably on the order of 0.5 mm. Together, the read head 164 and the disrupters 170 form an inductive transducer. The inductive transducer and associated circuitry are each preferably of any suitable type disclosed in U.S. patent application Ser. No. 08/441,769, which is incorporated herein by reference. The caliper 100 can use other low power electronic circuit techniques, such as those disclosed in U.S. patent application Ser. No. 08/834,434, filed Apr. 16, 1997.

Figure 3:
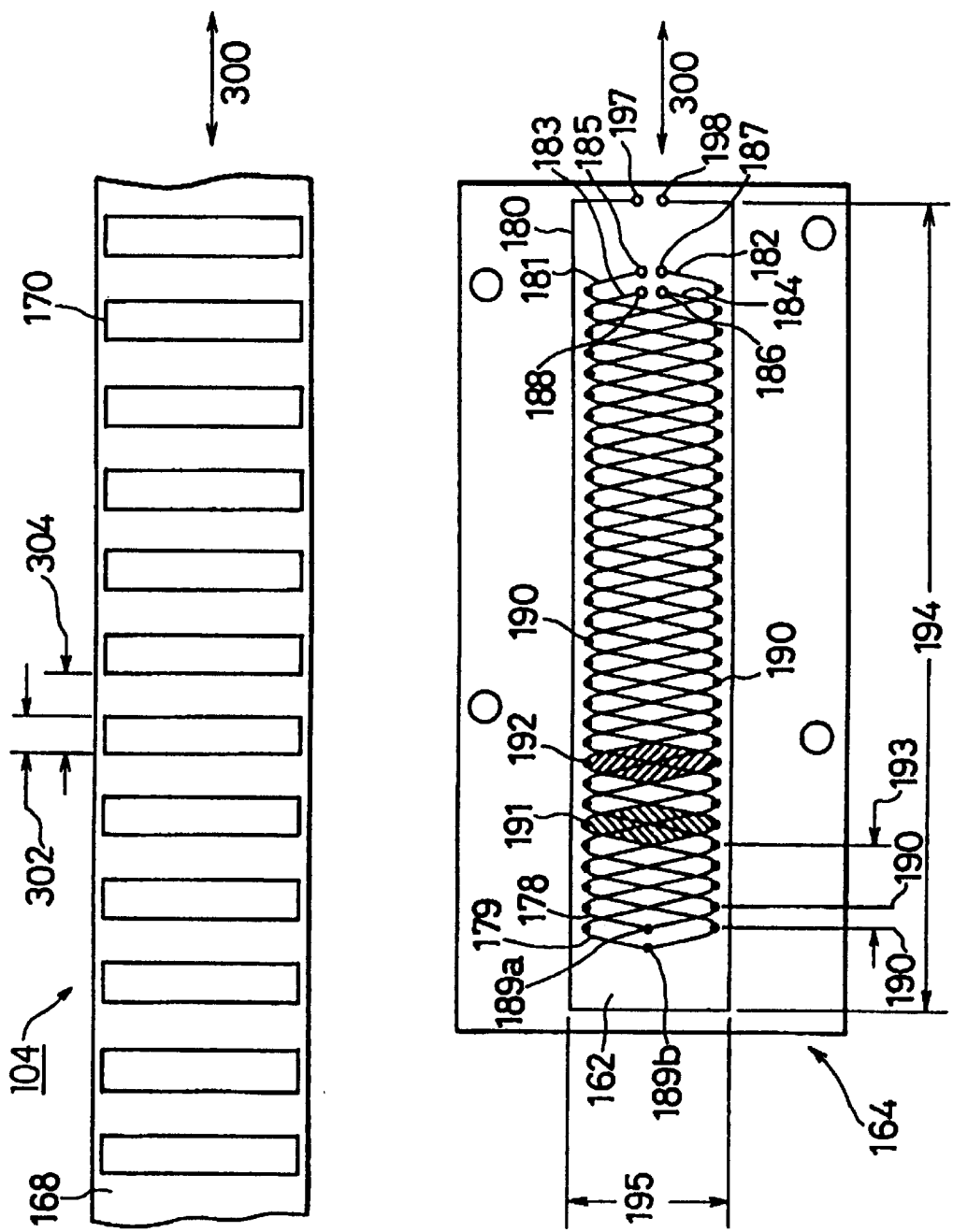
FIG. 3 is a plan view showing a layout of the transmitter windings and the receiver windings of an incremental read head employing the basic sensing principle of this invention for an inductive position transducer, and corresponding disrupter scale elements.

As in this invention, the inductive transducer formed by the read head 164 and the disrupters 170 operates, in the caliper shown in FIGS. 1–3, by generating changing magnetic fields. The changing magnetic fields induce circulating currents, known as eddy currents, in the disrupters 170 placed within the changing magnetic field.

For example, one of the disrupters 170 is placed between the pole faces of an electromagnet. The magnetic field between the pole faces changes with time, such as when the electromagnet is driven by an alternating current. Then, the flux through any closed loop in the disrupter 170 will change. As a result, an electromotive force ("EMF") is induced around the closed loop. Since the disrupter 170 is a conductor, an eddy current is generated whose value equals the EMF divided by the resistance along the loop of the material from which the disrupter 170 is formed.

Such eddy currents are often produced in the magnetic cores of transformers. In transformers, such eddy currents are unwanted because they result in power loss and create heat that must be dissipated. In this invention, however, the existence of eddy currents has been applied to provide a beneficial result.

FIG. 3 shows a section of the read head 164 in greater detail. The read head 164 preferably consists of five substantially coplanar conductors 180–184. Two of the conductors 181 and 182 form a first receiver winding 178. Another two of the conductors 183 and 184 form a second receiver winding 179. The first and second receiver windings 178 and 179 are centrally located on and extend along the substrate 162 in an overlapped manner.

The first and second receiver windings 178 and 179 are each arranged in a sinusoidal pattern and have the same wavelength. The conductor 181 extends from a terminal 185 to an interconnection terminal 189a, where it connects to the conductor 182. The conductor 182 then extends back to a terminal 187. The conductors 181 and 182 forming the first receiver winding 178 define a plurality of sinusoidally shaped loops 191.

In a similar manner, the conductor 183 extends from a terminal 188 to an interconnection terminal 189b, where it connects to the conductor 184. The conductor 184 then extends back to a terminal 186. The conductors 183 and 184 forming the second receiver winding 179 also define a plurality of sinusoidally shaped loops 192. The loops 192 are offset by one-quarter wavelength or one-half of a loop from the loops 191 formed by the first receiver winding 178.

In FIG. 3, the conductors 181–184 are shown on the same surface of the substrate 162. However, alternate half wavelength sections of each of the conductors 181–184 are actually on separate layers of the substrate 162. Thus, the windings 178 and 179 do not physically contact each other. Similarly, each of the windings 178 and 179 do not physically contact themselves at the "crossover" points in the middle of the pattern. The half wavelength sections of each of the conductors 181–184 are then joined to other half wavelength sections of the same conductor by feedthroughs 190 extending through the substrate 162.

While the conductors 181–184 are not on the same surface of the substrate 162, the conductors 181–184 lie within a thin zone. That is, the distance between the top most layer of the windings 178 and 179 on the substrate 162 and the bottom most layer of the substrate 162 is minimal. Therefore, the conductors 181–184 are approximately coplanar.

The second receiver winding 179 is substantially identical to the first receiver winding 178, except for the spatial phase offset. Accordingly, the following discussion will focus primarily on the first receiver winding 178. It should be appreciated that the following discussion applies equally to the second receiver winding 179.

The fifth winding 180 is a transmitter winding that also lies within the thin zone and substantially encircles the first and second receiver windings 178 and 179. The transmitter winding 180 is also formed by a conductor on a layer or surface of the substrate 162. The transmitter winding 180 is also formed according to conventional printed circuit board manufacturing techniques. The transmitter winding 180 has a length 194 and width 195 sufficient to encircle the first and second receiver windings 178 and 179.

Figure 4:
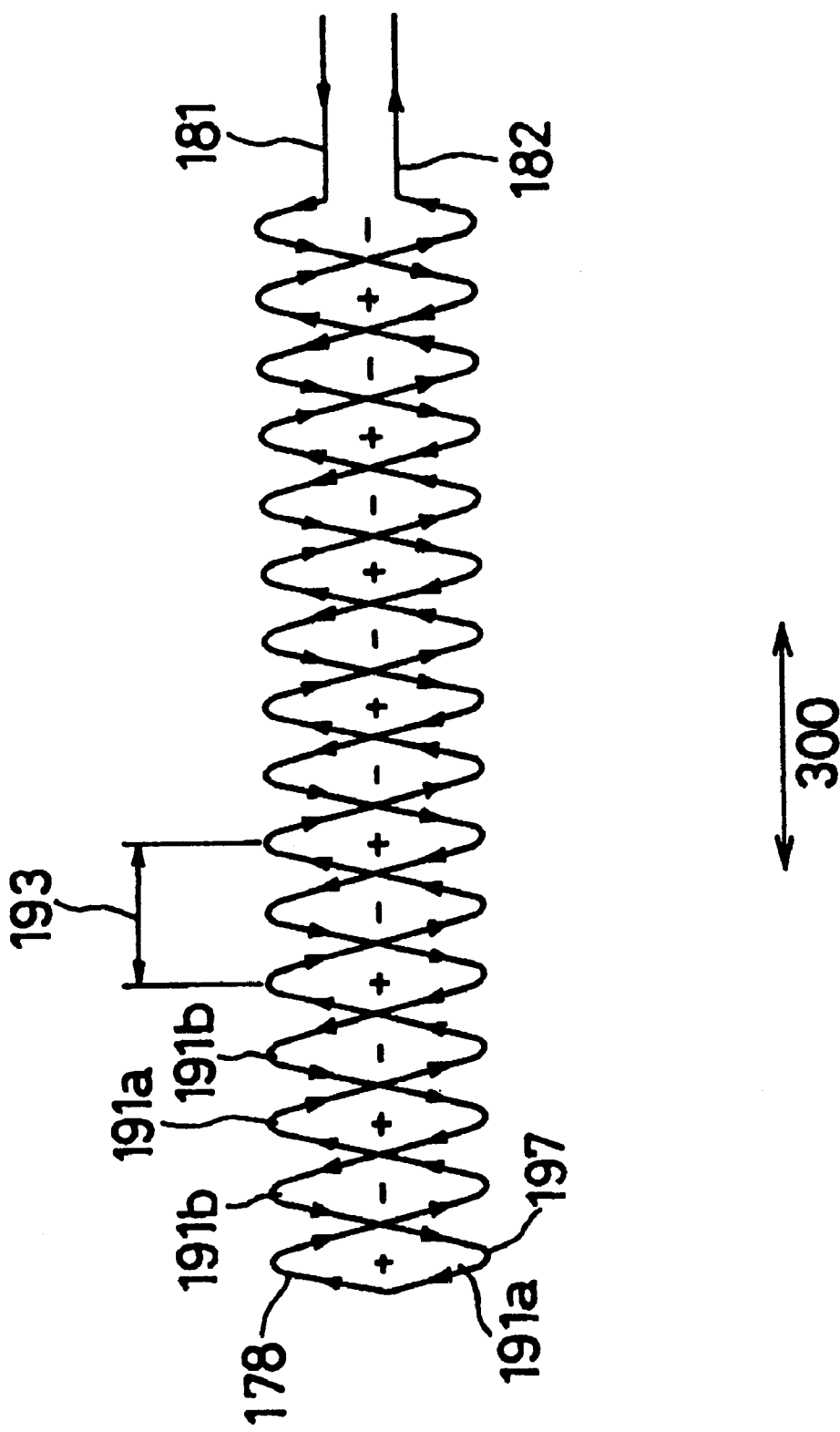
FIG. 4 is a plan view showing the alternating loops of one of the receiver windings of FIG. 3.

Except as otherwise specified, measurements in FIGS. 3 and 4 are defined relative to a measuring axis 300. "Length" generally refers to dimensions extending parallel to the measuring axis 300 and "width" generally refers to dimensions extending perpendicular to the measuring axis 300 in the plane of the substrate 162. The distance spanned by two adjacent loops 191 formed by the first receiver winding 178 or two adjacent loops 192 formed by the second receiver winding 179 is defined as the pitch or wavelength 193 of the read head 164. The distance spanned by a single loop 191 or 192 is equal to one-half of the wavelength 193. The distance 302 spanned by each disrupter 170 is preferably also equal to one-half of the wavelength 193.

The one-quarter wavelength offset between the first receiver winding 178 and the second receiver winding 179 produces signals in quadrature. Thus, the direction of motion of the read head 164 relative to the scale 104 is observable. Furthermore, the distance 304 spanned from one edge of a disrupter 170 to the corresponding edge of an adjacent disrupter 170 is preferably equal to the wavelength 193.

It should be appreciated that if the disrupters all are substantially identical, the edge-to-edge distance 304 can be any integer multiple "K" of the wavelength 193. In the later case, it is preferable that each receiver winding have a length of "N*K" times the wavelength 193, where N is also an integer.

As shown in FIG. 4, the first receiver winding 178 has a sinusoidal pattern of loops 191. The first receiver winding 178 is formed by the conductors 181 and 182 laid out in one direction in a sinusoidal or zigzag pattern, and then in a reverse direction. Thus, the conductors 181 and 182 physically (but not electrically) cross over each other to form the loops 191. Alternately, the loops 191 can be created by twisting a loop of insulated wire clockwise or counterclockwise 180 degrees at regular increments along the loop. The construction of the second receiver winding 179 is identical to the first receiver winding 178.

As a result of the cross-over structure of the loops 191, adjacent ones of the loops 191 have different effective winding directions. An alternating current flowing through the transmitter winding 180 produces a uniform, time-varying magnetic field extending through the first receiver windings 178. The time-varying magnetic field generates an EMF in, or time-varying current through, the first receiver winding 178. Since adjacent ones of the loops 191 are wound in alternating directions, the EMF and current generated in adjacent loops 191 have alternating polarities, as indicated by the "+" and "−" symbols in FIG. 4.

Each of the loops 191 encloses substantially the same area. Therefore, if the number of "+" loops 191a equals the number of "−" loops 191b and the loops 191 receive a uniform magnetic flux, the magnetic field induces a net zero EMF across the terminals 185 and 187 of the first receiver winding 178. This is also true for the second receiver winding 179.

If a disrupter 170 on the scale 104, or any other conductive object, is moved close to the read head 164, the magnetic field generated by the transmitter winding 180 will induce eddy currents in the disrupter 170 or the other conductive object. Consequently, a magnetic field is created in the vicinity of the disrupter counteracting the magnetic field generated by the transmitter winding 180. The eddy currents thus generate reverse magnetic fields that attenuate the transmitter magnetic field proximate to the disrupter 170.

As a result, the magnetic flux that the first receiver winding 178 receives is spatially altered or disrupted. So long as the disruption does not equally affect the "+" loops 191a and the "−" loops 191b, the receiver winding 178 outputs a non-zero EMF signal. Consequently, the EMF between the output terminals 185 and 187 will change polarity as the conductive disrupter 170 moves from adjacent to a "+" loop 191a to adjacent to a "−" loop 191b.

The size of the disrupter 170 preferably does not equal the wavelength 193. For example, if the length 302 of the disrupter 170 is equal to the wavelength 193 and the width of the disrupter 170 is equal to the width 195, then, regardless of where the disrupter 170 is positioned along the measuring axis 300 relative to the loops 191, it will disrupt the transmitter magnetic field over equal areas of adjacent "+" loops 191a and "−" loops 191b. As a result, the amplitude of the EMF signal output from the receiver winding 178 will be nominally zero.

Furthermore, the output from the receiver winding 178 will be insensitive to position of the object relative to the loops 191. That is, the output will be zero regardless of the disrupter 170's position along the measuring axis. Since no useful signal results from this geometry, the size of the disrupter 170 preferably does not equal the wavelength 193. The length of the disrupter 170 could be greater than one wavelength 193. However, because the portion of the disrupter equal to a full wavelength 193 will not contribute to the useful signal strength, the length of the disrupter 170 is preferably less than one wavelength 193.

If the length of the disrupter 170 is not equal to one wavelength 193 or integer multiples of the wavelength 193, then in most positions, unequal "+" and "−" areas of the loops 191 will be disrupted. The signal output will thus be sensitive to the position of the disrupter 170 relative to the loops 191. The signal output will have a largest amplitude change as a function of position when the length of the disrupter 170 is equal to one-half of the wavelength 193. When the length of the disrupter 170 is one-half of a wavelength 193, the disrupter 170 will periodically cover either an entire "+" loop 191a or an entire "−" loop 191b, but will not cover any portion of an adjacent "−" loop 191b or "+" loop 191a. Thus, a one-half wavelength-long disrupter 170 will produce the strongest possible signal.

As shown in FIG. 3, the disrupters 170 are arranged on the scale 104 with a pitch (a distance of one edge to the adjacent corresponding edge) of one wavelength 193. Thus, successive disrupters are separated by one-half of a wavelength 193. The disrupters 170 are preferably highly electrically conductive, but not ferromagnetic. Thus, the disrupters 170 do not become magnetized and attract ferromagnetic particles. As shown in FIG. 1, in the first preferred embodiment, the length of the scale 104 exceeds the length of the read head 164. Thus, the length of the scale 104 establishes the measurement range for the caliper 100.

In the first preferred embodiment of the caliper 100, the loops 191 of the first receiver winding 178 are preferably placed within a prescribed region in the interior of the transmitter winding 180. The inventors have experimentally determined that the transmitter winding 180 produces a magnetic field having an intensity that rapidly diminishes as a function of the distance from conductor of the transmitter winding 180. However, the inventors have also experimentally determined that in the interior region of transmitter winding 180, the magnetic field tends to approach a uniform value beyond a certain distance from the conductor of the transmitter winding 180.

The certain distance thus defines the perimeter of a region of relatively uniform magnetic field. The distance at which the magnetic field becomes uniform is a function of the geometry of the winding. Consequently, to improve the accuracy of the inductive transducer of this invention, the loops 191 and 192 are preferably spaced the certain distance away from the transmitter winding 180. The loops 191 and 192 of the first and second receiver windings 178 and 179 are more preferably located entirely within the region of relatively uniform magnetic field.

In one exemplary embodiment, the disrupters 170, the receiver windings 178 and 179, and the transmitter winding 180 are dimensioned as follows:

Receiver winding wavelength=0.200 inch;
Disrupter length=0.100 inch;
Disrupter width=0.490 inch;
Transmitter winding width=0.400 inch;
Receiver winding width=0.340 inch;
One-quarter receiver wavelength=0.050 inch; and
Transmitter winding length=1.950 inches.

By accurately balancing and alternately interleaving the "+" loops 191a and the "−" loops 191b, the first receiver winding 178 has a nominally zero output in the absence of the disrupters 170. At the same time, locating the alternating "+"loops 191a and "−" loops 191b immediately adjacent to each other provides for a continuous signal at each receiver winding output as the disrupter 170 is moved along the measuring axis 300. These design factors provide a high signal-to-noise ratio in the caliper 100. Thus, these features enable high accuracy measurement.

The above-outlined geometry of the read head 164 and scale 104 ensure that the transducer of the caliper 100 is highly accurate. Additionally, the above-outlined geometry of the read head 164 of the caliper 100 largely eliminates effects from non-uniform transmitter fields along the width of the read head 164 perpendicular to the measuring axis 300. The above-outlined geometry also rejects externally applied magnetic fields as "common-mode error" due to the balanced "differential detection" of the inductive transducer of this invention. The degree of accuracy in the inductive transducer of the caliper 100 depends largely on the care in the design and construction of the read head 164 and the scale 104.

Figure 5A:
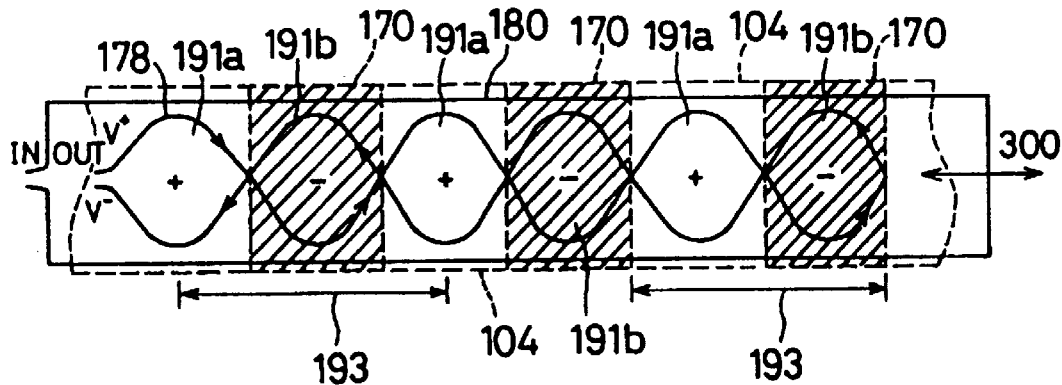
FIG. 5A is a plan view showing a receiver winding overlaying the scale, with the scale coupling to a first portion of the receiver winding.
Figure 5B:
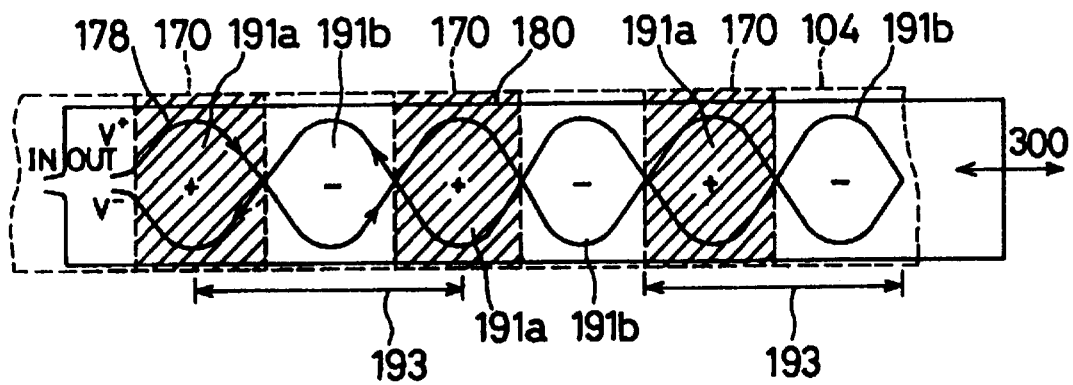
FIG. 5B is a plan view showing the receiver winding overlaying the scale, with the scale coupling to a second portion of the receiver winding.
Figure 5C:
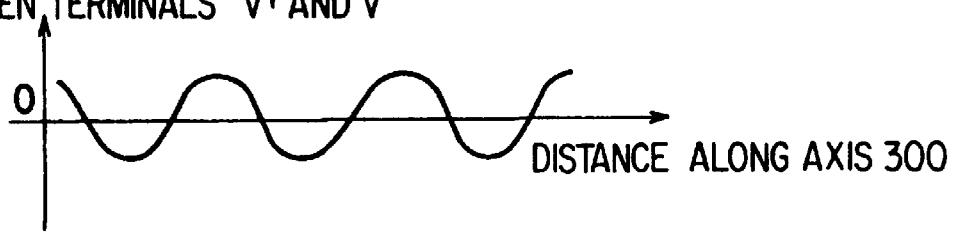
FIG. 5C is a waveform diagram showing the output signal amplitude and polarity, from the receiver winding as it moves versus position of the scale.

FIGS. 5A–5C show an example of the operation of the inductive caliper 100. As the scale 104 and its disrupters 170 (shown in dashed lines) move relative to the transmitter 180 and the first receiver winding 178, the disrupters 170 cover either all of the "+" loops 191a and none of the "−" loops 191b, varying proportions of the "+" loops 191a and the "−" loops 191b, or all of the "−" loops 191b and none of the "+" loops 191a.

FIG. 5A shows the disrupters 170 covering all of the "−" loops 191b and none of the "+" loops 191a of the first receiver winding 178. The transmitter winding 180 inductively couples to and induces eddy currents in the disrupters 170. As a result, the disrupters 170 produce magnetic fields that counteract the transmitter magnetic field passing through the "−" loops 191b. Thus, the net magnetic flux passing through the "−" loops 191b is less than the net magnetic flux passing through the "+" loops 191a. The "−" loops 191b therefore generate less induced EMF than the "+" loops 191a. Consequently, the first receiver winding 178 produces a net "positive" polarity current and voltage across its output terminals 185 and 187.

The output signal varies with time because the transmitter winding 180 generates a time-varying magnetic field. The amplitude and polarity of the time varying output signal relative to the input signal indicates the relative position between the read head 164 and the scale 104. FIG. 5C illustrates how the output signal amplitude and polarity vary as the position of the scale 104 varies relative to the read head 164.

The initial peak in the waveform shown in FIG. 5C is an example of a positive polarity amplitude output across the terminals 185 and 187 of the first receiver winding 178. Polarity indicates the time phase of the time-varying output signal relative to the input signal. The polarity of the output signal will be either in phase or inverted (180° out of phase) relative to the input signal.

FIG. 5B shows the scale 104 moved so that the disrupters 170 overlap all of the "+" loops 191a, but none of the "−" loops 191b. In this relative position, the induced current generated in the disrupters 170 counteracts the flux of the transmitter magnetic field passing through the "+" loops 191a. The "−" loops 191b thus generate more induced EMF than the "+" loops 191a. Consequently, the first receiver winding 178 generates a net negative polarity current and voltage at its output terminals 185 and 187. The initial valley in the waveform shown in FIG. 5C is an example of a negative polarity amplitude output across the terminals 185 and 187 of the first receiver winding 178.

When the disrupters 170 completely overlap the "−" loops 191b, as shown in FIG. 5A, the resulting output signal has a maximum positive amplitude, as shown in the peaks in the waveform of FIG. 5C. Conversely, when the disrupters completely overlap the "+" loops 191a, as shown in FIG. 5B, the resulting output signal has a maximum negative amplitude, as shown in the valleys in the waveform of FIG. 5C.

As the disrupters 170 move along the measuring axis 300 between the position shown in FIG. 5A and the position shown in FIG. 5B, the amplitude of the waveform of FIG. 5C varies continuously. In particular, the amplitude of the waveform of FIG. 5C is zero when the disrupters 170 overlap exactly one-half of each of the "+" loops 191a and the "−" loops 191b. From this position, as the disrupters 170 move more closely to the position shown in FIG. 5A or 5B, the amplitude of the receiver output signal is increasingly positive or negative, respectively.

The read head 164, as shown in FIG. 3, has two receiver windings 178 and 179 spaced one-quarter of the scale wavelength 193 apart from each other. That is, the second receiver winding 179 overlaps the first receiver winding 178 and is offset by one-quarter of the scale wavelength 193. Thus, each "+" loop 192a of the second receiving winding 179 overlaps a portion of a "+" loop 191a and a portion of a "−" loop 191b of the first receiver winding 178. Similarly, each "−" loop 192b of the second receiver winding 179 overlaps a portion of a "+" loop 191a and a portion of a "−" loop 191b of the first receiver winding 178.

Insulation or crossover vias are suitably placed on or in the substrate 162, respectively, to electrically isolate the first receiver winding 178 from the second receiver winding 179. By spacing the first and second receiver windings 178 and 179 one-quarter of a scale wavelength 193 apart, the signals from the first and second receiver windings 178 and 179 are spatially in quadrature. That is, the signal amplitudes output from the receiver windings 178 and 179 define sinusoidal patterns as functions of position. In particular, the sinusoidal pattern of the second receiver winding 179 is spatially shifted 90° with respect to the sinusoidal pattern of the first receiver winding 178.

As a result, the signal processing and display electronic circuit 166 detects the relationship between the signals from each of the receiver windings 178 and 179. By analyzing this relationship, the signal processing and display electronic circuit 166 determines the direction the read head 164 is moving relative to the scale 104. As outlined above, the amplitudes of the signals output by the windings 178 and 179 vary sinusoidally based on the position of the read head 164 relative to the scale 104.

Thus, the signal processing and display electronic circuit 166 determines the position of the read head 164 with respect to the scale 104 by the following equation:

$$p = \frac{\tan^{-1}(S_1/S_2)}{2\pi}\lambda + n\lambda \quad (1)$$

where:

p is the position;

$\lambda$ is the scale wavelength 193;

n is an integer indicating the number of full wavelengths 193 traveled;

S1 and S2 indicate the amplitudes and signs of the output signals received from the receiver windings 178 and 179, respectively; and "$\tan^{-1}$" is the inverse tangent function defining an angle between zero and $2\pi$ as a function of the ratio between S1 and S2.

The signs of S1 and S2 define which quadrant the angle lies in according to Table 1.

TABLE 1

| S1 | S2 | $\tan^{-1}$ (S1/S2) |
|---|---|---|
| + | + | 0 to $\pi/2$ |
| + | − | $\pi/2$ to $\pi$ |
| − | − | $\pi$ to $3\pi/2$ |
| − | + | $3\pi/2$ to $2\pi$ |

To improve the accuracy of the caliper 100, and/or reduce the demands on the analog signal processing circuitry for the receiver output signal, the read head 164 can include three or more overlapping receiver windings. While a read head 164 having three or more overlapping receiver windings is more difficult to manufacture, it provides, in combination with certain signal processing techniques, more accurate position readings than a read head 164 having only two overlapping receiver windings. Such multiple winding read heads are preferably equally phase-shifted. For example, for a number of windings m, the phase shift will be 180°/m.

Figure 6:
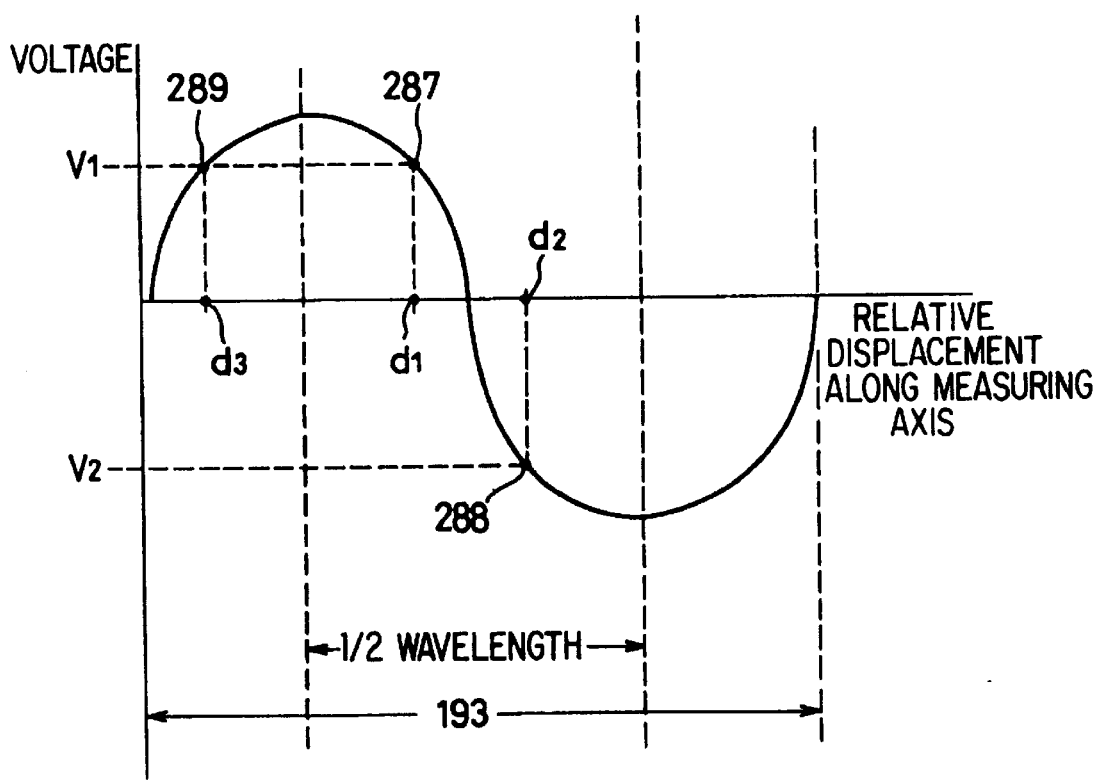
FIG. 6 is a waveform diagram plotting the output amplitude and polarity versus the position for a fine wavelength signal.

The signal processing and display electronic circuit 166 is able to determine an absolute position measurement within one-half of the wavelength 193, using known interpolation routines and only one receiver winding. For example, as shown in FIG. 6, the signal processing and display electronic circuit 166 can distinguish between a first position d1 and a second position d2 within one-half of the wavelength 193 by comparing the amplitude and polarity of the receiver signal at points 287 and 288, respectively.

The point 287 has a voltage value of V1, while point 288 has a voltage value of V2. The position d3 corresponds to the point 289 in the receiver signal shown in FIG. 6. The point 289 has the same voltage value V1 as the point 287. Therefore, the signal processing and display electronic circuit 166 cannot determine the difference in relative position between the first position d1 and the third position d3 using the interpolation approach.

The scale 104, the read head 164, or other implementations of this invention may be readily manufactured by conventional techniques. For example, known printed circuit board techniques (on rigid or flexible substrates) can be used to manufacture the read head 164 by forming the transmitter winding 180 and the receiver windings 178 and 179 on a printed circuit board substrate. Appropriate insulation is necessary between the loops 191 and 192 where the receiver windings 178 and 179 cross over themselves in order to prevent short circuiting of the receiver windings at the cross-over points.

The scale 104 can similarly be manufactured using known printed circuit board techniques. The flux disrupters 170 are thin copper foil bars deposited onto a printed circuit board substrate. Other high conductivity materials besides copper can be used for the flux disrupters 170, such as aluminum, chromium, silver or gold. Typical printed circuit boards use a glass fiber reinforced plastic such as FR4 material. The dimensional stability of the scale 104 affects the overall accuracy of the inductive absolute position transducer of this invention.

Therefore, for high accuracy applications, more stable scale substrates are preferred such as glass, quartz, steel, invar, or ceramics. Steel and invar are conductive materials. However, they are less conductive than copper. The conductivity contrast between the copper flux disrupters 170 and the steel or invar substrate 116 would provide sufficient contrast for the receiver windings 178 and 179 to produce varying outputs as the scale 104 moves relative to the read head 164.

In some applications, it may be useful to laminate or adhere one or more metal plates forming the flux disrupters 170 to a flexible metal tape forming the substrate. The metal plates are a metal dissimilar from that of the flexible tape. For instance, the metal tape, with the metal plates glued to it, can be mounted to a fixture or workpiece whose position is to be measured. Alternately, the metal tape can be retracted or coiled to store those portions of the metal tape not being used for a particular measurement. Further dimensional stability can be obtained by affixing the substrate, containing the flux disrupters 170, to a steel or other dimensionally stable substrate or support.

The flux modulators 170 can be either flux disruptive or flux enhancing elements, as set forth in copending U.S. patent application Ser. Nos. 08/645,483 and 08/645,490, filed May 13, 1996, herein incorporated by reference in their entirety. Similarly, the flux disruptive and flux enhancing elements can be provided in a variety of formats and structures, as described in U.S. patent application Ser. Nos. 08/645,483 and 08/645,490.

Figure 7:
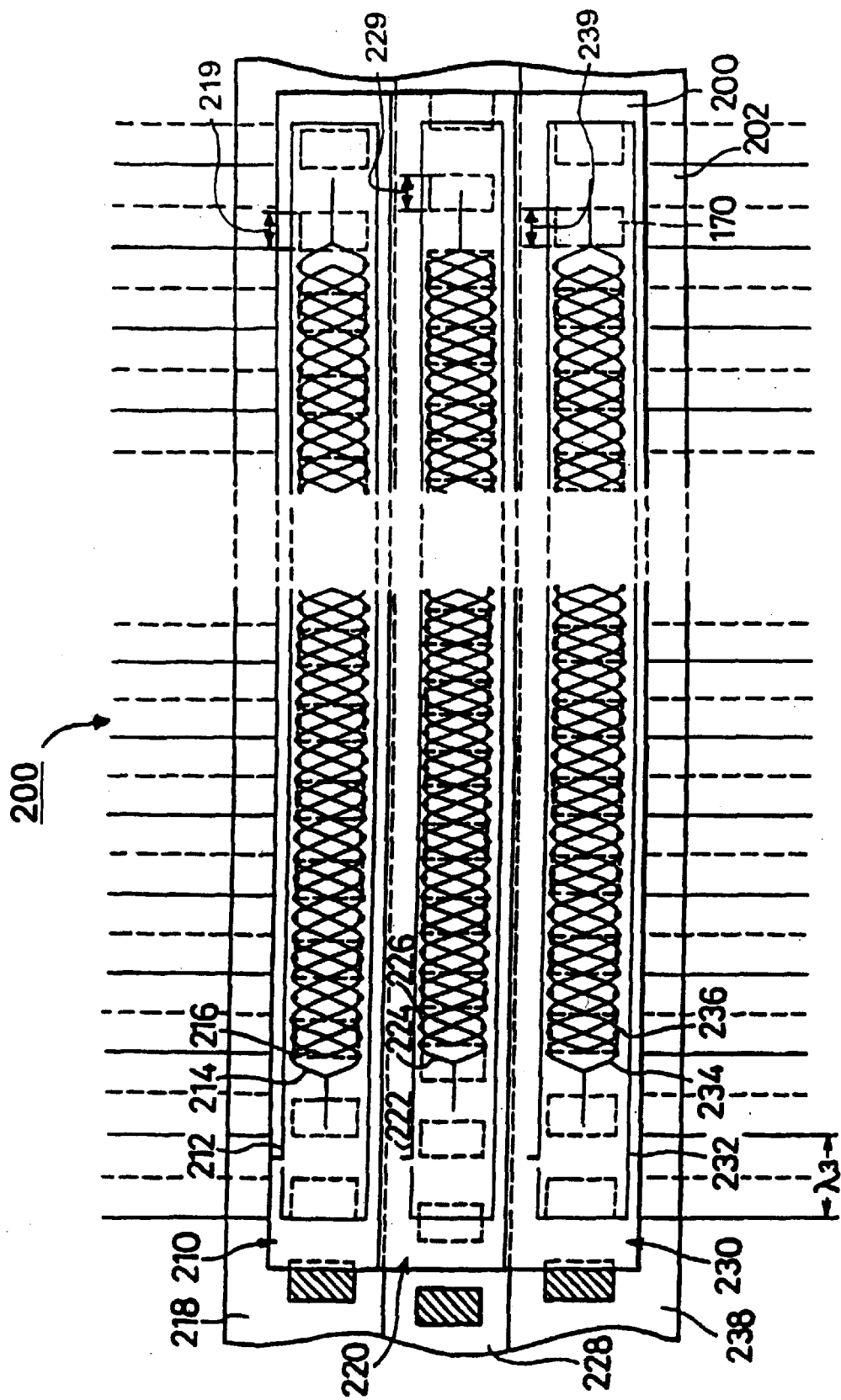
FIG. 7 is a plan view of a first preferred embodiment of the inductive absolute position transducer having three sets of transmitter and receiver windings and portions of three scales.
Figure 8:
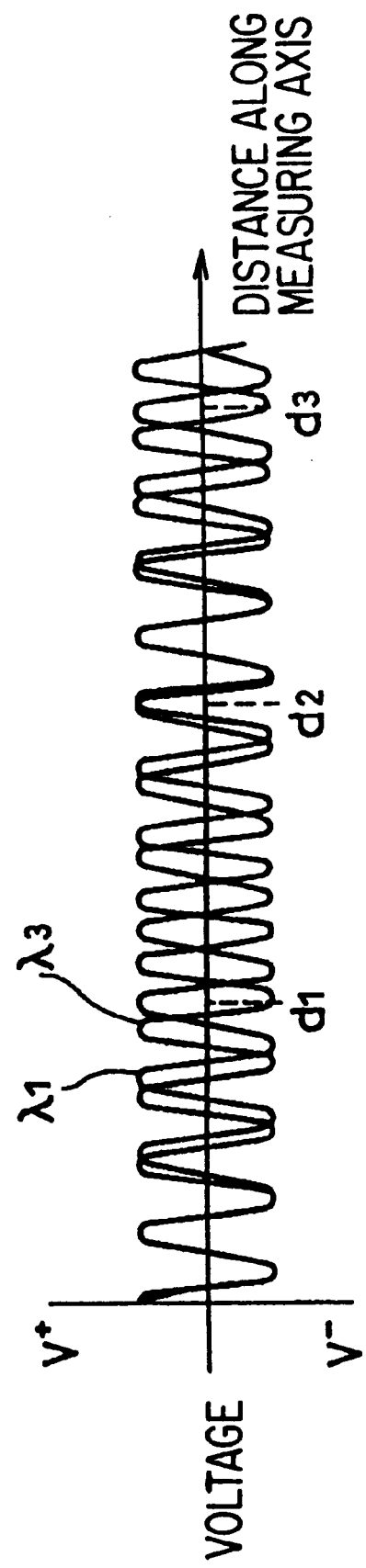
FIG. 8 is a waveform diagram plotting the voltage amplitude and polarity versus relative displacement for two transducer windings having slightly different wavelengths.

FIG. 7 shows a first preferred embodiment of the inductive absolute position transducer 200 of this invention. The inductive absolute position transducer 200 includes three transducers 210, 220 and 230 in parallel. Each of the transducers is designed and operates substantially as described in the explanation of FIGS. 1–5 outlined above.

Each of the three transducers 210, 220 and 230 includes a transmitter winding 212, 222 and 232, respectively, and two overlapping receiver windings 214 and 216, 224 and 226, and 234 and 236, respectively. The transducers 210, 220 and 230 are formed on a transducer member 204. Each transducer 210, 220 and 230 also includes a scale 218, 228 and 238. The scales 218, 228 and 238 are formed on a scale member 202 of the inductive absolute position transducer 200. Each scale 218, 228 and 238 includes a plurality of flux modulators 170. Importantly, the receiver windings 214 and 216, 224 and 226, and 234 and 236 of the transducers 210, 220 and 230, have wavelengths of $\lambda_1$, $\lambda_2$ and $\lambda_3$, respectively. Similarly, the flux modulators 170 on the scales 218, 228 and 238 each has a length 219, 229 and 239, respectively, measured along the measuring axis 300, equal to one-half of the corresponding wavelength $\lambda_1$, $\lambda_2$ and $\lambda_3$.

FIG. 7 shows several vertical lines equally spaced apart at the wavelength $\lambda_3$, with the half wavelength markings indicated by dashed lines. The vertical lines A and the dashed lines provide a visual reference to help indicate how the wavelengths $\lambda_1$ and $\lambda_2$ differ from the wavelength $\lambda_3$.

Preferably, the wavelength $\lambda_1$ equals 2.54 mm, the wavelength $\lambda_2$ equals 2.4094 mm and the wavelength $\lambda_3$ equals 2.56 mm. Either of the transducers 210 and 230 can be used to provide a fine wavelength measurement. The wavelength $\lambda_3$ (2.56 mm) is preferred for millimeter measurements because it allows for simple digital calculations. The wavelength $\lambda_1$ (2.54 mm) is equal to 0.1 inches. Thus, it is used in inch measurements, because it allows for simple inch/millimeter conversion calculations.

The wavelengths $\lambda_1$, $\lambda_2$, and $\lambda_3$ are similar to each other. Thus, the spatial phase difference between pairs of these wavelengths goes through a full 360° cycle over a spatial length much longer than any of the individual wavelengths $\lambda_1$, $\lambda_2$ or $\lambda_3$. Accordingly, position output information from two transducers with different wavelengths, such as two of the transducers 210, 220 and 230, can be combined for long-range measurements.

The combined position information provides absolute position information, based on a spatial "phase relation" computation, over a "medium wavelength" or "coarse wavelength." This "medium" or "coarse" wavelength corresponds to 360° of relative spatial phase shift, and is derived from the spatial wavelengths of the two transducers. This "medium" or "coarse" wavelength is much longer than the range of absolute measurement that could be achieved by any of the transducers 210, 220 or 230 alone.

As the spatial wavelengths of two transducers become increasingly similar, the phase difference derived from signals from the two transducers goes through a full 360° cycle over an increasingly longer "phase relation" wavelength. This corresponds to a larger absolute measuring range.

The permissible practical relationship between the wavelengths of the transducers 210, 220 and 230, and thus the total absolute measuring range of the device, is dependent on the measurement accuracy for each of the three wavelengths/transducers. A high measurement accuracy for an individual transducer indicates that positions can be accurately determined to a resolution that is a small part of the transducer wavelength.

"Interpolation ratio" describes the degree to which sub-wavelength resolution or accuracy can be obtained. That is, it is the ratio of the wavelength to the chosen increment of position resolution. This term may be applied to the wavelength of an individual transducer, or to the effective "medium" or "coarse" wavelengths described above.

In the inductive absolute position transducer 200 shown in FIG. 7, the inductive absolute position transducer 200 must be constructed with a very conservative "error margin" for the relative phase computations. That is, under the worst case conditions, the "medium" or "coarse" relative phase computation must identify the position of the relatively moving transducer elements corresponding to a particular individual wavelength of the "next finer" measurement mode of the absolute system. Otherwise, an error, corresponding to at least one wavelength of the "next finer" measurement mode, will be created in the overall absolute position computation. "Wavelength ratio" means the ratio of the relatively coarser effective wavelength to the "next finer" effective wavelength, for example, Coarse/Medium, or Medium/Fine.

For the inductive absolute position transducer 200 of FIG. 7, a conservative error margin is obtained by using a wavelength ratio that is low compared to the interpolation ratio of the individual transducers. The wavelength ratios used in the preferred embodiments of the inductive absolute position transducer of this invention are only 16/1 for Medium/Fine and 8/1 for Coarse/Medium. These wavelength ratios provide an adequate safety margin versus the nominal accuracy and interpolation ratio of 256/1 expected for the individual transducers 210, 220 and 230, and their associated fine wavelengths. The wavelength ratios can be increased depending on system design tolerances and allowable costs. However, this could result in a greater risk of errors causing incorrect absolute measurement readings.

The phase difference between the wavelengths $\lambda_1$ and $\lambda_3$ provides an effective coarse wavelength of 325.12 mm. To provide a medium wavelength $\lambda_M$, the difference between the 2.56 mm wavelength $\lambda_3$ and the 2.4094 mm wavelength $\lambda_2$ provides a wavelength of 40.96 mm, which is equal to 16×2.56 mm and 17×2.4094 mm. Thus, the Coarse/Medium ratio is 325.12/40.96, or approximately 8, and as a result, the Coarse/Fine ratio is approximately 128. It should be appreciated that, to ensure the inductive absolute position transducer has a sufficient measuring range, the Coarse/Fine ratio is preferably at least 100, while the Medium/Fine ratio is preferably at least 10. The following quantitative description summarizes the preferred design guidelines corresponding to the fine (millimeters and inches), medium and coarse operating modes preferred in the inductive absolute position transducer of this invention.

In particular, the wavelengths $\lambda_1$, $\lambda_2$ and $\lambda_3$ are: $\lambda_1$=2.54 mm; $\lambda_2$=2.4094 mm; and $\lambda_3$=2.56 mm. The spatial phase position of each transducer 210, 220 and 230 is defined as $\phi_1$, $\phi_2$ and $\phi_3$ respectively. The wavelengths $\lambda_1$ and $\lambda_3$ are the fine mode wavelengths $\lambda_F$. The wavelength $\lambda_3$ is used for millimeter fine mode measurements. The wavelength $\lambda_1$ is used for inch fine mode measurements. The medium mode wavelength $\lambda_M$ is determined as:

$$\lambda_{M3} = \lambda_3 * \frac{\lambda_2}{\lambda_3 - \lambda_2};$$

or, alternatively, $$\lambda_{M1} = \lambda_1 * \frac{\lambda_2}{\lambda_1 - \lambda_2}.$$

Thus, the medium mode wavelength $\lambda_{M3}$ is 40.96 mm. Alternatively, $\lambda_{M1}$ may be used in some situations. $\lambda_{M1}$ is 46.86 mm. The coarse mode wavelength $\lambda_C$ is determined as:

$$\lambda_C = \lambda_1 * \frac{\lambda_3}{\lambda_3 - \lambda_1}.$$

Thus, when $\lambda_1$ is 2.54 mm and $\lambda_3$ is 2.56 mm, the coarse mode wavelength $\lambda_C$ is 325.12 mm.

The phase position for the coarse wavelength $\lambda_C$ is $\phi_1-\phi_3$. The phase position for the medium wavelength $\lambda_{M3}$ is $\phi_2-\phi_3$, or for the medium wavelength $\lambda_{M1}$, $\phi_2-\phi_1$. The calculation of the general phase position $\phi_n$ is defined below. The phase position for either fine wavelength $\lambda_1$ or $\lambda_3$ is determined by quadrature, as described above.

The transmitter windings 212, 222 and 232 and the receiver windings 214 and 216, 224 and 226, and 234 and 236 of the transducers 210, 220 and 230, respectively, are preferably manufactured on two sides of a single printed circuit board, as described above.

As noted above, each transducer 210, 220 and 230 uses two receiver windings 214 and 216, 224 and 226, and 234 and 236, respectively. By being one-quarter of a scale wavelength apart, the receiver windings are in quadrature. The signals output from the receiver windings are therefore spatially 90° out of phase. The relation between the signals from the two receiver windings allows the direction of movement to be determined and allows an unambiguous fine position measurement to be calculated anywhere within a fine wavelength.

In the inductive absolute position transducer 200 of FIG. 7, the signal amplitudes of the receiver windings follow a sinusoidal function as the scale 202 moves along the measuring axis 300. The linear and phase positions x and $\phi_n$, respectively, within one local wavelength of the scale relative to the corresponding receiver windings are obtained as:

$$x = \tan^{-1}(s1/s2) * (\lambda_n/2\pi)$$

$$\phi_{1n} = \tan^{-1}(s1/s2)$$

where:
x is the linear position;
$\phi_{1n}$ is the spatial phase position, where n=1, 2 or 3 for transducers 210, 220 or 230, respectively;
s1 and s2 are the amplitude of the output signals from the corresponding receiver windings; and
$\lambda_n$ is the corresponding wavelength.

The $\tan^{-1}$ function returns a value between 0 and $2\pi$, by using the signal polarity of the s1 and s2 signals to identify the appropriate "quadrant" of the wavelength that corresponds to the signals.

The transducers 210, 220 and 230 can, to some degree, parasitically couple. This causes errors in the receiver output signals from the transducers. To reduce parasitic coupling between the transducers 210, 220, and 230, the two wavelengths that are most similar are placed a maximal distance apart from each other within the inductive absolute position transducer 200. Therefore, since $\lambda_1$ is approximately equal to $\lambda_3$, the transducers 210 and 230 are placed on opposite sides of the transducer 220.

Additionally, in the preferred embodiment, the length of the receiver windings of each transducer 210, 220 and 230 should be the integer number of wavelengths which comes closest to the medium wavelength $\lambda_M$. Preferably, the medium wavelength $\lambda_M$ will be equal to an integer number of wavelengths for each transducer 210, 220 and 230. However, at most two of the transducers 210, 220 and 230 will have integer numbers of wavelengths equal to the medium wavelength $\lambda_M$.

Furthermore, the middle transducer 220, which is used to provide the medium position measurement, has approximately one wavelength difference between itself and the neighboring transducers 210 and 230 over the medium wavelength. Thus, N×$\lambda_1$=(N+1)×$\lambda_2$=N×$\lambda_3$. In the example described above, 16×2.56 mm=17×2.4094 mm≅16.126× 2.54 mm. This one wavelength difference over the medium wavelength $\lambda_M$ between adjacent linear transducers means that any parasitic coupling error components will undergo one full spatial cycle over a medium wavelength span. The net effect is to substantially cancel the parasitic coupling signal component. Thus, any such error components generated within the inductive absolute position transducer 200 add up and approximately cancel over the span of the receiver windings in the preferred embodiment.

This invention is described generally herein with respect to a transducer. However it should be appreciated that based on this detailed description, this transducer can be readily adapted to operate as a planar rotary encoder, similar to that shown in FIGS. 28 and 29, or as a cylindrical-rotary or other type of transducer. Additionally, to improve accuracy, or reduce demands on analog signal processing circuits for the receiver output signal, more than two overlapping receiver windings can be used in each transducer 210, 220 and 230. These and other alternatives and details regarding the design and operation of the transducers disclosed herein are similar to those disclosed in U.S. patent application Ser. No. 08/441,769, filed May 16, 1995, which is incorporated herein by reference.

Figure 9:
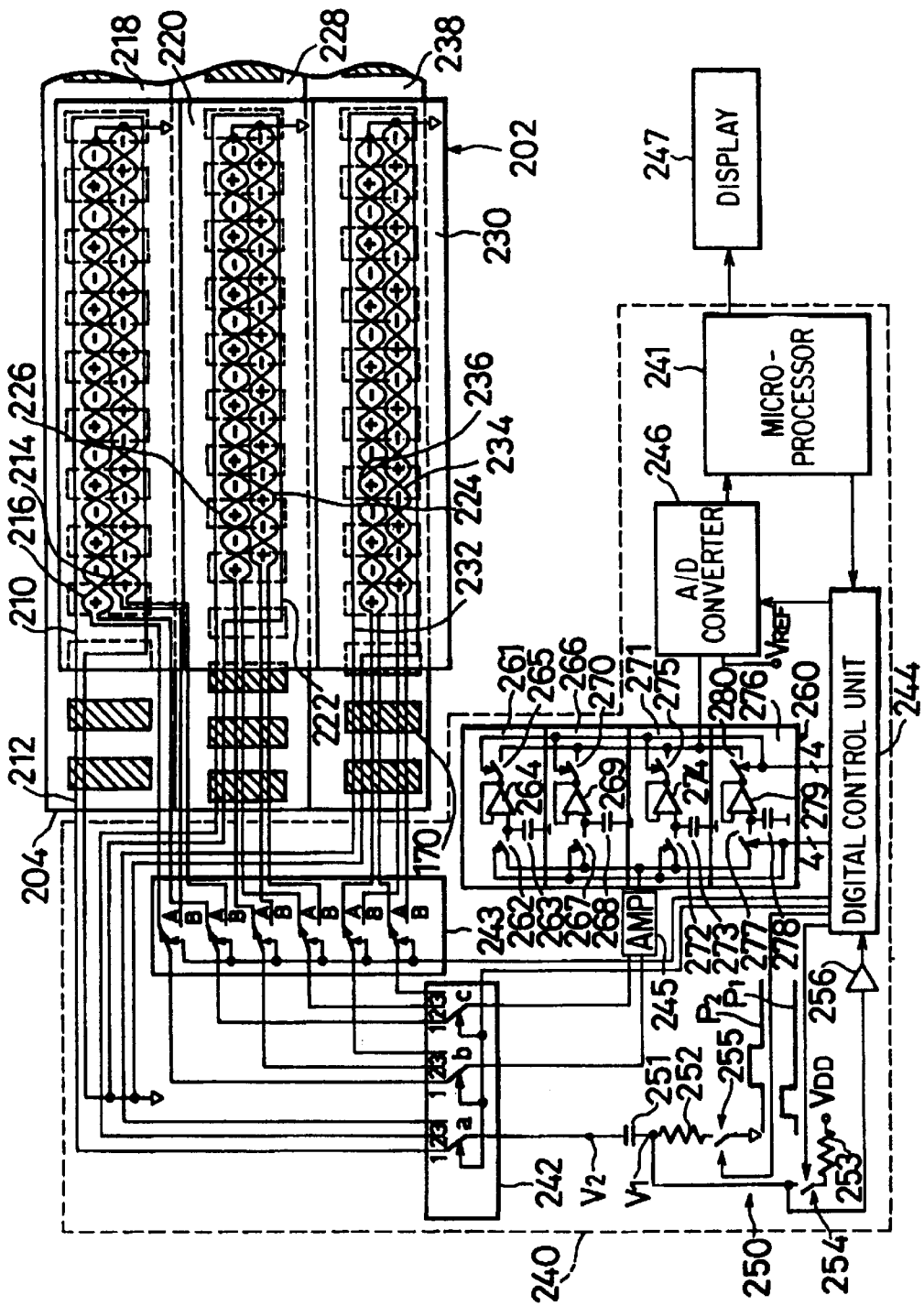
FIG. 9 is a block diagram of an electronic circuit of the first preferred embodiment of the inductive absolute position transducer of this invention.

As shown in FIG. 9, a signal generating and processing circuit 240 for implementing the first preferred embodiment of the inductive absolute position transducer 200 of this invention has three channels, one for each of the transducers 210, 220 and 230. The receiver windings of the transducers 210, 220 and 230 are shown schematically side-by-side, rather than overlapping, in the inductive absolute position transducer 200.

The signal generating and processing circuit 240 includes a signal generator 250. The signal generator 250 provides a high-frequency current in a series of pulses, at a frequency of several MHz, to the transmitter windings 212, 222 and 232 of the transducers 210, 220 and 230 through the select switch 242. The signal generator 250 is designed for low-power devices, such as hand-held or battery-powered measurement tools, including battery-powered transducers, hand-held low-power calipers, micrometers, tape measures, etc. The signal generator 250 includes a capacitor 251, two resistors 252 and 253, two switches 254 and 255 and a comparator 256, connected as shown in FIG. 9. Generally, in the signal generating and processing circuit 240, all of the switches are implemented as transistors.

At rest (not during a measuring period), the charge on the capacitor 251 has been discharged through the resistor 252. The resistor 252 preferably has a very small resistance. The resistor 252 could simply be the inherent resistance of the switch 255. A digital control unit 244 supplies a first activating signal $P_1$ to the control terminal of the switch 254. The signal $P_1$ closes the switch 254 for a time period $t_c$. A supply voltage $V_{dd}$ is generated from an appropriate power source, such as a battery. Closing the switch 254 allows the power supply voltage $V_{dd}$ to charge the capacitor 251. Shortly thereafter, the digital control circuit 244 supplies a second activating signal $P_2$ to the switch 255. The signal $P_2$ closes the switch 255. This shorts the capacitor 251 to ground through one of the transmitter windings 212, 222 or 223. In FIG. 9, the capacitor 251 is shorted through the transmitter winding 212.

The digital control unit 244 is preferably an application-specific integrated circuit (ASIC) or a portion of an integrated circuit containing the other circuits that perform the timing and switch control functions described below. However, the digital control unit 244 can also be implemented using another integrated circuit, a hardwired electronic or logic circuit such as a discrete element circuit, a programmable logic device such as a PLD, PLA or PAL, or the like.

Figure 10:
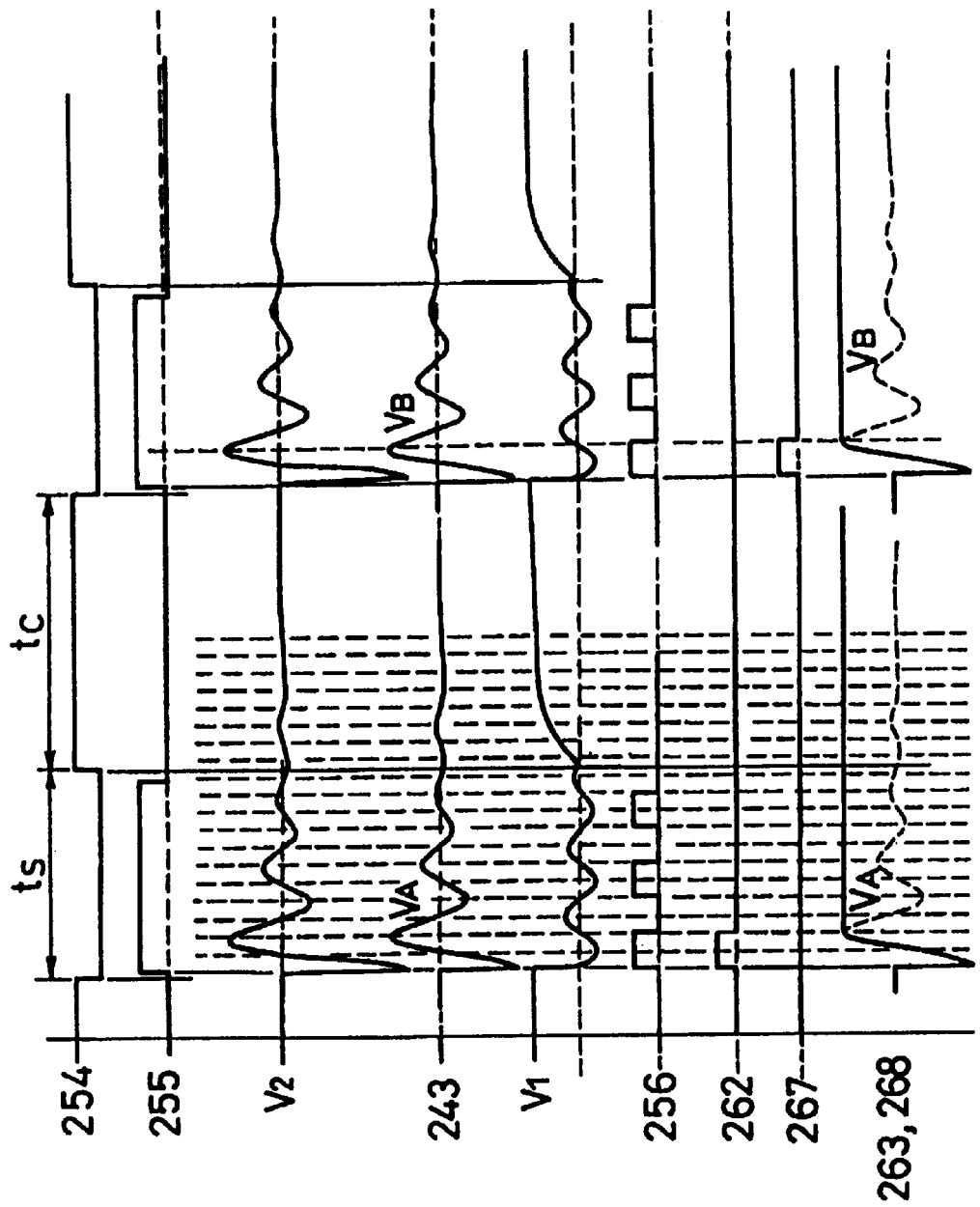
FIG. 10 is a timing diagram showing the various signals produced by the electronic circuit of FIG. 9.

FIG. 10 shows the timing for the pulses $P_1$ and $P_2$ supplied to the switches 254 and 255 and the resulting signals appearing at nodes V1 and V2 and on the output terminals of the receiver windings 214 and 216. FIG. 10 also shows the timing pulses $P_3$ and $P_4$ supplied to the switches 262 and 267 and the voltages held across the sample and hold capacitors 263 and 268.

Since the transmitter winding 212, as an inductor, and the capacitor 251 form a resonant circuit, the signal generator 250 generates the transient voltage at the node V2, as shown in FIG. 10. The transient signal at the node V2 has a resonant behavior based on the resonant circuit formed by the transmitter winding 212 and the capacitor 250. This transient signal is inductively transmitted by the transmitter winding 212 to the receiver windings 214 and 216. As shown in FIG. 10, the receiver winding 214 outputs the waveform VA during a first measurement period. The receiver winding 216 outputs the waveform VB during a second measurement period.

The amplitude of the received signal depends on the relative position between the scale 218, 228 or 238, and the receiver windings 214 and 216, 224 and 226, or 234 and 236, respectively, in the transducers 210, 220 and 230.

A phase switch 243 multiplexes the output signals from the receiver windings 214 and 216, 224 and 226, and 234 and 236. For example, when the phase switch 243 is in position A, the receiver windings 216, 226 and 236 for the transducers 210, 220, and 230 are enabled to output received signals from the transducers 210, 220 or 230 to the select switch 242. Similarly, when the phase switch 243 is in the position B, the signals from the terminals of the receiver windings 214, 224 and 234 are enabled to output received signals from the transducers 210, 220 or 230 to the select switch 242.

In the first preferred embodiment of the signal generating and processing circuit 240 shown in FIG. 9, one of the receiver output signals enabled by the phase switch 243 from each of the linear transducers 210, 220 and 230 is multiplexed and output by the select switch 242 and is input to a differential amplifier 245.

The select switch 242 has three positions corresponding to the three transducers 210, 220 and 230. The subswitch 242a of the select switch 242 selectively connects the alternating current signal to one of the transmitter windings 212, 222 or 232. For example, when the select switch 242 is in position 2 and the phase switch 243 is in position A, the select switch 242 selectively connects the alternating current signal to the transmitter winding 222 of transducer 220, and selectively connects the signals from the terminals of the receiver winding 226 of the transducer 220, which are output through the subswitches 242b and 242c, to the differential amplifier 245. The differential amplifier 245 rejects common mode noise between the signals output by the terminals of the receiver windings through the switches 242 and 243.

The signal output from the terminals of the receiver winding connected to the differential amplifier 245 through the switches 242 and 243 is amplified by the differential amplifier 245. The amplified signal is input to one of four parallel sample and hold subcircuits 261, 266, 271 and 276 of the sample and hold circuit 260. The first sample and hold subcircuit 261 has a first switch 262, a storage capacitor 263, an amplifier 264, and a second switch 265. The second sample and hold subcircuit 266 has a first switch 267, a storage capacitor 268, an amplifier 269, and a second switch 270. The third sample and hold subcircuit 271 has a first switch 272, a storage capacitor 273, an amplifier 274, and a second switch 275. The fourth sample and hold subcircuit 276 has a first switch 277, a storage capacitor 278, an amplifier 279, and a second switch 280.

The four parallel sample and hold subcircuits 261, 266, 271, 276 capture up to four signals within a very short time to minimize any errors arising from rapid movement of the read head 204 relative to the scale 202 of the inductive absolute position transducer 200. For example, for accurate position determination during motion, the position should not change appreciably between samples from the two receiver windings of any of the transducers 210, 220 or 230. Furthermore, when information from two of the transducers 210, 220 or 230 is to be combined in a calculation, such as for medium or coarse mode calculations, the position should not change appreciably between samples from any of the four receiver windings involved.

The four sample and hold subcircuits 261, 266, 271 and 276, however, do not store four samples simultaneously in this embodiment. Instead, they store four signals in rapid succession, because the select switch 242 can couple to only one of the transmitter windings and to one of the receiver windings of the three transducers 210, 220 and 230 at any one time. After collecting, within a few microseconds, four signals through the four sample and hold subcircuits 261, 266, 271 and 276, the sampled received signals are connected to the A/D converter 246 by the switches 265, 270, 275 and 280 in sequence. These switches 265, 270, 275 and 280 connect the outputs of the buffer amplifiers 264, 269, 274 and 279, sequentially to an analog to digital (A/D) converter 246.

The A/D converter 246 converts the signals to digital values and inputs them to a microprocessor 241. Using the values derived from the position-related receiver output signals stored in the sample and hold circuit 260, the microprocessor 241 calculates the spatial phase angles of the individual transducers 210, 220 and 230 and the spatial phase differences between the transducers 210, 220 and 230 and combines the values to obtain the absolute position of the inductive absolute position transducer 200.

The microprocessor 241 controls the timing of the switches 242, 243, 254, 255, 262, 265, 267, 270, 272, 275, 277 and 280 with the digital control unit 244. The timing of the switches 262, 267, 272 and 277 and the switches 265, 270, 275 and 280 is synchronized with the transmitter oscillation based on the transient signal at the node V2. As a result, each of the switches 262, 267, 272 and 277 synchronously demodulate a signal output from the terminals of the receiver windings through the switches 242 and 243.

The amplifiers 264, 269, 274 and 279 each outputs a positive voltage signal when the differential amplifier 245 receives an AC signal in phase with the signal at the node V2, and outputs a negative voltage signal when the differential amplifier 245 receives an AC signal out of phase with the signal at the node V2. The AC signals will always be either in phase with the signal at the node V2, or 180 degrees out of phase with the signal at the node V2. Specifically, the digital control unit 244 controls the timing of the switches 262, 267, 272 and 277 and the switches 265, 270, 275 and 280 based on a signal at the node V1 generated between the resistor 252 and the capacitor 254.

Importantly, as shown in FIG. 10, the signal at the node V1 is at zero amplitude when the signal at the node V2 is at a peak amplitude. Therefore, the voltage signal at the node V1 can be conveniently used to control the switches 262, 267, 272 and 277 in the sample and hold circuit 260 so that the sample and hold circuit 260 can sample the first (and strongest) peak of the receiver output signals. Consequently, the voltage signal at the node V1 is converted to a digital signal by a comparator 256 and input to the digital control unit 244. The digital control unit 244 uses the first falling edge in the square wave signal output by the comparator 256 to time the actuation of the switches 262, 267, 272 and 277.

In this way, this invention employs synchronous demodulation detection to appropriately sample the receiver output signals in relation to the transmitter signal at the node V2. As shown in FIG. 10, the first peak of the output signals from the receiver windings 216 and 214, respectively, are sampled and stored in the capacitors 263 and 268.

In a more preferred embodiment of the sample and hold portion of the signal generating and processing circuit 240, the differential amplifier 245 is positioned downstream of the sample and hold circuit 260. Furthermore, two sample and hold circuits 260 are used, one for each of the outputs from the select switch 242. In this more preferred embodiment of the sample and hold portion of the signal generating and processing circuit 240, the signals output from the select switch 242 are sampled directly, and are amplified only as they are output to the analog-to-digital converter 246.

Therefore, in this more preferred embodiment of the sample and hold portion of the signal generating and processing circuit 240, the differential amplifier 245 does not need to amplify the high frequency signals output from the transducers 210, 220 and 230. Rather, the differential amplifier 245 is only required to amplify the very low frequency signals output from the sample and hold circuit 260 when one of the switches 265, 270, 275 or 280 is closed.

Figure 49:
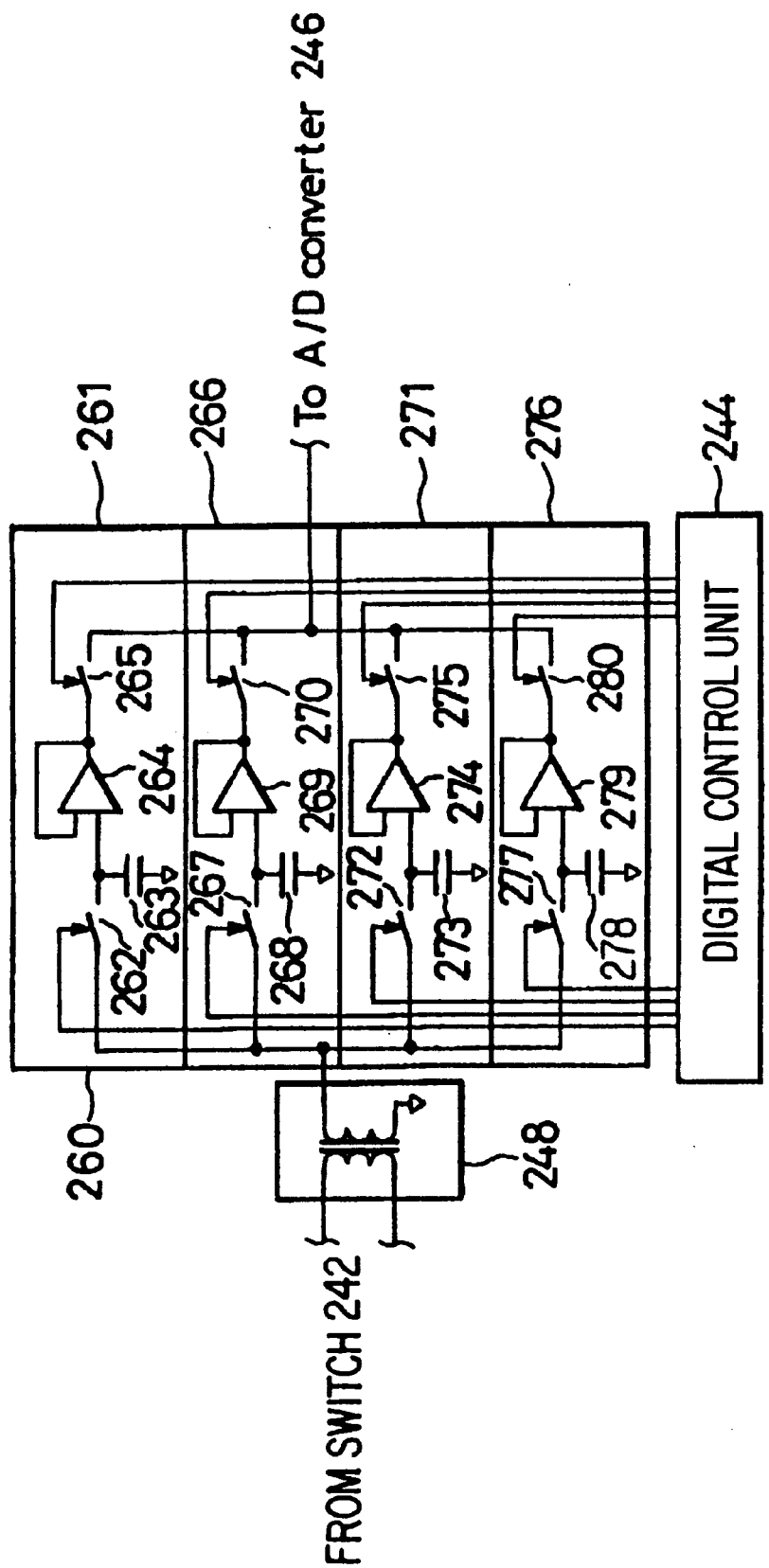
FIG. 49 shows a second preferred embodiment of the sample and hold portion of the signal generating and processing circuit of the inductive absolute position transducer of this invention.

In a second preferred embodiment of the sample and hold portion of the signal generating and processing circuit 240, as shown in FIG. 49, a transformer 248 replaces the amplifier 245 and is positioned on the high frequency side of the sample and hold circuit 260. The transformer 248 amplifies the high frequency signals from the receiver windings of the transducers 210, 220 and 230 output from the select switch 242 without introducing extra noise. Furthermore, the transformer has excellent linearity at high frequency.

The two outputs from the select switch 242 are connected to the two primary coil terminals of the transformer 248. One of the secondary coil terminals is connected to the input terminals of the switches 262, 267, 272 and 277 of the sample and hold circuit 260, while the other secondary coil terminal is connected to ground. Accordingly, the transformer 248 converts the differential signal between the outputs of the select switch 242 into a single-ended signal.

Figure 50:
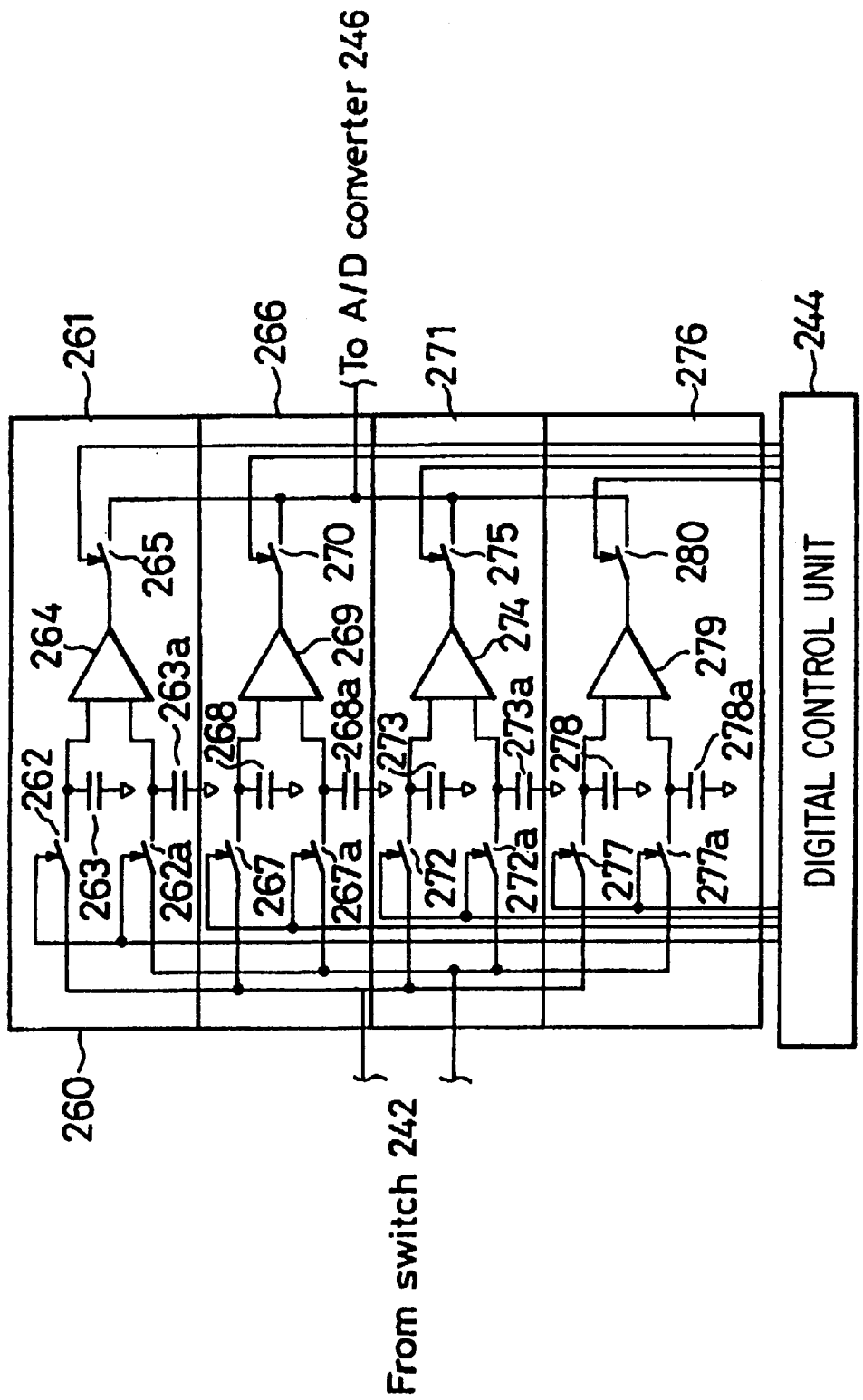
FIG. 50 shows a third preferred embodiment of the sample and hold portion of the signal generating and processing circuit of the inductive absolute position transducer of this invention.

As shown in FIG. 50, a third preferred embodiment of the sample and hold portion of the signal generating and processing circuit 240 uses neither the amplifier 245 nor the transformer 248 on the high frequency side of the sample and hold circuit 260. Rather, the high frequency signals from the receiver windings of the transducers 210, 220 and 230 output from the select switch 242 are input directly to the sample and hold circuit 260.

This third preferred embodiment of the sample and hold portion of the signal generating and processing circuit 240 uses a second preferred embodiment of the sample and hold circuit 260. In this second preferred embodiment of the sample and hold circuit 260, the subcircuits 261, 266, 271 and 276 of the sample and hold circuit 260 are modified to sample simultaneously both signals output from the select switch 242. That is, second switches 262a, 267a, 272a and 277a, and second capacitors 263a, 268a, 273a and 278a, are added to each of the subcircuits 261, 266, 271 and 276, respectively.

Each of the capacitors 262, 267, 272 and 277 are connected to one of the output terminals of the select switch 242, so that the capacitors 263, 268, 273 and 278 can store the output signal output from that terminal. Similarly, the switches 262a, 267a, 272a and 277a are connected to the other output terminal of the select switch 242, so that the capacitors 263a, 268a, 273a and 278a can store the output signal output from that terminal.

In this embodiment of the sample and hold circuit 260, each of the operational amplifiers 264, 269, 274 and 279 are set up as differential amplifiers, rather than as a buffer amplifier as in the first and second preferred embodiments of the sample and hold circuit 260. The signals stored in the capacitors 262 and 262a of the first sample and hold subcircuit are input to the operational amplifier 264. The output of the differential amplifier 264 is connected, via the switch 265, to the A/D converter 246. The other subcircuits 266, 271 and 276 are similarly modified compared to the first and second preferred embodiments.

Thus, when a position measurement is taken, the output signals from the receiver windings of one of the transducers 210, 220 or 230 are input, via the phase switch 243 and the select switch 242, directly into one of the subcircuits of the sample and hold circuit 260 and sampled and held. The stored signals are then buffered and amplified by the differential amplifier of the particular subcircuit and output to the A/D converter 246.

Furthermore, because the differential amplifiers 264, 269, 274 and 279 are downstream of the capacitors, they can be low frequency amplifiers, which are easier to design with a high degree of linearity. Additionally, they also convert the differential signal from the select switch 242 into a single-ended signal, so that additional circuit elements, such as the transformer, can be avoided.

Figure 51:
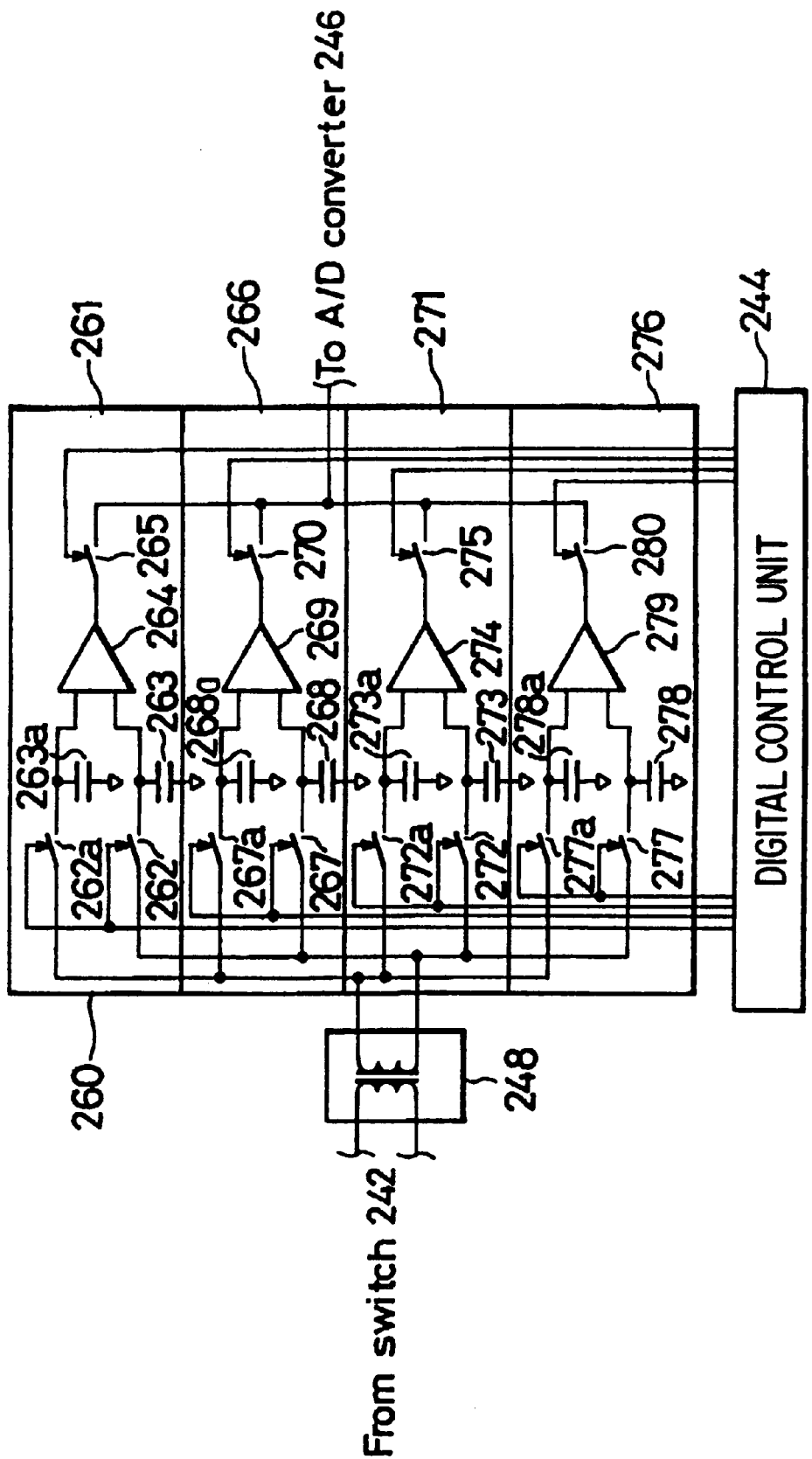
FIG. 51 shows a fourth preferred embodiment of the sample and hold portion of the signal generating and processing circuit of the inductive absolute position transducer of this invention.

In a fourth preferred embodiment of the sample and hold portion of the signal generating and processing circuit 240, as shown in FIG. 51, the transformer 248 is connected between the select switch 242 and the second preferred embodiment of the sample and hold circuit 260. Additionally, in this fourth preferred embodiment, the second terminal of the secondary coil of the transformer 248 is no longer connected to ground. Rather, it is connected to the second capacitors 262a, 267a, 272a and 277a of the subcircuits 261, 266, 271 and 276, respectively.

In this fourth preferred embodiment, the transformer improves the ability of the sample and hold portion of the signal generating and processing circuit 240 to reject common mode disturbances in the signals. Furthermore, the transformer does not introduce an extra noise or linearity errors.

One of the drawbacks to each of the first-fourth preferred embodiments of the sample and hold portion of the signal generating and processing circuit 240 is that the sample and hold circuit 260 is able to sample and hold the signals output from only one of the receiver windings of one of the transducers 210, 220 or 230 at a time. Sampling the two receiver windings of the same transducer serially, as in the first-fourth preferred embodiments of the sample and hold portion, degrades the position measurement accuracy, because the output of the second receiver winding will be sampled at a position which is not exactly at the same position at which the output of the first receiver winding was sampled.

Figure 52:
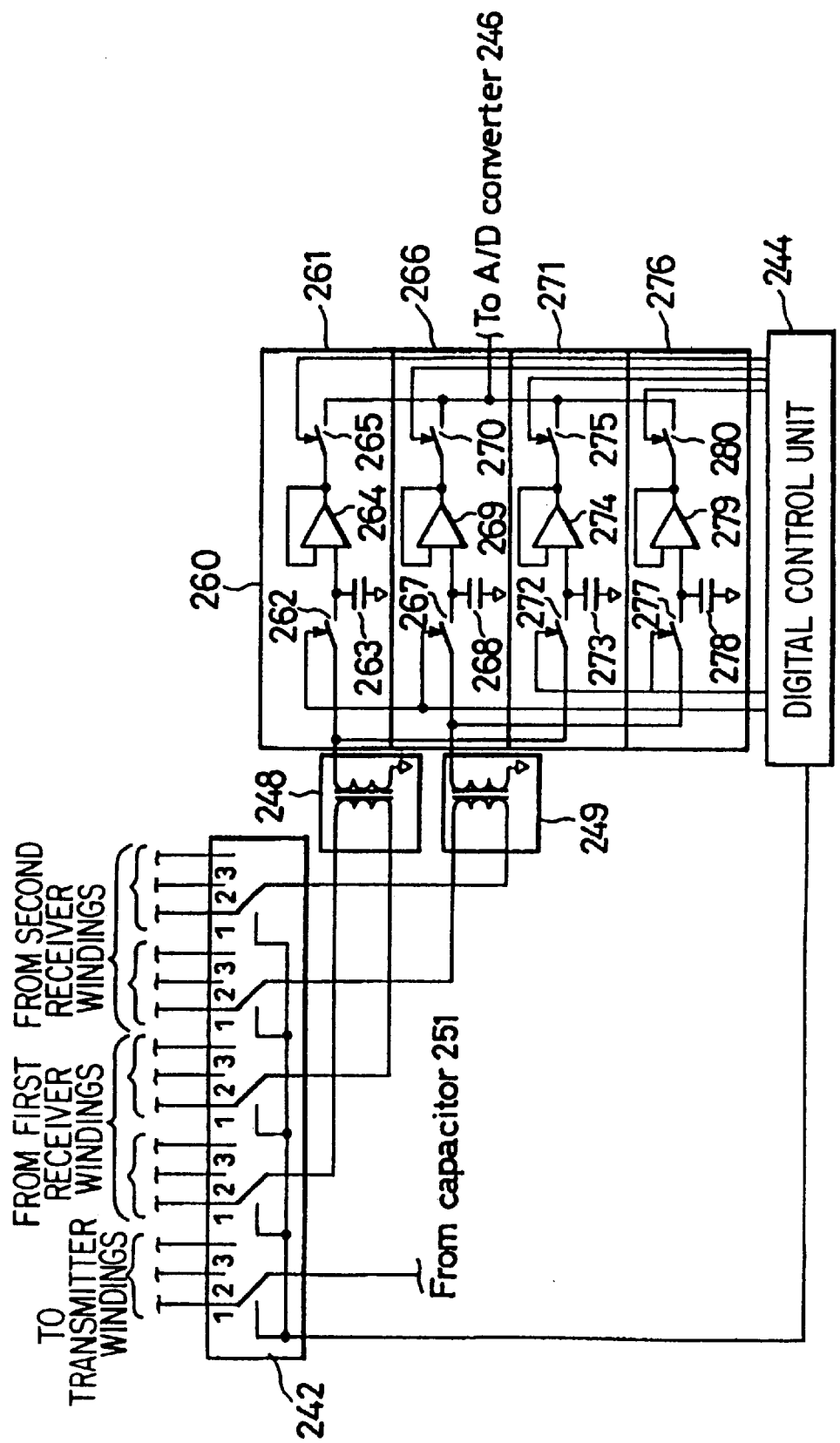
FIG. 52 shows a fifth preferred embodiment of the sample and hold portion of the signal generating and processing circuit of the inductive absolute position transducer of this invention.

In a fifth preferred embodiment of the sample and hold portion of the signal generating and processing circuit 240, as shown in FIG. 52, this drawback is overcome. In particular, in the fifth preferred embodiment of the sample and hold portion, the phase switch 243 is eliminated and the select switch is modified to include two additional subswitches, for a total of five subswitches. The receiver windings 214, and 216 of the first transducer 210 are thus directly connected to the "1" terminals of four of the subswitches of the select switch 242. Similarly, the receiver windings 224, and 226 of the second transducer 220 are directly connected to the "2" terminals of the four subswitches, while the four of the subswitches of the select switch 242. Similarly, the receiver windings 234, and 236 of the third transducer 230 are directly connected to the "3" terminals of the four subswitches.

The outputs of the two subswitches of the select switch 242 connected to the first receiver windings 214, 224 and 234 are connected to the terminals of the primary coil of the transformer 248. Similarly, the outputs of the two subswitches of the select switch 242 connected to the second receiver windings 216, 226 and 236 are connected to the terminals of the primary coil of a second transformer 249.

This fifth preferred embodiment also uses the first preferred embodiment of the sample and hold circuit 260. One of the terminals of the secondary coil of the transformer 248 is connected to the switches 262 and 272 of the first and third subcircuits of the sample and hold circuit 260, while the other terminal is connected to ground. Similarly, one of the terminals of the secondary coil of the second transformer 249 is connected to the switches 267 and 277 of the second and fourth subcircuits of the sample and hold circuit 260, while the other terminal is connected to ground.

Thus, when a position measurement is taken, and one of the transducers 210, 220 or 230 is driven, the output signal from the first receiver winding of that transducer is sampled and held by the first or third subcircuit, while the output signal from the second receiver winding of that transducer is simultaneously sampled and held by the second or fourth subcircuit. Because the outputs from the receiver windings are sampled at the same time, the sampled outputs correspond to the same position. Thus, the positional accuracy of the measurement is not degraded.

Another of the drawbacks to each of the first-fourth preferred embodiments of the sample and hold portion of the signal generating and processing circuit 240 (and to the fifth preferred embodiment as well) is that the sample and hold circuit 260 is able to sample and hold the signals output from the receiver windings of only one of the transducers 210, 220 or 230 at a time. Thus, while the fifth preferred embodiment overcomes the positional error introduced when the individual receiver windings of a single transducer are sampled serially, the positional accuracy of the coarse and medium wavelength position measurements is also degraded, for similar reasons, when the transducers themselves are serially sampled. That is, sampling the receiver windings of two transducers serially, as in the first-fifth preferred embodiments of the sample and hold portion, degrades the position measurement accuracy, because the output of the receiver windings of the second transducer to be sampled will be sampled at a position which is not exactly at the same position at which the output of the receiver windings of the first transducer to be sampled were sampled.

Figure 53:
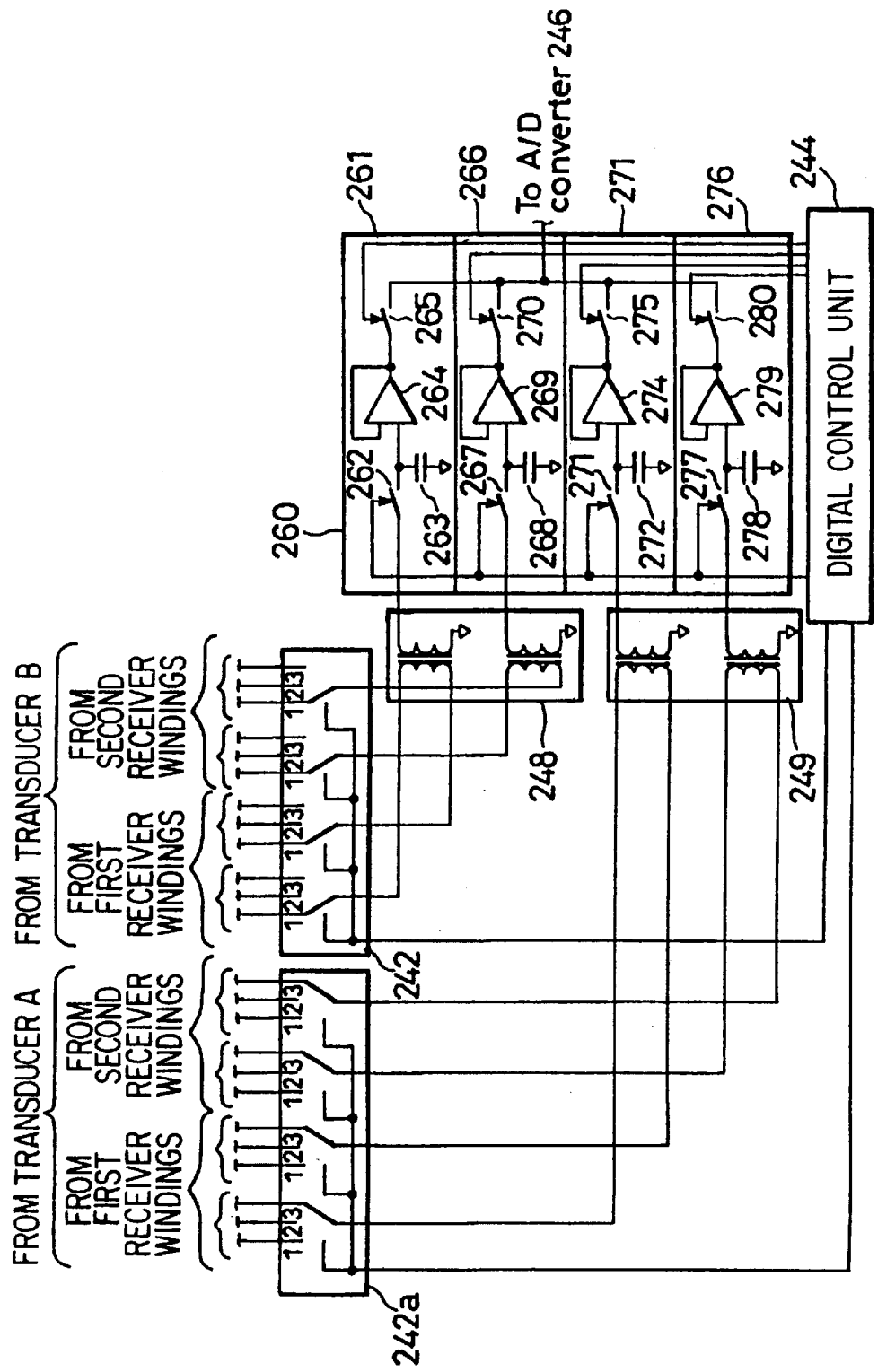
FIG. 53 shows a sixth preferred embodiment of the sample and hold portion of the signal generating and processing circuit of the inductive absolute position transducer of this invention.

In a sixth preferred embodiment of the sample and hold portion of the signal generating and processing circuit 240, as shown in FIG. 53, this drawback is overcome. In particular, in the sixth preferred embodiment of the sample and hold portion, the select switch 242 is modified and the phase switch 243 is again eliminated.

In particular, the select switch 242 is modified to delete the subswitch between the signal generator 250 and the transmitter windings 212, 222 and 232. Thus, all three transmitter windings are directly connected to the signal generator 250 and driven during each position measurement. Furthermore, the select switch 242 is also modified as in the fifth preferred embodiment of the sample and hold portion, so that it contains four subswitches directly connected to the receiver windings 214, 216, 224, 226, 234 and 236. In addition, a second select switch 242a also contains four subswitches directly connected to the receiver windings 214, 216, 224, 226, 234 and 236. The subswitches of the first and second select switches 242 and 242a are controlled such that each select switch is connected to a different one of the transducers 210, 220 and 230.

Finally, the first and second transformers 248 and 249 are modified so that they each contain two transformer circuits.

Each one of the transformer circuits of the transformer 248 is connected to two of the subswitches of the first select switch 242, while each one of the transformer circuits of the second transformer 249 is connected to two of the subswitches of the second select switch 242a.

In particular, the terminals of the primary coil of one of the transformer circuits of the transformer 248 are connected to the subswitches of the first select switch that is connected to the first receiver winding 214, 224 or 234. The terminals of the primary coil of the other transformer circuit of the transformer 248 are connected to the subswitches of the first select switch that is connected to the second receiver winding 216, 226 or 236. Similarly, the terminals of the primary coil of one of the transformer circuits of the second transformer 249 are connected to the subswitches of the first select switch that is connected to the first receiver winding 214, 224 or 234. The terminals of the primary coil of the other transformer circuit of the transformer 249 are connected to the subswitches of the first select switch that is connected to the second receiver winding 216, 226 or 236.

One terminal of the secondary coil of each of the transformer circuits of the transformers 248 and 249 is connected to ground. The other terminal of the secondary coil of one of the transformer circuits of the transformer 248 is connected to the switch 262. The other terminal of the secondary coil of the other transformer circuit of the transformer 248 is connected to the switch 267. Similarly, the other terminal of the secondary coil of one of the transformer circuits of the second transformer 249 is connected to the switch 272. The other terminal of the secondary coil of the other transformer circuit of the second transformer 249 is connected to the switch 277.

With this structure, this sixth preferred embodiment of the sample and hold portion is able to simultaneously sample both receiver windings of two transducers. Thus, all of the samples are taken when at the same position. Therefore, the errors in the position measurements for the coarse and medium wavelength measurements that arise when the output signals from two transducers are sampled serially are eliminated.

Finally, it should be appreciated that any of the above-outlined embodiments of the sample and hold portion of the signal generating and processing circuit 240 can be used with any of the other embodiments of the inductive absolute position transducer of this invention outlined below. Furthermore, any modifications to any of the above-outlined embodiments of the sample and hold portion of the signal generating and processing circuit 240 necessary to incorporate it into these other embodiments are within the ordinary skill in the art and thus will not be discussed.

Figure 11:
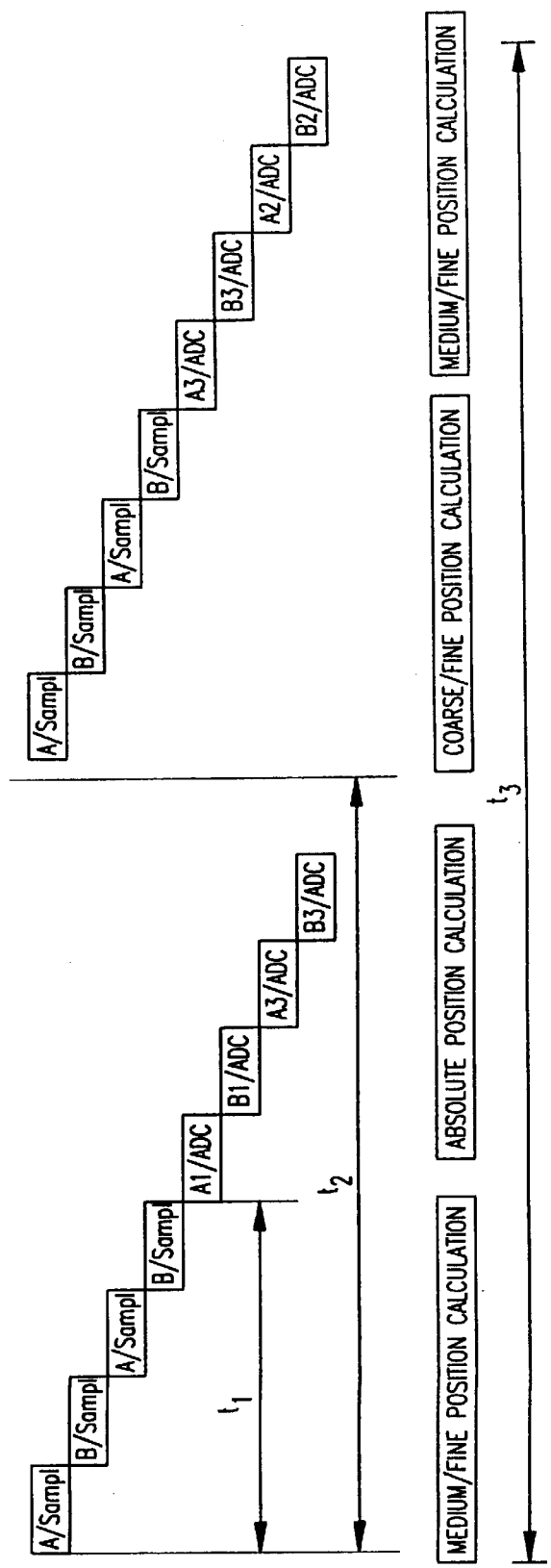
FIG. 11 is a timing diagram showing the signal collection and processing operations of the electronic circuit of FIG. 7.

As shown in the timing diagram of FIG. 11, the receiver output signals from the inductive absolute position transducer 200 are combined to produce medium and coarse absolute position measurements. Each of the measurements for the medium and coarse positions are preferably sampled at nearly the same time with each other because, when the read head moves rapidly relative to the scales 218, 228 and 238, the motion generates an undesirable (erroneous) spatial phase displacement corresponding to the elapsed delay time. This error is in addition to the desired spatial phase value, which is due solely to the nominal position of the transducer when the measurement cycle is initiated.

By using four parallel sample and hold circuits, four samples can be taken at nearly the same time during a sampling interval $t_1$. These four samples include one sample from each of the receiver windings 214 and 216, 224 and 226, or 234 and 236 for two of the three transducers 210, 220 or 230. For example, within the sampling time interval $t_1$, the four sample and hold subcircuits 261, 266, 271 and 276 can sample the signals output from the receiver windings 214, 216, 234 and 236, respectively.

The sampling time interval $t_1$ is limited only by the signal generator circuit 250, the differential amplifier 245, and the sample and hold circuit 260. Each sample can reasonably take one microsecond to take. Thus, the sampling time interval $t_1$ required to take four samples is approximately 4 $\mu$s. Furthermore, a speed of 1 m/s is equal to 1 mm/ms or 1 $\mu$m/$\mu$s. Therefore, at this speed, the read head 202 moves a total distance of 4 $\mu$m relative to the scale 204 during the sampling time interval $t_1$. This is about 1/640 of any of the three wavelengths $\lambda_1$, $\lambda_2$ or $\lambda_3$ in the first preferred embodiment of the inductive absolute position transducer. Therefore, this distance has at most a negligible effect on the accuracy of the medium and coarse mode calculations.

To produce fine mode measurements, which require greater accuracy, only one of the fine transducers 210 or 230 is used for all four samples. For example, the receiver output signals from the receiver windings 214 and 216 are taken twice and stored in the sample and hold circuit 260. As a result, one sample is taken from each receiver winding every two microseconds. This has no significant effect on the accuracy of the fine mode position measurements.

As shown in FIG. 11, the microprocessor 241 samples the receiver output signals from the first and third transducers 210 and 230 during the sampling time interval $t_1$. The buffer amplifiers 264, 269, 274 and 279 store the receiver output signals consecutively. Then, the A/D converter 246 consecutively converts the four sampled signals into digital values and inputs the digital value to the microprocessor 241. Next, the microprocessor 241 processes the amplified signals while the next group of signals are sampled.

Even though certain signals must be sampled within a very short interval, the A/D converter 246 and the microprocessor 241 do not need to process these signals within the short interval. Instead, the A/D converter 246 and the microprocessor 241 can process the signal samples over a substantially longer time interval than four microseconds, as long as the signal samples to be combined to produce a given calculation (fine, medium or coarse mode calculations), are taken nearly simultaneously during the sampling time interval $t_1$. Thereafter, the A/D converter 246 digitizes the values and the microprocessor 241 calculates the absolute position during a longer time interval $t_2$, as shown in FIG. 11. As a result, the inductive absolute position transducer 200 of this invention can tolerate a latency between sampling the signals from the receiver windings and the absolute position calculations. Only a small error results from this latency.

For instance, a time interval of $t_2$ equal to 100 $\mu$s and a speed of 1 m/s means the inductive absolute position transducer 200 will move less than 0.1 mm during the interval $t_2$. The position calculated from the samples taken will correspond closely to the position at the time of sampling. The absolute position value output by the microprocessor 241 will, however, occur after the inductive absolute position transducer 200 has traveled approximately an additional 0.1 mm. This output latency of 0.1 mm at 1 m/s is not significant for most hand-held applications.

However, even this distance must be accounted for in specialized applications that require providing the position information at real time during movement of the inductive absolute position transducer 200. It should be appreciated that, by increasing the cost and/or the complexity, several sections of the signal generating and processing circuit 240 could be duplicated and operated simultaneously, to speed up operation and reduce these latency effects.

Figure 12:
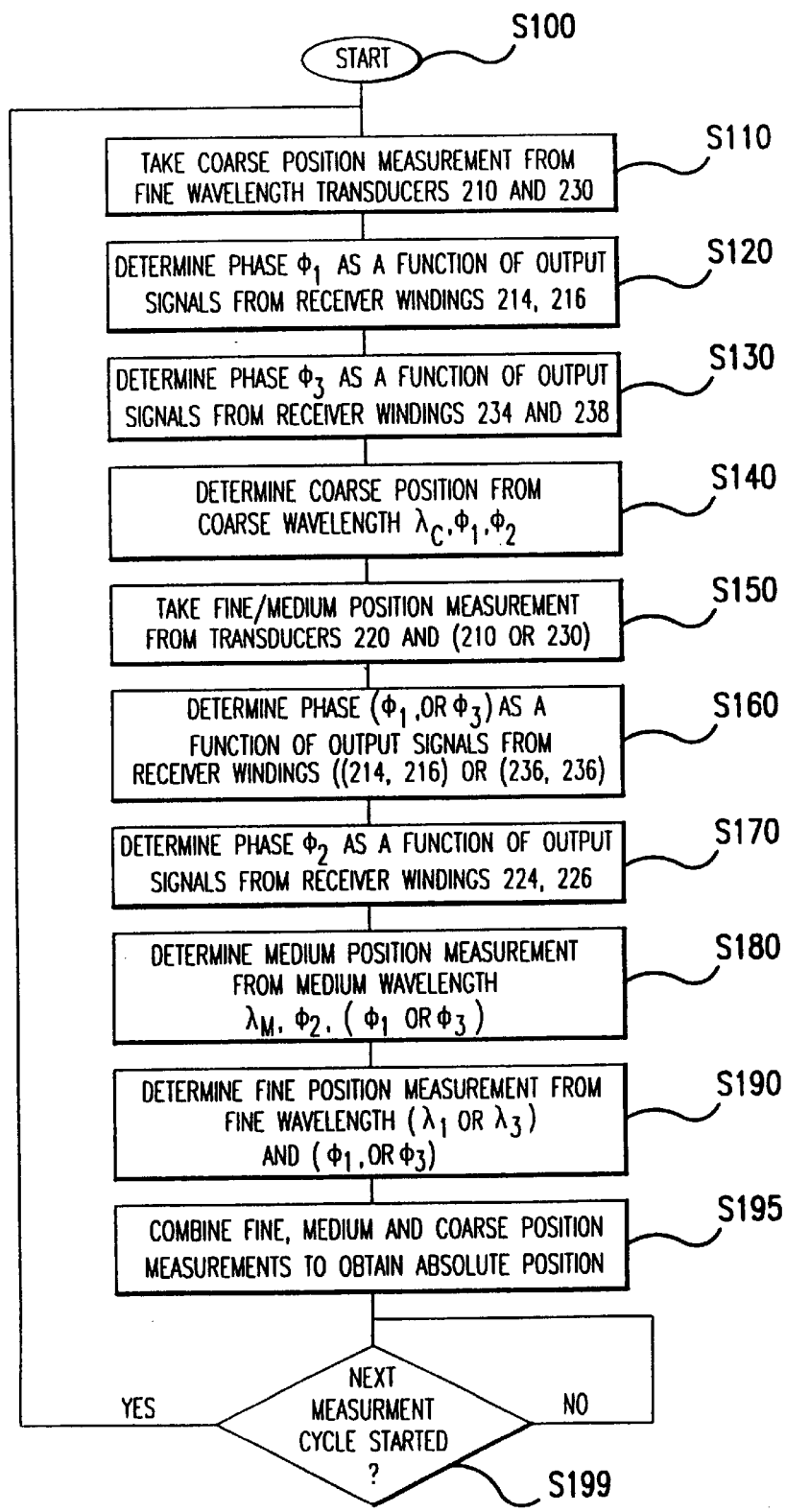
FIG. 12 is a flowchart outlining a method for determining absolute position using the first preferred embodiment of the inductive absolute position transducer of this invention.

The sampling sequence shown in FIG. 11 performed by the microprocessor 241 is more clearly illustrated in the flowcharts of FIGS. 12–15. FIG. 12 shows the overall measurement routine performed by the microprocessor 241.

As shown in FIG. 12, the measurement control program begins in step S100. After starting step S100, control continues to step S110. In step S110, the signals for a fine/coarse measurement are taken by sampling the receiver windings 214, 216, 234 and 236 of the two fine wavelength transducers 210 and 230. Control then continues to step S120.

In step S120, the microprocessor 241 determines a phase $\phi_1$ based on the relative amplitudes of the signals from the receiver windings 214 and 216 of the fine wavelength transducer 210. Next, in step S130, the microprocessor 241 determines a phase $\phi_3$ based on the relative amplitudes to the signals from the receiver windings 234 and 236 of the fine wavelength transducer 230. Control then continues to step S140.

In step S140, the microprocessor 241 determines a coarse position $P_C$ of the inductive absolute position transducer 200 as:

$$P_C = \lambda_C(\phi_3 - \phi_1)/2\pi$$

where:

$\phi_1$ and $\phi_3$ are the phases determined in steps 120 and 130, respectively; and $\lambda_C$ is the coarse wavelength.

Control then continues to step S150.

In step 150, the microprocessor 241 generates measurement signals from the receiver windings 214, 216, 224 and 226 using the fine transducer 210 and the medium transducer 220. The signals output from the receiver windings 214, 216, 224 and 226 are stored in the sample and hold subcircuits 261, 266, 271, and 276, respectively, of the sample and hold circuit 260. The held signals are then converted to digital signals by the A/D converter 246. Control then continues to step S160.

In step S160, the microprocessor 241 recalculates the phase $\phi_1$ based on a relative amplitude of the signals output from the receiver windings 214 and 216 of the fine wavelength transducer 210. Next, in step S170, the microprocessor 241 determines the phase $\phi_2$ based on the relative amplitude of the signals from the receiver windings 224 and 226 of the medium wavelength transducer 220. Control then continues to step S180.

In step S180, the microprocessor 241 determines a medium position $P_M$ of the inductive absolute position transducer 200 as:

$$P_M = \lambda_{M1} * (\phi_2 - \phi_1)/2\pi$$

where:

$\lambda_{M1}$ is the medium wavelength and $\phi_1$ and $\phi_2$ are the phases determined in steps S160 and S170.

Alternatively, $\lambda_{M3}$ and $\phi_3$, defined previously, can be used in place of $\lambda_{M1}$ and $\phi_1$ respectively, to calculate $P_M$, as indicated in FIG. 12. Control then continues to step S190.

In step S190, the fine mode linear position $P_F$ of the inductive absolute position transducer 200 is determined from the wavelength $\lambda_1$ and the phase $\phi_1$ of the first transducer 210.

The fine mode linear position calculation is preferably based on the transducer 210, when the position is to be computed in inches, and on the transducer 230, when the position is to be computed in millimeters. Assuming the microprocessor 241 is using the third transducer 230, the microprocessor 241 has already determined, in step S160, the spatial phase $\phi_3$ based on the relative amplitude of the signals from the receiver windings 234 and 236 of the third transducer 230. Thus, the microprocessor 216 determines, as part of step S190, a fine mode linear position $P_F$ of the inductive absolute position transducer 200, within the local medium wavelength $\lambda_3$, as:

$$P_F = \phi_3 * (\lambda_3/2\pi).$$

In step S195, the microprocessor 241 combines the fine, medium and coarse position measurements to determine an accurate and total absolute position of the inductive absolute position transducer 200. The inductive absolute position transducer 200 has a maximum absolute measuring range of one coarse wavelength, which includes multiple medium wavelengths. The coarse position value $P_C$ is the first estimate of the absolute position. The microprocessor 241 analyzes the coarse position value $P_C$ and determines to which one of the multiple medium wavelengths (the "nth" medium wavelength) the coarse value $P_C$ corresponds. In general, $(P_C/\lambda_M)$ will equal $(n*\lambda_M) + R_M$, where $R_M$ is the medium remainder.

The microprocessor 241 uses the medium position value $P_M$. The medium position value $P_M$ is the position within the local medium wavelength. In principle, the medium position value $P_M$ should equal $R_M$. However, the medium mode computation is related to a shorter wavelength. Thus, it is assumed to be more accurate than the coarse wavelength computation. Therefore, the microprocessor 241 computes an improved estimate of the absolute position as $P_M + (n*\lambda_M)$.

The microprocessor 216 then analyzes the value $P_M + (n*\lambda_M)$ and determines which of the multiple fine wavelengths (the "Nth" fine wavelength) the value "$P_M + (n*\lambda_M)$" corresponds to. In general, $P_M + (n*\lambda_M)$ will equal $(N*\lambda_F) + R_F$, where $R_F$ is the fine remainder. Next, the microprocessor 241 uses the fine position value $P_F$. The fine position value $P_F$ is the position within the local fine wavelength.

In principle, this fine position value $P_F$ should be equal to $R_F$. However, the fine mode measurement and computation is derived from a single transducer, as opposed to a relation between transducers, and is based on a shorter wavelength. Thus, it is assumed to be more accurate than the medium wavelength measurement and computation. Therefore, the microprocessor 241 computes an improved final estimate of the absolute position as $(N*\lambda_F) + P_F$ to determine the absolute position of the scales 218, 228 and 238 relative to the read head 204. This corresponds to the absolute position of the inductive absolute position transducer 200.

Furthermore, in step S195, the microprocessor 241 outputs the determined absolute position to an appropriate output device, such as a display 247. Control then continues to step S199.

In step S199, the microprocessor determines if a new measurement cycle is started. If so, control jumps back to step S110 where, when the next measurement cycle begins, the microprocessor 241 again inputs measurement signals for determining the fine/coarse measurement. Otherwise, control loops back to step S199.

Figure 13:
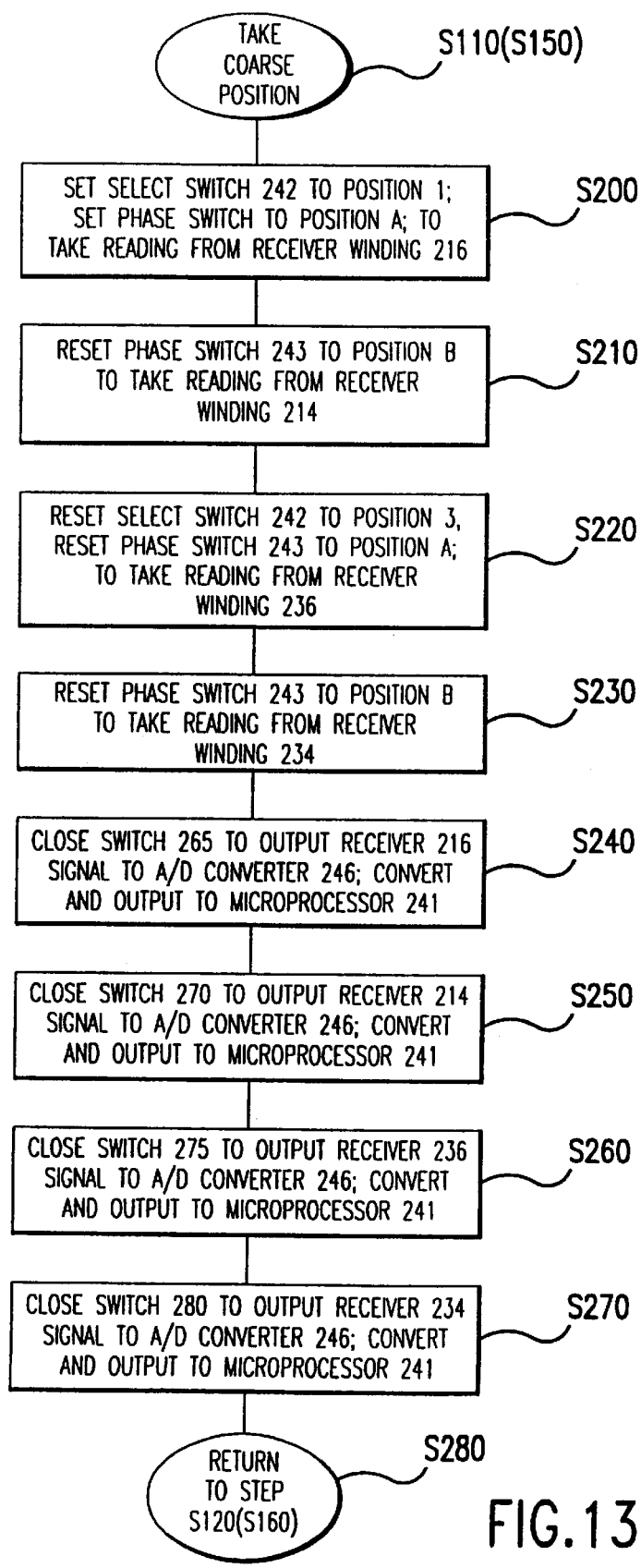
FIG. 13 is a flowchart outlining in greater detail the method for collecting fine and coarse position signals.

FIG. 13 shows the fine/coarse measurement step S110 in greater detail. As shown in FIG. 13, beginning in step S110, control continues to step S200. In step S200, the select switch 242 is set to position 1, while the phase switch 243 is set to position A. Accordingly, the signal generator 250 outputs the oscillating drive signal to the transmitter winding 212. The measurement signal is accordingly read from the receiver winding 216. The received signal from the receiver winding 216 is amplified by the amplifier 245 and stored in the first sample and hold subcircuit 261. Control then continues to step S210.

In step S210, the phase switch 243 is switched from position A to position B. Accordingly, when the signal generator 250 outputs the drive signal to the transmitter winding 212, the measurement signal is read from the receiver winding 214. The received signal is amplified by the amplifier 245 and stored in the second sample and hold subcircuit 266. Control then continues to step S220.

In step S220, the select switch 242 is set to position 3, while the phase switch 243 is reset to position A. Accordingly, when the signal generator 250 outputs the drive signal, the drive signal is routed to the transmitter winding 232. The measurement signal is thus read from the receiver winding 236. The received signal is amplified by the amplifier 245 and stored in the third sample and hold subcircuit 271. Next, in step S230, the phase switch 243 is again switched from position A to position B. Accordingly, when the signal generator 250 outputs the drive signal to the transmitter winding 232, the measured signal is now read from the receiver winding 234. The received signal is amplified by the amplifier 245 and stored in the fourth sample and hold subcircuit 276. Control then continues to step S240.

In step S240, the switch 265 of the first sample and hold subcircuit 261 is closed, providing the sampled signal held on the capacitor 263 to the A/D converter 246. The A/D converter 246 converts the analog measurement signal from the receiver winding 216 to a digital signal and outputs the digital signal to the microprocessor 241.

In step S250, the switch 270 of the second sample and hold subcircuit 266 is closed. This outputs the sampled measurement signal output from the receiver winding 214 and held on the second capacitor 268 to the A/D converter 246. The A/D converter 246 converts the analog signal to a digital signal and outputs the digital signal to the microprocessor 241. Control then continues to step S260.

In step S260, the switch 275 of the third sample and hold subcircuit 271 is closed. This outputs the sampled signal output from the receiver winding 236, which is held on the third capacitor 273, to the A/D converter 246. The A/D converter 246 converts the analog measurement signal to a digital signal and outputs the digital signal to the microprocessor 241. Control then continues to step S270.

In step S270, the switch 280 of the fourth sample and hold subcircuit 276 is closed. This connects the capacitor 278 to the A/D converter 246. The capacitor 278 holds the sampled value of the measurement signal from the receiver winding 234. The A/D converter 246 converts the analog signal to a digital signal and outputs the digital signal to the microprocessor 241. Then, in step S280, control returns to step S120.

It should be appreciated that steps similar to steps 200–280 are also performed in step S150 to take the medium position measurement. In this case, in steps S220 and S230, the select switch 242 is set to position 2, rather than position 3. It should also be appreciated that when step 200 is entered via step S150, step S280 returns control to step S160.

Figure 14:
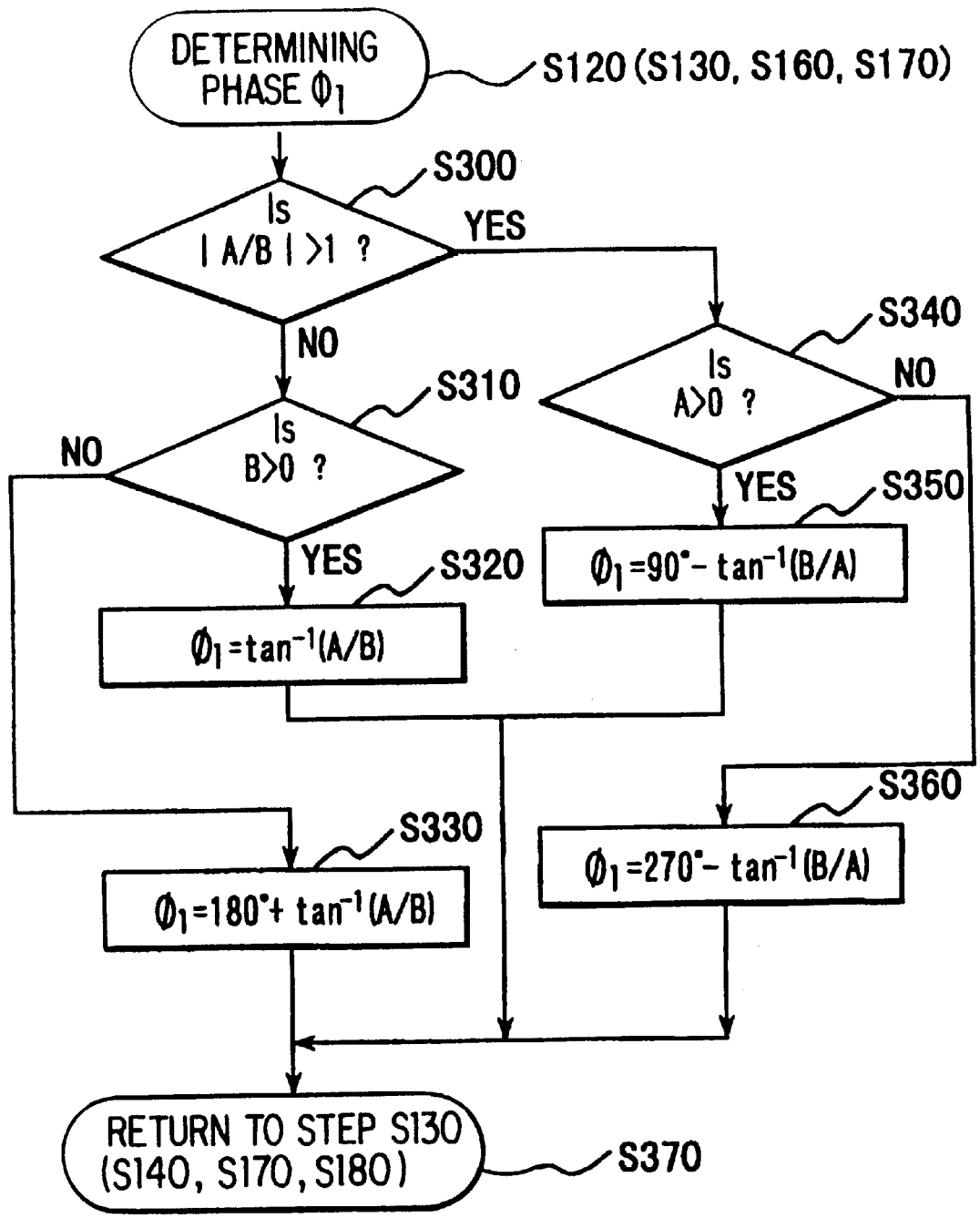
FIG. 14 is a flowchart outlining in greater detail the method to determining a phase angle between two phases of receiver windings.

FIG. 14 shows step S120 in greater detail. In particular, beginning in step S120, control continues to step S300. In step S300, the microprocessor 241 divides the signal sampled during step S200 (referred to as signal A due to the position of the phase switch 243), by the value of the signal sampled during step S210 (referred to as signal B due to the position of the phase switch 243). If the absolute value of the quotient is equal to or less than 1, control continues from step S300 to step S310. Otherwise, if the absolute value of the quotient is less than 1, control jumps to step S340.

In step S310, the microprocessor determines if the signal B is positive. If so, control continues to step S320. In step S320, the phase is determined as the inverse tangent of signal A divided by signal B (i.e., as $(\tan^{-1}(A/B))$). Control then jumps to step S370.

However, if, in step S310, signal B is negative, control jumps to step S330. In step S330, the phase is determined as $(180°+(\tan^{-1}(A/B))$. Control then again jumps to step S370.

If, in step S300, the absolute value of A is greater than the absolute value of B (i.e., the absolute value of A/B is greater than 1), control jumps to step S340. In step S340, the microprocessor 241 determines if signal A is positive. If so, control continues to step S350. In step S350, the phase is determined as $90°-(\tan^{-1}(B/A))$. Control then again jumps to step S370.

However, in step S340, if signal A is negative, control jumps to step S360. In step S360, the phase is determined as $270°-(\tan^{-1}(B/A))$. Control then continues to step S370.

In step S370, control returns to step S130. It should be appreciated that steps S130, 160 and 170 also call this subroutine. That is, any of $\phi_1$, $\phi_2$, or $\phi_3$ can be calculated by this subroutine, which implements Table 1. In those cases, the measured signals corresponding to the signal A and to the signal B will be different depending on the position of the select switch 242. Furthermore, step S370 will return control to steps S120, S130, S160 and S170 depending on which step called this subroutine.

Figure 15:
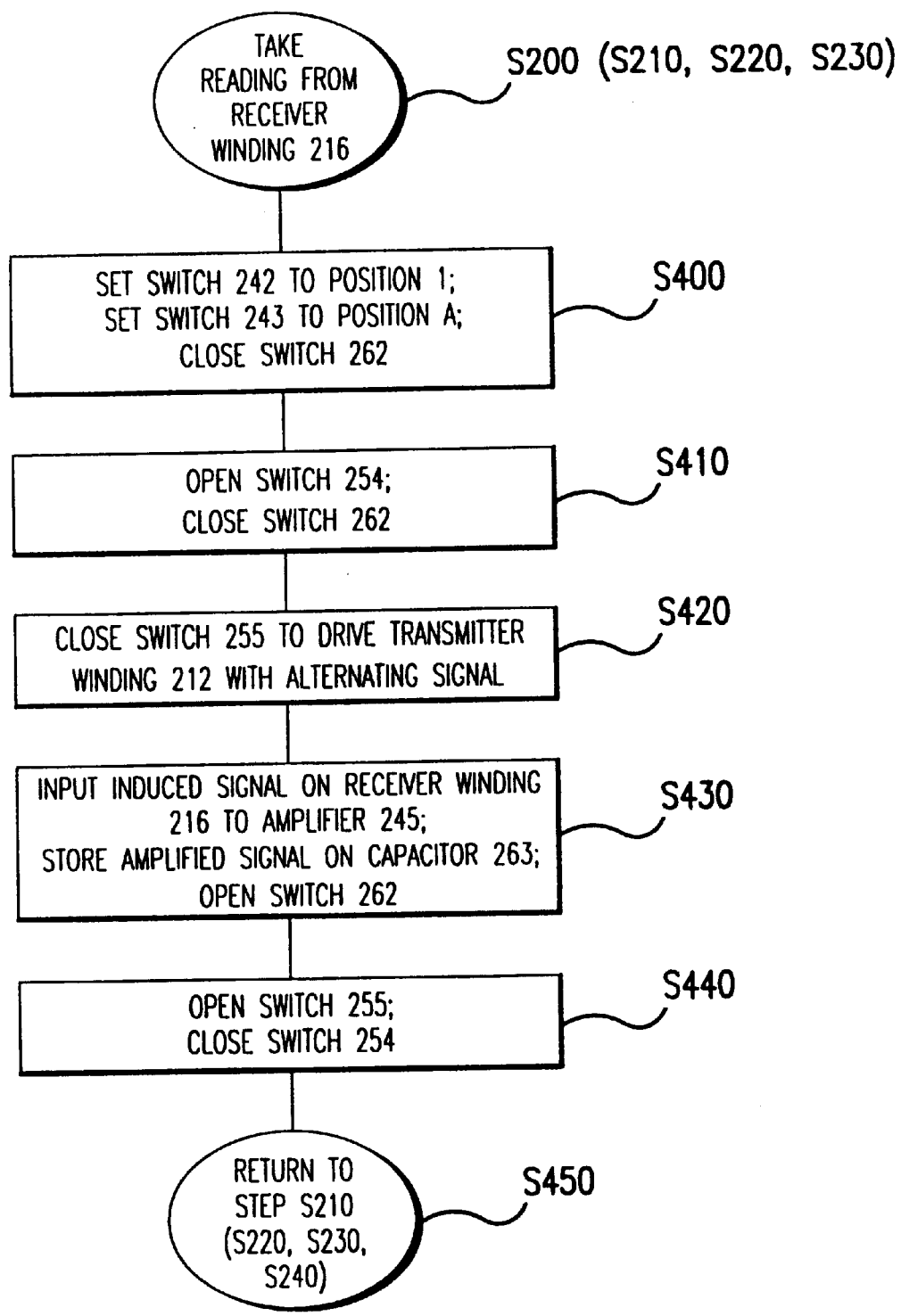
FIG. 15 is a flowchart outlining in greater detail the method for transmitting and receiving signals to and from the transducer of the electronic circuit of FIG. 9.

FIG. 15 shows step S200 in greater detail. As shown in FIG. 15, beginning in step S200, control continues to step S400. In step S400, the select switch 242 is set to position 1, while the phase switch 243 is set to position A. Furthermore, switch 262 of the first sample and hold subcircuit 261 is closed. Control then continues to step S410.

In step S410, switch 254 is opened and switch 262 is closed. Control then continues to step S420. In step S420, switch 255 is closed to drive the transmitter winding 212. Control then continues to step S430.

In step S430, the receiver winding 216, which is inductively coupled to the transmitter winding 212, has a varying amplitude voltage signal induced on it. The received signal is fed by the phase switch 243 and the select switch 242 to the amplifier 245, where it is amplified. The amplified signal is transmitted from the amplifier 245 by the closed first switch 262 to the first capacitor 263 of the first sample and hold subcircuit 261. Then, the first switch 262 is opened synchronously with the signal peak, as shown in FIG. 10. Then, control continues to step S440.

In step S440, the switch 255 is opened and the switch 254 is closed. Control then continues to step S450, which returns control to step 3210.

It should be appreciated that this subroutine will be called by steps S210, S220 and S230. When called by each of these steps, the switch positions for the select switch 242 and the phase switch 243 in step S400 will be set to energize the particular transmitter winding 212, 222 or 232 and to receive measurement signals from the receiver windings 214, 216, 224, 226, 234 or 236 depending on the calling step. It should also be appreciated that when steps 200–280 are called by step S150 rather than S110, when each of steps S200–S230 call step S400, the switch position will be set appropriately. Similarly, different ones of the first-fourth switches 262, 267, 272 and 277 of the sample and hold circuit 260 will be closed to store the received signal to different ones of the sample and hold subcircuits 261, 266, 271 and 276, respectively.

The microprocessor 241 outputs an appropriate signal to the display 247 to display the absolute position. A user selectable switch (not shown) coupled to the microprocessor 241 allows a user to select one of two length unit modes to be displayed. As mentioned above, to simplify the circuits and the computational complexity, the microprocessor 216 selects the transducer 210 for fine position measurement computations related to "inch mode" or the transducer 230 for fine position measurement computations related to "millimeter mode." The computed position can also or alternatively be output to other systems, such as, for example, a statistical process control system or a servo positioning system.

The above-described first preferred embodiment of the inductive absolute position transducer 200 of this invention determines an absolute position within a range equal to the longest wavelength $\lambda_c$. Thus, it has a range of approximately 325 mm in the first preferred embodiment. In addition, using known interpolation routines, the microprocessor 241 can provide a measurement resolution that is well below either of the fine wavelengths $\lambda_1$ or $\lambda_3$.

The size and/or shape of the receiver can be modified while retaining the major benefits of the inductive absolute position transducer of this invention. Additionally, other layouts or geometries for the receiver windings and the flux disrupters 170 can be used while still producing adequate results. The signals generated in the receiver windings are weak compared to the strong magnetic field generated by the transmitter windings. Therefore, while the overall size of the read head 204 may be changed, the area of the loops 191 and 192 of the receiver windings should be as similar as possible to minimize signal offset errors, and to reject stray input signal noise.

If necessary, to compensate for manufacturing tolerances or other constraints tending to create a signal offset, the size and shape of the loops 191 and 192 can be intentionally altered to "tune" the output from the receiver windings. They are tuned so that, in the absence of the flux disrupters 170, the nominal output of the receiver windings will be zero. Also, if a sinusoidal position signal is desired, the shapes and wavelengths can be selected to spatially filter the received fields and thus reduce harmonic distortions.

Additionally, the term "loops" refers to any substantially enclosed areas that are circular, rectangular, trapezoidal, triangular, or sinusoidal. Furthermore, a receiver winding can be a sensing conductor or a single conductive path having a prescribed periodic pattern or spatial variations along the measuring axis 300.

Sensitivity to misalignment of the read head 204 by rotation about an axis perpendicular both to the plane of the receiver windings and to the measuring axis 300 ("yaw") is one disadvantage of the inductive absolute position transducer 200. Yaw will displace the receiver windings in the transducer 210 relative to the receiver windings in the transducer 230, along the measuring axis 300. As a result, the spatial phase relation between the wavelengths $\lambda_1$ and $\lambda_3$ will be disturbed from the assumed design value, resulting in somewhat erroneous coarse mode position measurements.

Additionally, the inductive absolute position transducer 200 suffers from practical limitations regarding the absolute position measurement range. One means to extend the range is to add additional transducers with different wavelengths to the inductive absolute position transducer 200. However, additional transducers increase the cost and size of the inductive absolute position transducer 200. Alternatively, to increase the range, the accuracy of the circuits and the accuracy of the fabrication of the transducers 210, 220 and 230 can be increased. This allows higher ratios (coarse/medium, medium/fine), and higher levels of interpolation to be used. However, arbitrarily increasing the accuracy of the transducers 210, 220, and 230 is generally subject to severe economic constraints.

Figure 16:
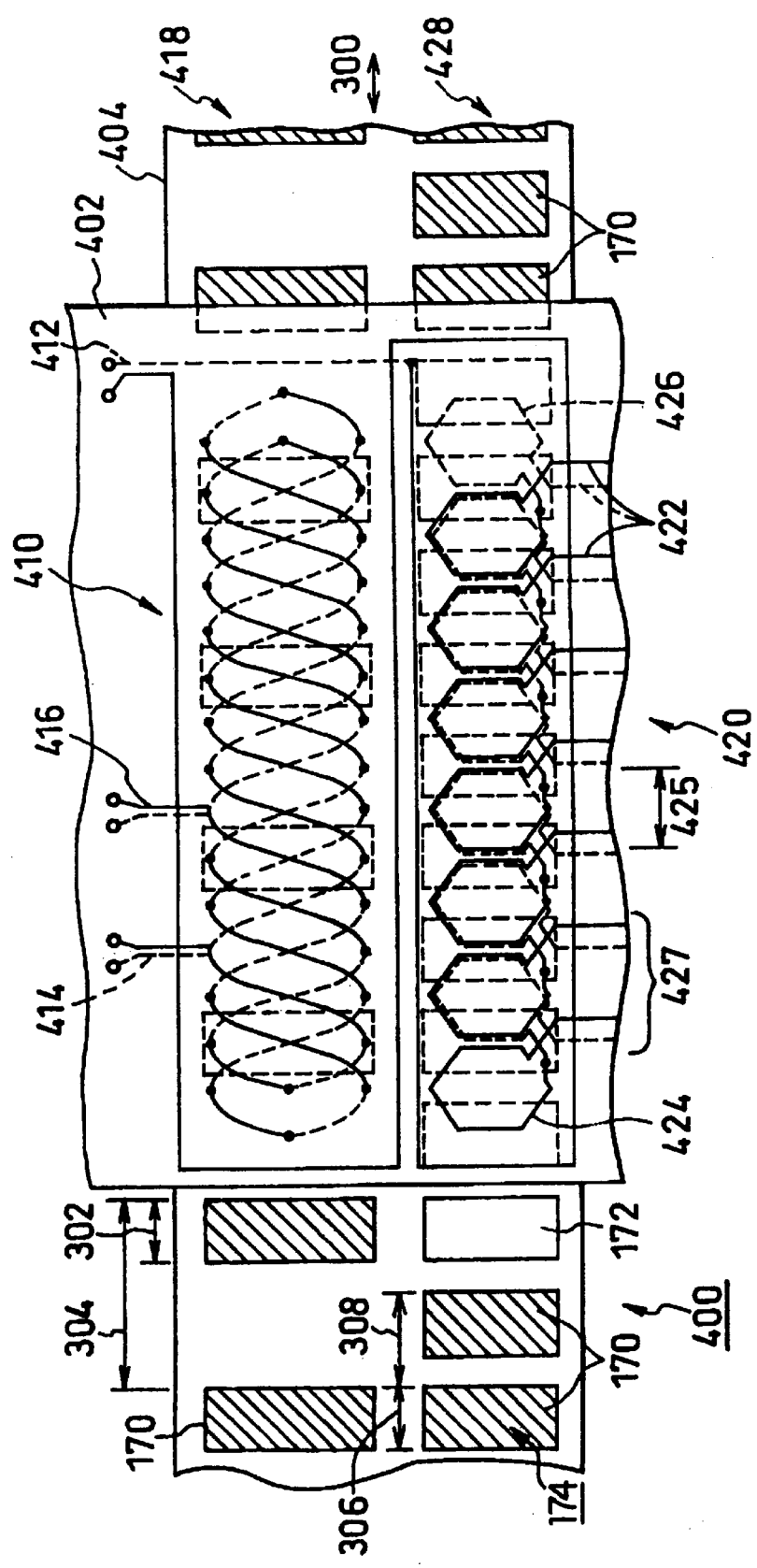
FIG. 16 is a plan view of a second preferred embodiment of the inductive absolute position transducer of this invention.
Figure 17:
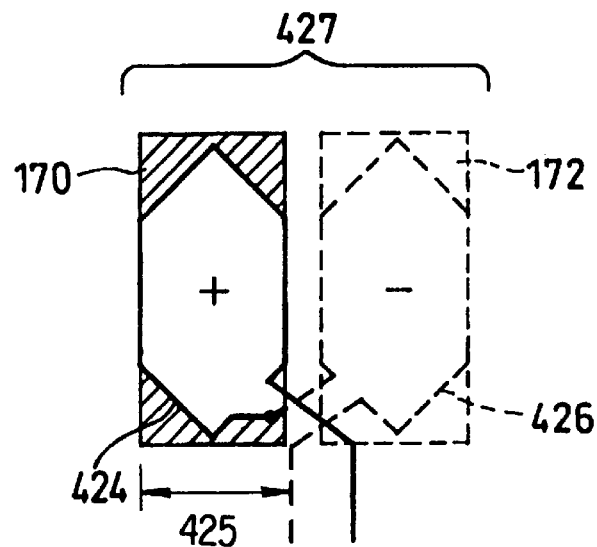
FIG. 17 is an enlarged plan view of a portion of the scale and code sensor receiver winding shown in FIG. 16.
Figure 18:
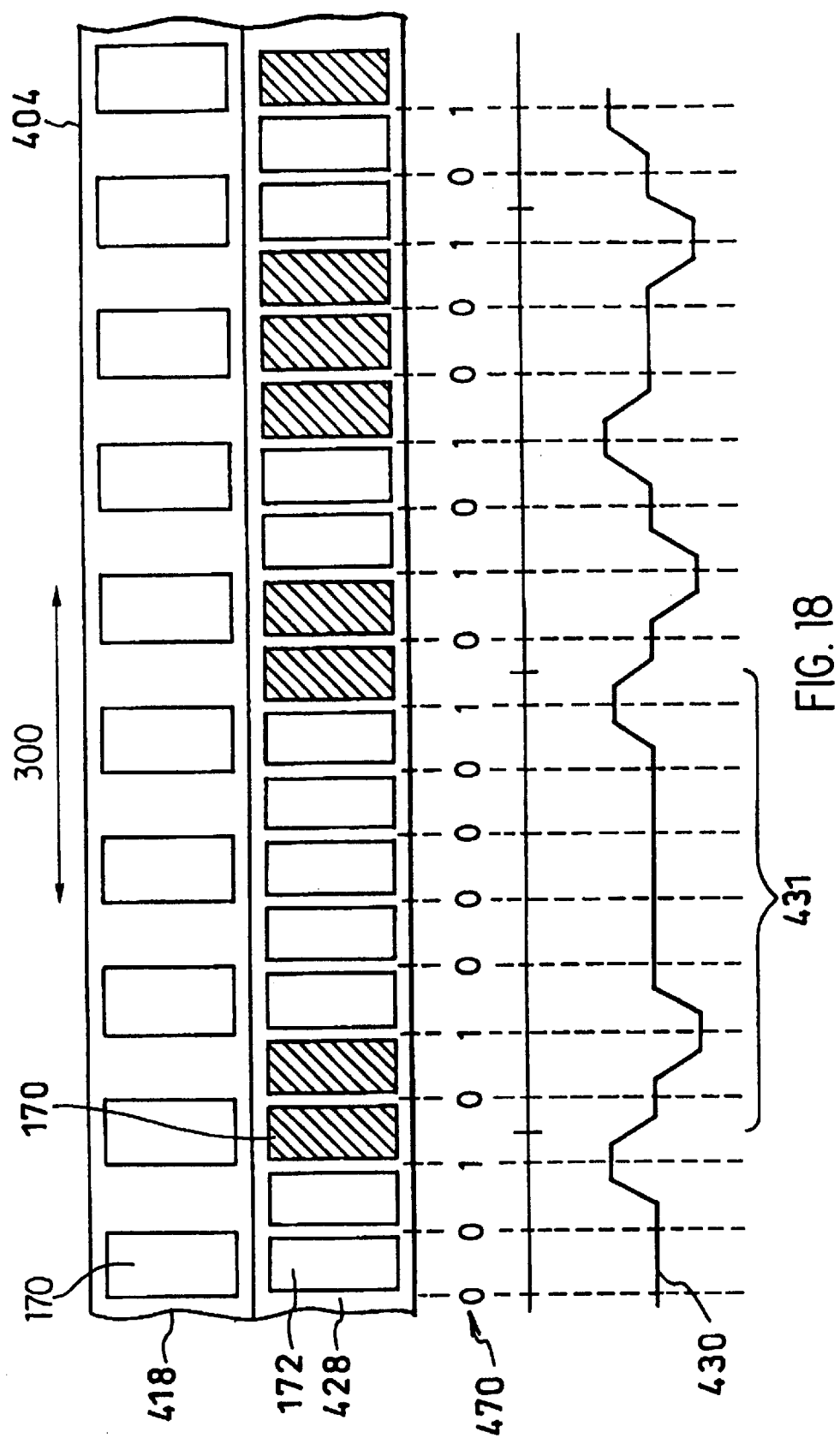
FIG. 18 is a plan view of the scale and code track of the second preferred embodiment of this invention.

A second preferred embodiment of the inductive absolute position transducer of this invention is shown in FIGS. 16–18. This inductive absolute position transducer does not suffer from yaw misalignment. Furthermore, for a given measurement resolution, this second preferred embodiment of the inductive absolute position transducer of this invention can economically use a much longer absolute position measurement range than that generally permitted by the inductive absolute position transducer 200. The second preferred embodiment of the inductive absolute position transducer 400 is shown in FIG. 16.

The second preferred embodiment of this invention, as shown in FIGS. 16–18, does not suffer significantly from yaw misalignment. The inductive absolute position transducer 400 of the second preferred embodiment uses a pair of inductive transducers 410 and 420. The transducers 410 and 420 operate according to the principles described above. Thus, many of the elements of the inductive absolute position transducer 400 of this second preferred embodiment are substantially similar to elements described in the first preferred embodiment. Thus, only those elements that differ either in construction, materials or operation will be described in detail.

The inductive absolute position transducer 400 preferably includes a read head 402, a scale member 404, a fine wavelength transducer 410, and a binary code transducer 420. The fine wavelength transducer 410 and the binary code transducer 420 extend along a measuring axis 300. The fine wavelength transducer 410 is similar to the transducers 210 and 230 and preferably has either the fine wavelength $\lambda_1$ or the fine wavelength $\lambda_3$.

The read head 402 includes the receiver windings 414 and 416 of the fine wavelength transducer 410 and the plurality of receiver windings 422 of the binary code transducer 420. The transducers 410 and 420 share a single transmitter winding 412, which is also formed on the read head 402.

The scale member 404 includes a fine wavelength scale 418 of the fine wavelength transducer 410 and a binary code scale 428 of the binary code transducer 420. The fine wavelength scale is similar to the scales 218 and 238 of the transducers 210 and 230 of the inductive absolute position transducer 200.

The binary code scale 428 has a pattern of flux modulators 170 and spaces 172 arranged along the measuring axis 300. The flux modulators 170 can be either flux disrupters or flux enhancers, as described above. Each set of adjacent flux modulators 170 and the spaces 172 defines one of a series of unique multi-bit binary codewords. The number of binary codewords will depend on the number of bits in the binary codewords and the design rules for the codewords. These design rules will be described in greater detail below.

As shown in FIG. 16, for the binary code scale 428 each flux modulator 170 and each space 172 occupies a length 308 along the measuring axis 300. The distance 308 is preferably equal to half of the wavelength 304 of the fine wavelength scale 418. In particular, for the binary code scale 428, the length 306 of the flux modulators 170 is slightly less than the edge-to-edge distance 308. This provides a narrow insulative gap surrounding and defining the flux modulators 170 when they are adjacent to one another. Thus, one bit of information is encoded within each edge-to-edge distance 308. This length 308 is also equal to a length 425 of each receiver loop 424 and 426 of the binary code transducer 420. The number of bits used in the multi-bit codewords, along with the edge-to-edge distance 308, determines the maximum absolute measuring range for the binary code transducer 420, and thus the inductive absolute position transducer 400.

Each of the unique multi-bit binary codewords identifies a coarse absolute position of the inductive absolute position transducer 400 along the binary code scale 428. Thus, while the inductive absolute position transducer 400 preferably uses both the binary code transducer 420 and the fine wavelength transducer 410, the inductive absolute position transducer 400 can use only the binary code transducer 420, without the fine transducer 410, to provide an absolute position measurement. However, the position measurement has lower resolution.

It should also be appreciated that only a portion of the scale member 404, and thus only a portion of the binary code scale 428, is shown in FIG. 16. In general, the scale member 404 will be sufficiently long enough to include enough flux modulators 170 and spaces 172 to form each of the unique multi-bit binary codewords. This length will of course depend upon the number of bits making up the multi-bit binary codewords and the design rules.

As shown in FIG. 16, the pair of receiver windings 414 and 416 of the fine transducer 410 are similar to the receiver windings 214 and 216, and 234 and 236, of the transducers 210 and 230 described above. The receiver windings 414 and 416 extend along the measuring axis 300. The receiver winding 414 forms a plurality of alternating polarity loops 191. The second receiver winding 416 similarly forms a plurality of alternating polarity loops 192. Alternating sections of each of the receiver windings 414 and 416 are formed on different surfaces of a printed circuit board forming the read head 402 of the inductive absolute position transducer 400.

Similarly, the binary code transducer 420 has a plurality of first polarity loops 424 formed on one surface of the printed circuit board of the read head 402. The binary code transducer 420 also has a similar plurality of second polarity loops 426 formed on a second surface or layer of the printed circuit board of the read head 402. The plurality of first polarity loops 424 is offset by one loop length (the distance 425) from the plurality of second polarity loops 426. This is more clearly shown in FIG. 17. Thus, for any number n of the first and second polarity loops 424 and 426, the first and second polarity loops 424 and 426 extend over n+1 of the flux modulators 170 and spaces 172 of the binary code scale 428.

Each one of the plurality of first polarity loops 424 is connected in series to the one of the plurality of second polarity loops 426 that lies on another layer of the printed circuit board and is immediately adjacent to one side of that first polarity loop 424, as shown in FIG. 17. Thus, the pairs of adjacent first and second polarity loops 424 and 426 form a plurality of balanced loop pairs 427. Each of the balanced loop pairs 427 nominally produces no output signal if there are no modulators present to modulate the magnetic flux generated by the transmitter winding 422.

When both the first polarity loop 424 and the second polarity loop 426 of a balanced loop pair 427 are positioned above a pair of spaces 172 or a pair of flux modulators 170, the induced EMF in each of the first and second polarity loops 424 and 426 is the same. Thus, the net voltage amplitude of the signal output from the balanced loop pair 427 is zero.

In contrast, assuming the flux modulators 170 are disrupter type elements, the first polarity loops 424 are positive polarity loops, and the second polarity loops 426 are negative polarity loops, when a positive polarity loop 424 is positioned over a space 172 and the negative polarity loop 426 of a balanced loop pair 427 is positioned over a flux disrupter 170, the balanced loop pair 427 outputs a positive amplitude voltage signal. That is, the EMF induced in the positive loop 424 is not disrupted. However, the EMF induced in the negative polarity loop 426 is disrupted. Thus, a net positive EMF is induced in the balanced loop pair 427. The balanced loop pair 427 thus outputs a positive amplitude voltage signal.

Furthermore, if the positive polarity loop 424 of a balanced loop pair 427 is positioned over a flux disrupter 170, while the negative polarity loop 426 of the balanced loop pair 427 is positioned over a space 172, the balanced loop pair 427 outputs a net voltage amplitude signal. That is, the EMF induced in the negative polarity loop 426 would not be disrupted, while the EMF induced in the positive polarity loop 424 would be disrupted. Thus, a net negative EMF is induced in the balanced loop pair 427. The balanced loop pair 427 outputs a negative voltage amplitude signal.

It should be appreciated that, if the flux modulators 170 are enhancer type elements instead of flux disrupters, or the polarities of the first polarity loops 424 and the second polarity loops 426 are reversed, the voltage amplitudes are also reversed. Of course, if both of these changes were made at the same time, the voltage amplitudes would remain the same.

FIG. 18 shows the scale member 404 in greater detail, along with the chart 430 of output versus code pair position for any balanced loop pair 427 when that balanced loop pair 427 is associated with each pair of adjacent flux modulators 170 and/or spaces 172, and the resulting binary code values associated with the output from the binary code transducer 420 at each position along the scale member 404. As described above and shown in FIG. 18, when a pair of flux modulators 170 or a pair of spaces 172 are adjacent, the output from the balanced loop pair 427 lying above that pair of adjacent flux modulators or that pair of adjacent spaces 172 is zero. This is defined as a logical "0" value, as shown in FIG. 18.

In contrast, when a space 172 is adjacent to a flux modulator 170, the output from the balanced loop pair 429 lying above that pair of a space 172 and an adjacent flux modulator 170 is either a positive voltage or a negative voltage. Both of these voltages are defined as logical "1" values.

Specifically, each logical "1" value corresponds to a transition along the code scale 428 between a flux modulator 170 and a space 172. Similarly, each logical "0" value corresponds to the lack of a transition in the code scale 428. The chart 430 of output versus code pair position shown in FIG. 18 corresponds to the receiver output signal produced by any one of the plurality of balanced pairs 427 of the binary code transducer 420, as the read head 402 travels along the code scale 428.

Thus, each set of seven adjacent pairs of the flux modulators 170 and the spaces 172 of the binary code scale 428 define a 7-bit binary codeword. For example, the 7-bit binary codeword 431 forms the binary code "1000001." That is, eight adjacent flux modulators 170 and/or spaces 172 form 7 pairs of adjacent elements, or 7 code pairs. Each of the seven code pairs of adjacent elements is sensed by one of the seven balanced loop pairs 427 of the binary code transducer 420.

There are thus a theoretical maximum of 128 (=$2^7$) possible codewords encodable in the binary code scale 428, extending from "0000000" to "1111111." The flux modulators 170 and the spaces 172 are appropriately arranged within the binary code scale 428 along the measuring axis 300 so that, as the read head 402 is moved, different ones of the set of unique binary codewords are read. That is, as the read head 402 is moved a distance equal to the length 308, the codeword output from the binary code transducer 420 changes from a first one of the 128 codewords to a second one of the 128 codewords.

It should also be appreciated that the binary code transducer 420 can include any number of balanced loop pairs 427. Furthermore, each additional one of the balanced loop pairs 427 of the binary code transducer 420 approximately doubles the number of available codewords that can be encoded in the binary code scale 428. It should also be appreciated that, by using the balanced loop pairs 427, the binary code transducer 420 does not have to be moved along the binary code scale 428 to read a single binary codeword.

It should also be appreciated that, because the balanced pairs 427 detect the presence or absence of transitions, space need not be left between adjacent elements in the binary code scale 428. That is, alternatively, two flux modulators 170 can be placed directly next to each other, without any intervening space. Thus, in this embodiment, the distance 306 equals the distance 308. Thus, in this second preferred embodiment, the binary code scale 428 of the binary code transducer 420 is able to advantageously use a maximal density of the flux modulators 170 and the spaces 172. The code track 401 and the read head 394 employ substantially the entire unit distance 416 for each conductive element 414 to efficiently provide the strongest receiver output signal from the available space.

It should be appreciated that the signal processing for the transmitter winding 412 and the receiver windings of the balanced loop pairs 427 can be performed substantially as discussed above with reference to FIG. 9, or as discussed below with reference to FIG. 24. The signals output from the seven balanced pairs 427 are sampled and held by a sample and hold circuit (not shown). The held signals are then digitized by an analog-to-digital converter and output to a microprocessor (not shown). The microprocessor interprets a sufficiently positive or negative digitized signal as a logical "1" value. The microprocessor interprets a digitized receiver output signal sufficiently near zero as a logical "0" value.

It should be appreciated that, if the binary code transducer 420 of the inductive absolute position transducer 400 had only a single balanced pair 427, then, at power-up (or if the absolute data is corrupted), the single balanced pair 427 could be moved along the binary code scale 428 roughly seven times the edge-to edge distance 308 to acquire an entire codeword indicating the absolute position. A shift register (not shown) could act as an intermediate storage device for the single balanced pair 427. This alternative method should be used whenever the number of balanced pairs 427 provided in the binary code transducer 420 is less than the number of bits in a codeword. The shift register collects bits serially while the read head 402 moves along the binary code scale 428.

To avoid ambiguously reading the code bits when the balanced pair 427 is not sufficiently centered over a code pair, the signal of the fine wavelength transducer 410 can be used to determine when the balanced pair 427 is centered over a code pair of the flux modulators 170 and the spaces 172. Thus, the signal from the fine wavelength transducer 410 indicates when the balanced pair 427 should be activated, and a new bit clocked into the shift register.

Once a full codeword is collected, it is output in parallel to the microprocessor. The shift register is clocked up or down depending on the direction of movement. The direction of movement can be determined from the quadrature signals of the fine wavelength transducer 410, as described above. Thus, the shift register always stores the codeword that corresponds to the absolute position of the inductive absolute position transducer 400, at a resolution of the edge-to-edge distance 308. As a result, after the first codeword is acquired after power-up (or data corruption), the single balanced pair 427 needs to scan a maximum of only one edge-to-edge distance 308 to determine the next absolute position.

To minimize the distance the read head must move after power-up (or data corruption) to determine the absolute position, the binary code transducer 420 preferably uses the same number of balanced pairs 427 a there are bits in a codeword, as shown in FIG. 16. In this way, by selecting the proper signal processing circuits, a carefully chosen codeset, and the proper decoding algorithms, the read head 402 needs to move along the scale member 404 minimally, or not at all, to read and decode any codeword.

If the signal processing circuits for the codeword bits are crude, such as, for example, having only 2 bit measurement resolution for the output of the single balanced pair 427, then moving the read head 402 over the scale member 404 may be necessary at some positions to unambiguously determine all code bit values. However, the necessary movement is still only on the order of ±½ of the edge to edge distance 308. Such crude signal processing circuits are used to provide fabrication economies.

One disadvantage of the binary code transducer 420 lies in the signal amplitudes that correspond to logical values. In particular, a logical "0" value corresponds to a zero amplitude signal. That is, the balanced pairs 427 provide no signal output when the elements of a code pair are both flux modulators 170 or both spaces (i.e., no transition is present). Similarly, a logical "1" value corresponds to either a sufficiently positive or a sufficiently negative signal. That is, the balanced pairs 427 provide a strong signal output only when the corresponding pairs of scale elements are not both flux modulators 170 or are not both spaces (i.e., a transition is nearly centered under the balanced pair 427).

Figure 19:
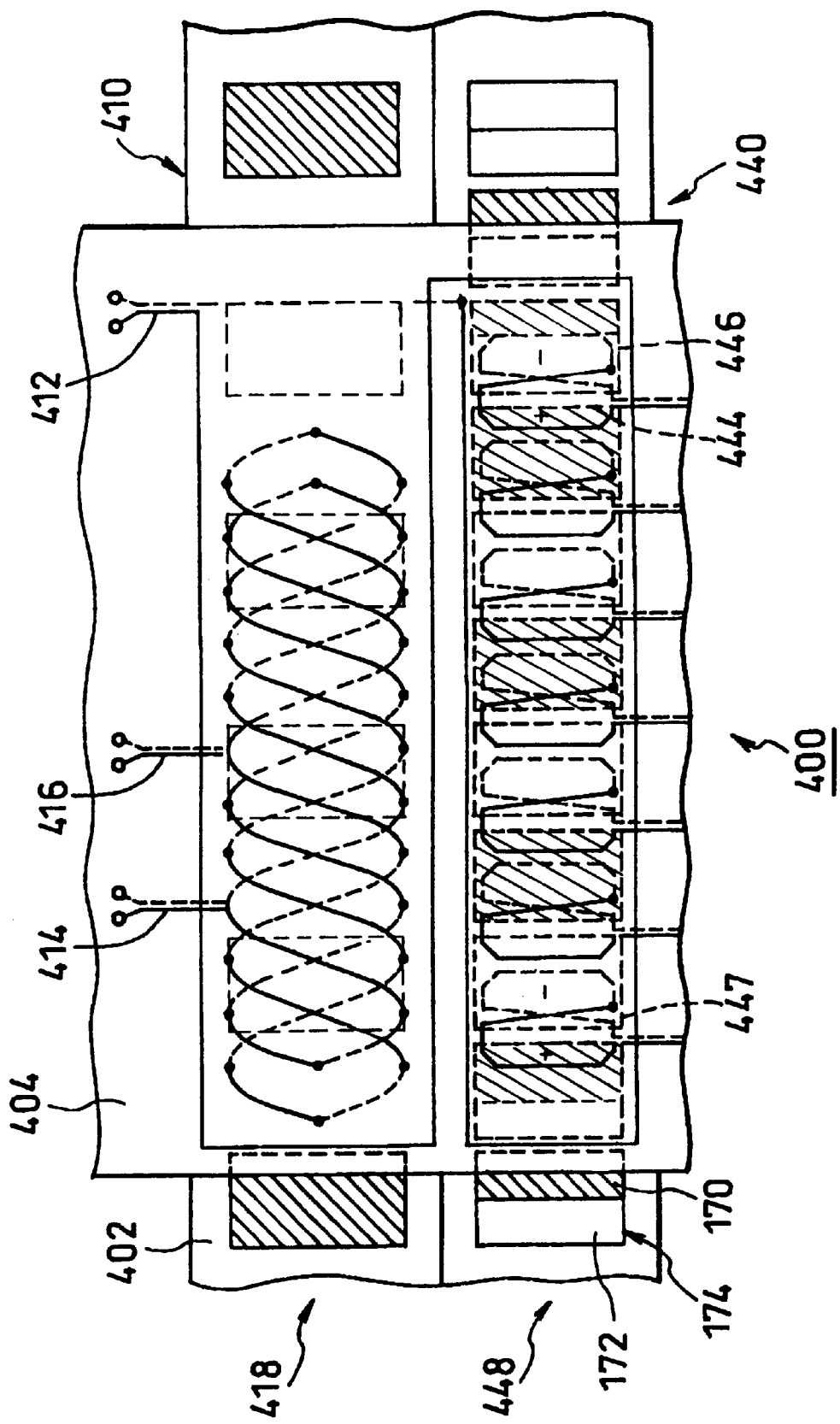
FIG. 19 is a plan view of a read head of a binary code transducer of a third preferred embodiment of the inductive absolute position transducer of this invention.
Figure 20:
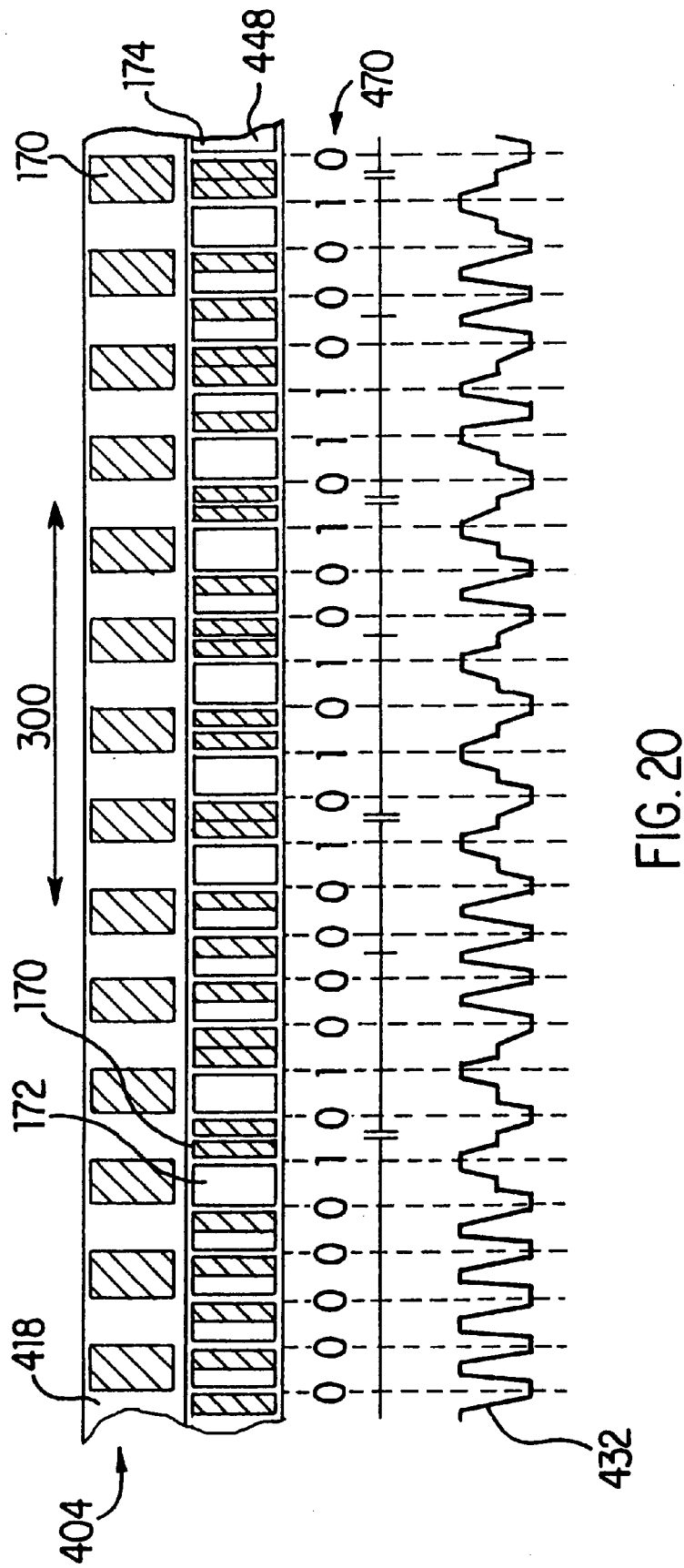
FIG. 20 is a plan view of a portion of the binary code scale of the third preferred embodiment of the inductive absolute position transducer of this invention.

FIGS. 19 and 20 show a third preferred embodiment of the inductive absolute position transducer of this invention. The third preferred embodiment shown in FIGS. 19 and 20 provides a greater signal difference between the logical values, by providing improved receiver output signals. As shown in FIG. 19, in the third preferred embodiment, the inductive absolute position transducer uses a variation 440 of the binary code transducer 420. In this binary code transducer 440, each code scale element 174 (i.e., flux modulator 170 and space 172) is divided in two portions. Each scale element 174 is rearranged to contain either: 1) both a flux modulator 170 and a space 172; 2) two flux modulators; or 3) two spaces. The scale elements 174 of the binary code scale 448 of the binary code transducer 440 are arranged such that there is always a transition between a flux disrupter 170 and a space 172 between adjacent scale elements 174, as shown in FIG. 20.

Similarly, as shown in FIG. 19, the first positive polarity loops 444 and second negative polarity loops 446 are only half as long, and no longer overlap. A positive voltage from a balanced pair 447 corresponds to a logical "1" value, while a negative voltage corresponds to a logical "0" value.

The resulting chart 432 of output versus code pair position is shown in FIG. 20. As shown in FIG. 20, when a positive polarity loop 444 lies over a space 172 and a negative polarity loop 446 lies over a flux disrupter 170, the balanced pair 447 outputs a positive amplitude signal (i.e., a logical "1"). Alternately, when a positive polarity loop 444 lies over a flux disrupter 170 and a negative polarity loop 446 lies over a space 172, the balanced pair 447 outputs a negative amplitude signal (i.e., a logical "0"). Thus, the voltage difference between the logical "1" and the logical "0" is potentially twice that of the binary code transducer 420, improving the ability to distinguish logical "1"s from logical "0"s.

Furthermore, in this third preferred embodiment, positive signals and negative signals do not carry the same logical value, as in the second preferred embodiment. Thus, in this third preferred embodiment, the spaces 172 can be replaced by flux enhancers, assuming the flux modulators 170 are flux disrupters. In this case, the net positive and negative signal amplitudes generated in the balanced pairs 447 would be greater than if spaces 172 were used. This further increases the voltage difference between the logical "1" and the logical "0," further improving the ability to distinguish logical "1"s from logical "0"s.

Figure 21:
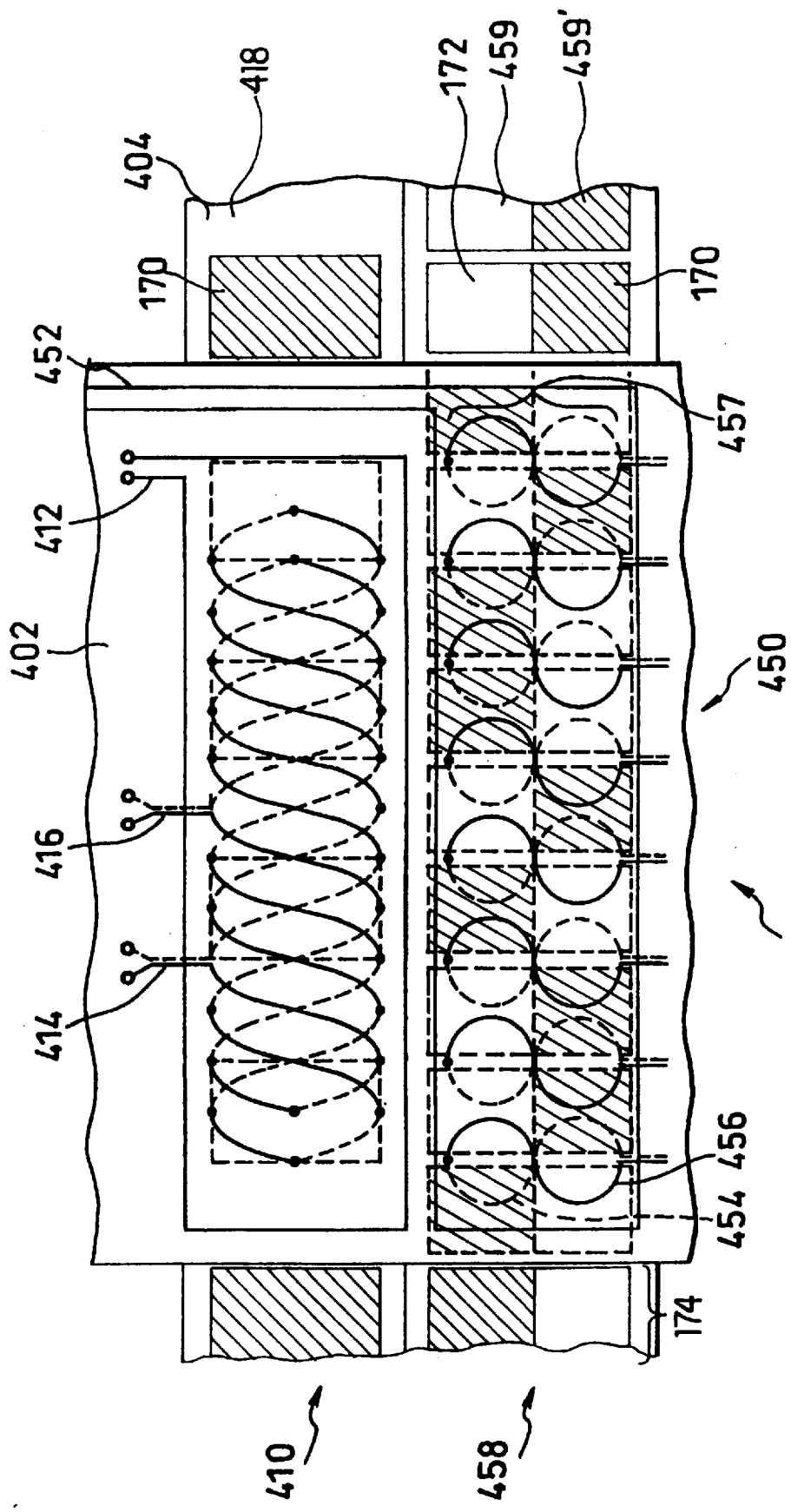
FIG. 21 is a plan view of a fourth preferred embodiment of the binary code scale of the inductive absolute position transducer of this invention.
Figure 22:
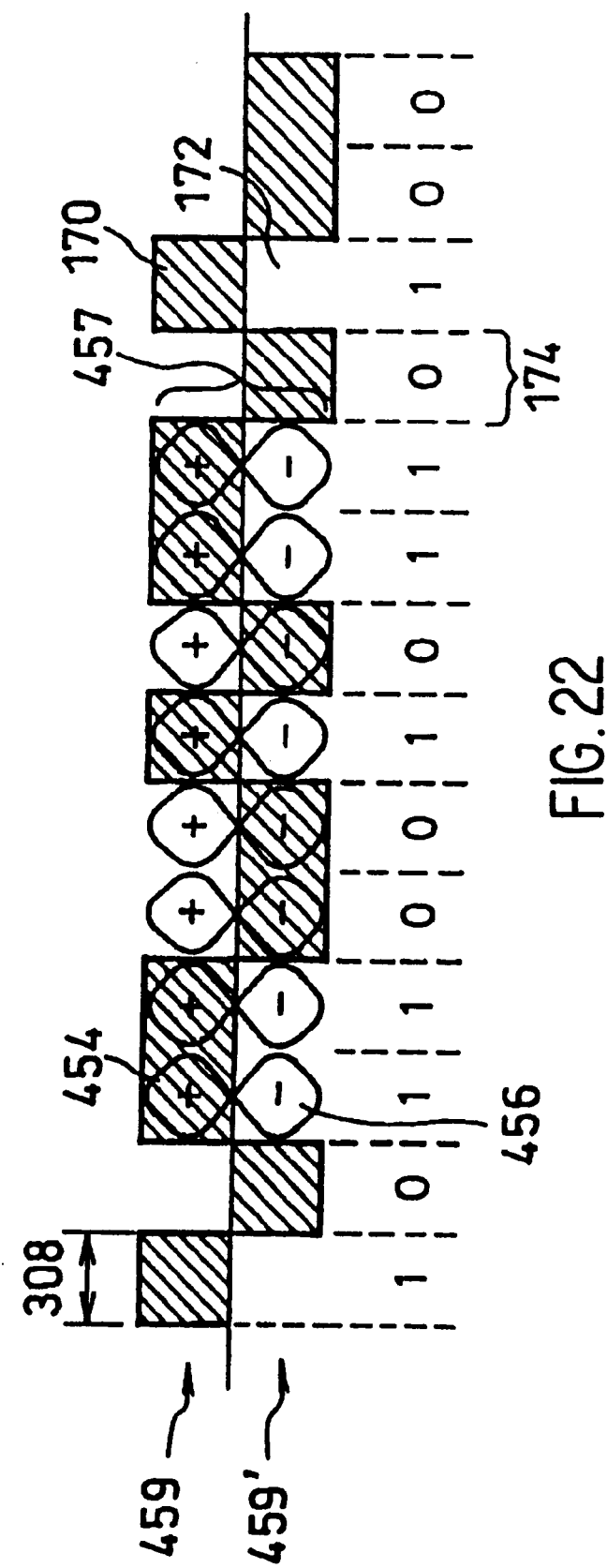
FIG. 22 is a plan view of a portion of an 8-bit binary code scale and a read head of the fourth preferred embodiment of the inductive absolute position transducer of this invention.
Figure 23:
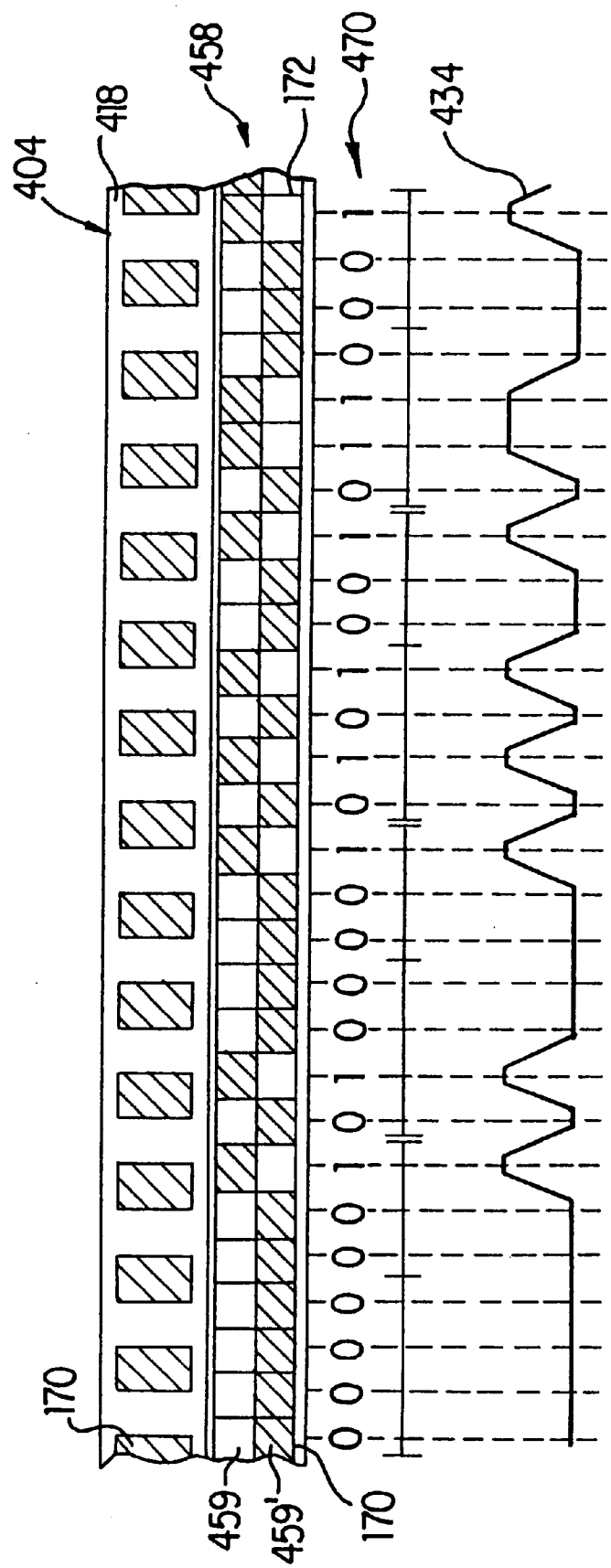
FIG. 23 is a plan view of a portion of the binary code scale of the fourth preferred embodiment of the inductive absolute position transducer of this invention.

FIGS. 21, 22 and 23 show a fourth preferred embodiment of the inductive absolute position transducer 400. In a fourth preferred embodiment of the inductive absolute position transducer 400, as shown in FIGS. 21 and 22, the binary code transducer 450 has eight balanced pairs 457. The plurality of balanced pairs 457 are surrounded by a transmitter winding 452, while the transmitter winding 412 surrounds only the transmitter windings 414 and 416. This is in contrast to the second and third embodiments, which use a common transmitter winding for both transducers.

Each balanced pair 457 has a first positive polarity loop 454 and a second negative polarity loop 456, similarly to the second and third preferred embodiments. However, in this fourth preferred embodiment, the first and second polarity loops 454 and 456, rather than being aligned along the measuring axis 300, as in the previous embodiments, are aligned perpendicular to the measuring axis 300.

The binary code transducer 450 of the fourth preferred embodiment has scale elements 174 comprising two parallel portions formed on the scale member 404. The binary code scale 458 includes an upper portion 459 and a lower portion 459'. The two portions are arranged along the measuring axis 300. The upper and lower portions 459 and 459' each includes a plurality of the scale elements 174, including a plurality of flux modulators 170 and a plurality of spaces 172. Each of the scale elements 174 has a length equal to the edge-to-edge distance 308.

A positive voltage corresponds to a logical "1" value and a negative voltage corresponds to a logical "0" value. The resulting chart 434 of output versus code pair position is shown in FIG. 23. As shown in FIG. 23, when a positive polarity loop 454 lies over a space 172 and a negative polarity loop 456 lies over a flux disrupter 170, the balanced pair 457 outputs a positive amplitude signal (i.e., a logical "1"). Alternately, when a positive polarity loop 454 lies over a flux disrupter 170 and a negative polarity loop 456 lies over a space 172, the balanced pair 457 outputs a negative amplitude signal (i.e., a logical "1"). Thus, the voltage difference between the logical "1" and the logical "0" is potentially twice that of the binary code transducer 420, improving the ability to distinguish logical "1"s from logical "0"s.

Furthermore, in this fourth preferred embodiment, as in the third preferred embodiment, positive signals and negative signals do not carry the same logical value. Thus, in this fourth preferred embodiment, the spaces 172 can be replaced by flux enhancers, assuming the flux modulators 170 are flux disrupters. In this case, the net positive and negative signal amplitudes generated in the balanced pairs 457 would again be greater than if spaces 172 were used. This further increases the voltage difference between the logical "1" and the logical "0," further improving the ability to distinguish logical "1"s from logical "0"s.

For a small edge-to-edge distance 308, the binary code transducer 450 is preferred, because the modulators 170 are more uniformly shaped, for example, square. This is in contrast to the more elongated modulators 170 used in the binary code transducers 420 and 440 of the second and third preferred embodiments. The uniform, and potentially larger, dimensions of the modulators 170 in the binary code transducer 450 are generally more readily manufactured.

With a small edge-to-edge distance 308, the binary code transducer 450 provides a larger amplitude receiver output signal than the binary code transducers 420 and 440 for a given gap 171 between the read head 402 and the scale member 404. The binary code transducers 440 and 450 of the third and fourth preferred embodiments, however, provide a robust output signal. That is, each balanced pair 447 or 457 outputs a positive or negative voltage signal readily discernible from each other to provide a robust basis for the binary code.

As noted above, the signal induced in the receiver windings, including the balanced pair code sensing windings, due to the flux modulating effects of the flux modulators 170 is weak compared to the strong transmitter magnetic field generated by the transmitter windings. Thus, the balancing of the transmitter magnetic field effects is the important feature for improved signal-to-noise ratio and for eliminating any disturbing and undesirable "unbalanced" cross-talk between the transmitter and receiver windings. Such cross-talk most likely occurs at the input/output terminals of the windings and at the ends and edges of the windings. Therefore, the terminals are located relatively distantly from the windings. Additionally, the end portions of the transmitter windings preferably extend along the measuring axis 300 at least one wavelength 193 beyond the receiver windings. This further reduces unbalanced edge effects.

Figure 24:
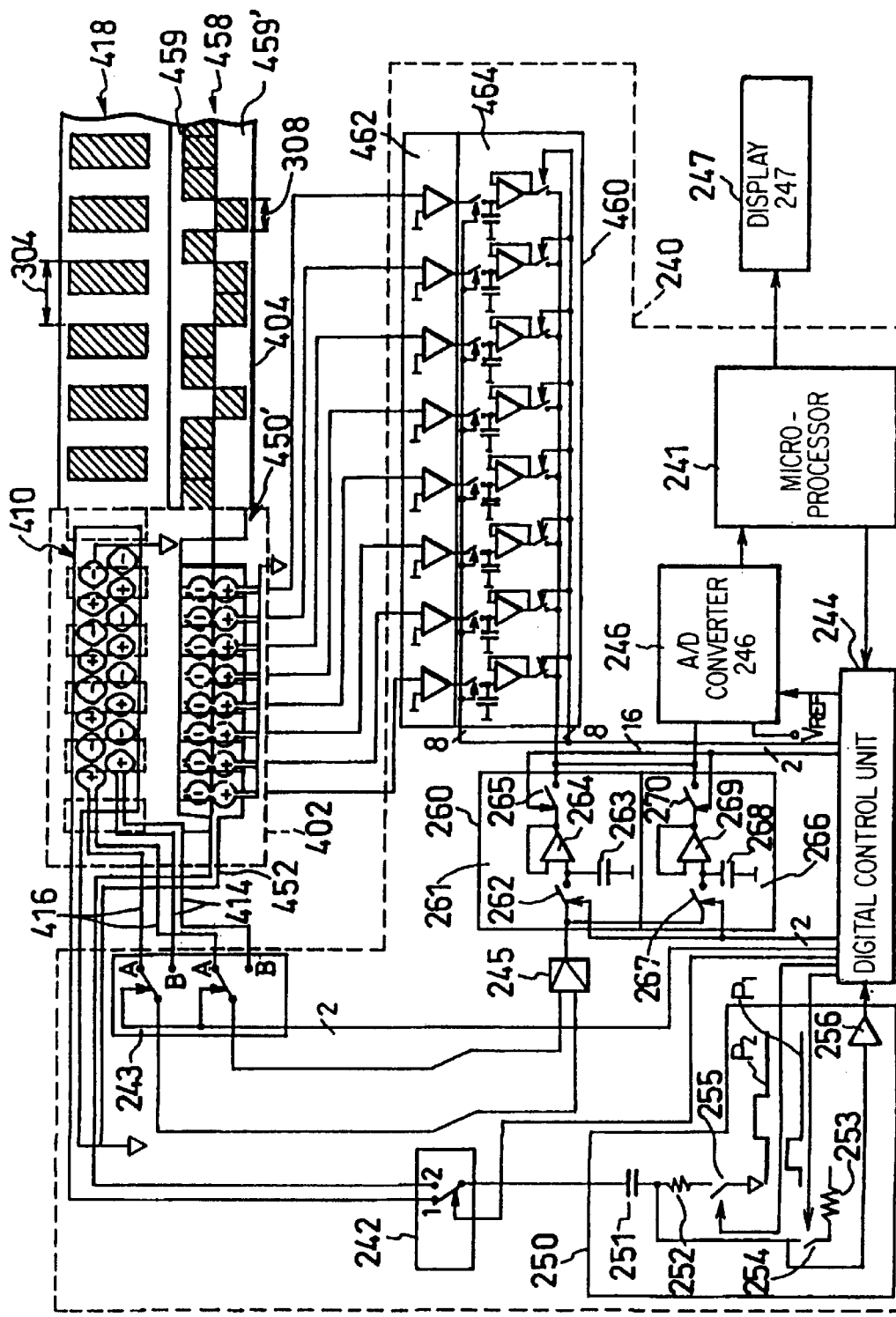
FIG. 24 is a block diagram of a second preferred embodiment of the electronic circuit for the second-fourth preferred embodiments of the inductive absolute position transducer of this invention.

FIG. 24 shows a second preferred embodiment of the signal generating and processing circuit 240 connected to a read head 402. In FIG. 24, those elements having the same numbers as in FIG. 9 operate identically, and thus will not be discussed further. The read head 402 is essentially the same as the read head of FIG. 21, but includes an 8 bit binary code transducer 450'. This second preferred embodiment of the signal generating and processing circuit 240 includes portions connectable to the binary code transducers 420, 440, 450 or 450' instead of the transducers 220 and 230. Because this second preferred embodiment of the signal generating and processing circuit 240 has only two transducers 410 and (420, 440, 450 or 450'), the select switch 242 has only two positions.

The circuitry and the signal processing steps associated with the fine wavelength transducer are essentially the same as those described above with reference to FIGS. 9–15. As in the first embodiment of the signal generating and processing circuit 240, the signal generator 250 drives the transmitter winding 212 of the fine wavelength transducer 410. The receiver winding output signals from the receiver windings 414 and 416 are amplified by the pre-amplifier 245 and input to the sample and hold circuit 260. However, since there is only a single fine wavelength transducer 410, instead of the three fine and medium wavelength transducers 210, 220 and 230 as in the first preferred embodiment, the sample and hold circuit 260 has only two sample and hold subcircuits 261 and 266.

The output of the sample and hold circuit 260 is input to the A/D converter 246. Also input to the A/D converter 246 is the output from a second sample and hold circuit 460. The second sample and hold circuit 460 has a plurality of amplifiers 462. The binary code transducer 450' shown in FIG. 24 uses 8-bit codewords. Therefore, the read head 402 has eight balanced pairs 457. Accordingly, the sample and hold circuit 260 has eight amplifiers 462 and eight sample and hold circuits 264. To determine the binary codeword from the binary code transducer 450', a drive signal is supplied to the transmitter winding 252 through terminal 2 of the switch 242. This induces an output signal on all eight balanced pairs 457 simultaneously.

Synchronously with the transmitter signal peak, as previously described for the fine wavelength transducer sampling, the eight sample and hold subcircuits 464 simultaneously sample and hold the code signals output from the balanced pairs 457 through the amplifiers 462. Simultaneous sampling overcomes problems which might arise due to motion of the transducer.

It should be appreciated that the code signals from the balanced pairs 457 need not be analyzed with high precision. Approximately three-to-five bits of measurement resolution is sufficient. Therefore, the amplifiers 462 have a simple construction and do not consume excessive space on an integrated circuit.

The receiver or fine position signals from the receiver windings 414 and 416 are sampled first. The code or coarse position signals from the balanced pairs 457 are sampled second. After all the receiver and code signals have been sampled and stored in the sample and hold subcircuits 261, 266 and 464, the A/D converter 246 converts the sampled signals into digital signals processable by the microprocessor 216.

The A/D converter 246 is preferably a conventional serial successive approximation type converter. The A/D converter 246 preferably has a selectable conversion resolution. Thus, the fine position signals output from the receiver windings 414 and 416 are converted at a high, 8-bit resolution. In contrast, the coarse signals output from the eight balanced pairs 457 are converted at a lower, but faster, 3-bit resolution.

Figure 25:
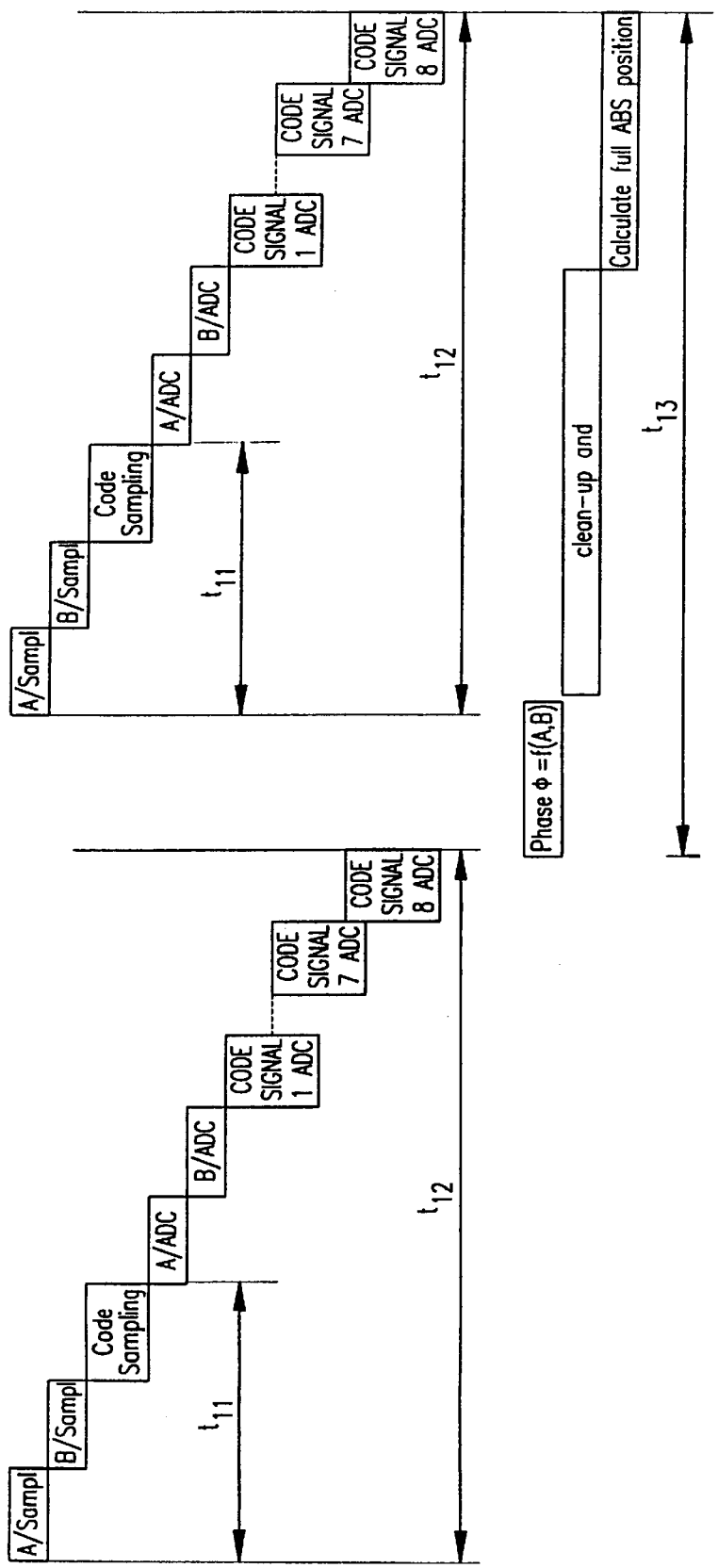
FIG. 25 is a timing diagram showing the signal collection and processing steps performed by the electronic circuit of FIG. 24.

As shown in the timing diagram of FIG. 25, after sampling the receiver output signals from the receiver windings 414 and 416, the code signals output from the balanced pairs 457 are sampled in parallel. The receiver signals from the receiver windings 414 and 416 and the code signals from the balanced pairs 457 are sampled and stored in the sample and hold subcircuits 261, 266 and 464 within a short time interval $t_{11}$. After all the receiver and code signals have been sampled and stored, the stored signals are output one at a time to the A/D converter 246 and converted to digital signals processable by the microprocessor 241 within a longer time period $t_{12}$.

After the receiver and code signals have been digitized and input to the microprocessor 241, the microprocessor 241 determines the fine wavelength phase position $\phi_1$ using the relevant steps of the flowcharts shown in FIGS. 12–15. Then, the microprocessor 241 determines the absolute position codeword derived from the code signals, as described below. The codeword uniquely identifies a particular position number "Pos #," as shown in FIG. 27 and described below. Each position number corresponds to a known absolute position $X_{code}$ of the read head 402 relative to the scale member 404.

In this embodiment, each such absolute position is spatially synchronized with the same relative phase position $\phi_{CODE}$ of the adjacent fine wavelength. That is, each increment in "Pos #" corresponds to an absolute position increment of one fine wavelength $\lambda_1$. Preferably, the absolute positions are spatially synchronized at $\phi_{CODE}=0$. Thus, to compute an absolute position to the highest level of resolution, the microprocessor 241 calculates $P_F=\phi_1*(\lambda_1/2\pi)$ using the relevant steps of the flowcharts shown in FIGS. 12–15, and computes the total high resolution absolute position as $x_{code}+P_F$.

If the balanced pairs 457 are not centered over the scale elements 174, so that ambiguous, low amplitude, code bit signals are generated, the microprocessor 241 nevertheless determines the codeword, as outlined in greater detail below. For example, if one of the code bit signals has a low voltage amplitude between one-fourth of the maximum positive voltage and one-fourth of the maximum negative voltage, the microprocessor 241 first determines the bits corresponding to the unambiguous code signals which have a sufficiently high voltage amplitude. The microprocessor then fills in the ambiguous values as explained below. This is designated as "clean-up" in FIG. 25. Then, the microprocessor 241 determines the total absolute position as outlined above.

The microprocessor 241 to which the binary code transducer 420, 440, 450 or 450' is coupled determines the coarse absolute position by comparing the sampled codeword to a lookup table. The lookup table is preferably stored in non-volatile memory (not shown). The lookup table relates a given codeword to a given coarse absolute position $x_{code}$.

In a first preferred embodiment of the code, a 7-bit codeword is used. The 7-bit codeword includes a start/stop marker and a binary number. Three consecutive bits are used as the start/stop marker. These bits identify where a given codeword begins or ends. For example, the start/stop marker can be the binary string "001." The remaining four bits in the 7-bit codeword form one of several unique binary numbers. As set forth above, each unique binary number corresponds to a particular coarse absolute position. With four bits, sixteen possible binary numbers, "0000" through "1111," are theoretically available.

However, some of the numbers must be excluded because the microprocessor 241 could mistake them for the start/stop marker. The numbers that can be mistaken as the start/stop marker are "0001", "0010", "0011" and "1001". Eliminating the four binary numbers that can be mistaken as the start/stop marker, twelve numbers are available: "0000", "0100", "0101", "0110", "0111", "1000", "1010", "1011", "1100", "1101", "1110", "1111".

The binary code scales 428, 448 and 458 shown in FIGS. 18, 20 and 23 show how the start/stop marker "001" and the 4-bit binary codewords are combined according explanatory marks 470. To provide accurate position measurements within reasonable manufacturing tolerances, under current printed circuit board manufacturing technology, the edge-to-edge distance 308 is preferably equal to one-half of the fine scale wavelength 304, i.e., equal to $\lambda_1/2$). The scale 418 of the fine wavelength transducer 410 shown in FIGS. 16–24 preferably has a wavelength $\lambda_1$ of 5.12 mm. The microprocessor 241 can interpolate within this wavelength to obtain a position resolution of approximately 0.01 mm. The edge-to-edge distance 308 is therefore equal to 2.56 mm.

If the binary code scale 428 uses a 7-bit codeword, the total length of each codeword is equal to seven times this distance. Thus, the codeword has a length of 7×2.56 mm=17.92 mm. Since the twelve binary numbers shown above can be encoded within the 7-bit codeword, and the location of the start bits can be identified, the total range of the 7-bit binary code transducers 420, 440 and 450 is twelve times the total codeword length, or 12×17.92 mm=215.04 mm. A range of approximately 215 mm is sufficient for most caliper applications.

Tape measures, on the other hand, require a longer measurement range. In this case, the codeword length can be increased to eleven bits. Of these eleven bits, four are used as the start/stop marker 0001. This leaves 96 binary numbers available. As a result, an 11-bit codeword length provides for a total range of approximately 2700 mm (96×11×2.56 mm=2703 mm=2.703 m).

If a 7-bit codeword length is used, a read head having at least seven balanced pairs 427,447 or 457 is required. The read head need not be aligned with a single codeword for the microprocessor to be able determine the position of the read head. Instead, the balanced pairs 427, 447 or 457 can span two adjacent codewords. For example, as shown in FIG. 16, the 7-bit binary string read by the binary code transducer 420, 440 or 450 can span two adjacent complete codewords, such as the codewords "1010001" and "11011001," outputting the binary string "10110110." In this case, neither of the start stop markers of the two adjacent codewords "1010001" and "1011001" are read completely.

The microprocessor, after inputting the binary string "0110110," first recognizes that the binary string lacks the start/stop marker "001." The microprocessor 241 therefore determines that the beginning and end of the binary string each includes portions of two separate start/stop markers from two adjacent codewords. Furthermore, the microprocessor knows that the start/stop marker begins with a "0," and not a "1." Therefore, based on this information, the microprocessor determines that the rightmost "0" in the string "0110110" is the first "0" in a rightmost start/stop marker. The four digits to the left of the rightmost "01011," correspond to the binary number that encodes the coarse absolute position. Therefore, the microprocessor 216, using an appropriate lookup table, determines the coarse absolute position of the read head 402 based on the binary number 1011.

The microprocessor 216 uses the start/stop marker as a medium position measurement. For example, each codeword in the binary code scale 428, 448 or 458 uses the binary string "001" as a stop marker. Thus, the stop marker "001" is preceded by the binary number. The coarse absolute position then corresponds to the beginning of each codeword. In the example set forth above, the microprocessor recognized that the leftmost two bits "01" in the binary string "0110110" corresponded to the second and third digits in a leftmost stop marker.

Since the binary string is two edge-to-edge distances 308 to the left of the beginning of the coarse absolute position encoded by the binary number "1011," the microprocessor 241 adjusts the coarse absolute position by two edge-to-edge distances 308. Therefore, the microprocessor 241 subtracts two edge-to-edge distances 308 from the coarse absolute position defined by the binary number "1011." The fine wavelength transducer 410 then provides a fine position measurement which the microprocessor 216 uses to determine the total absolute position of the read head 402.

A second preferred embodiment of the binary code scale 428, 448 or 458 has an 8-bit scale pattern and a corresponding lookup table for use with this pattern.

Figure 26:
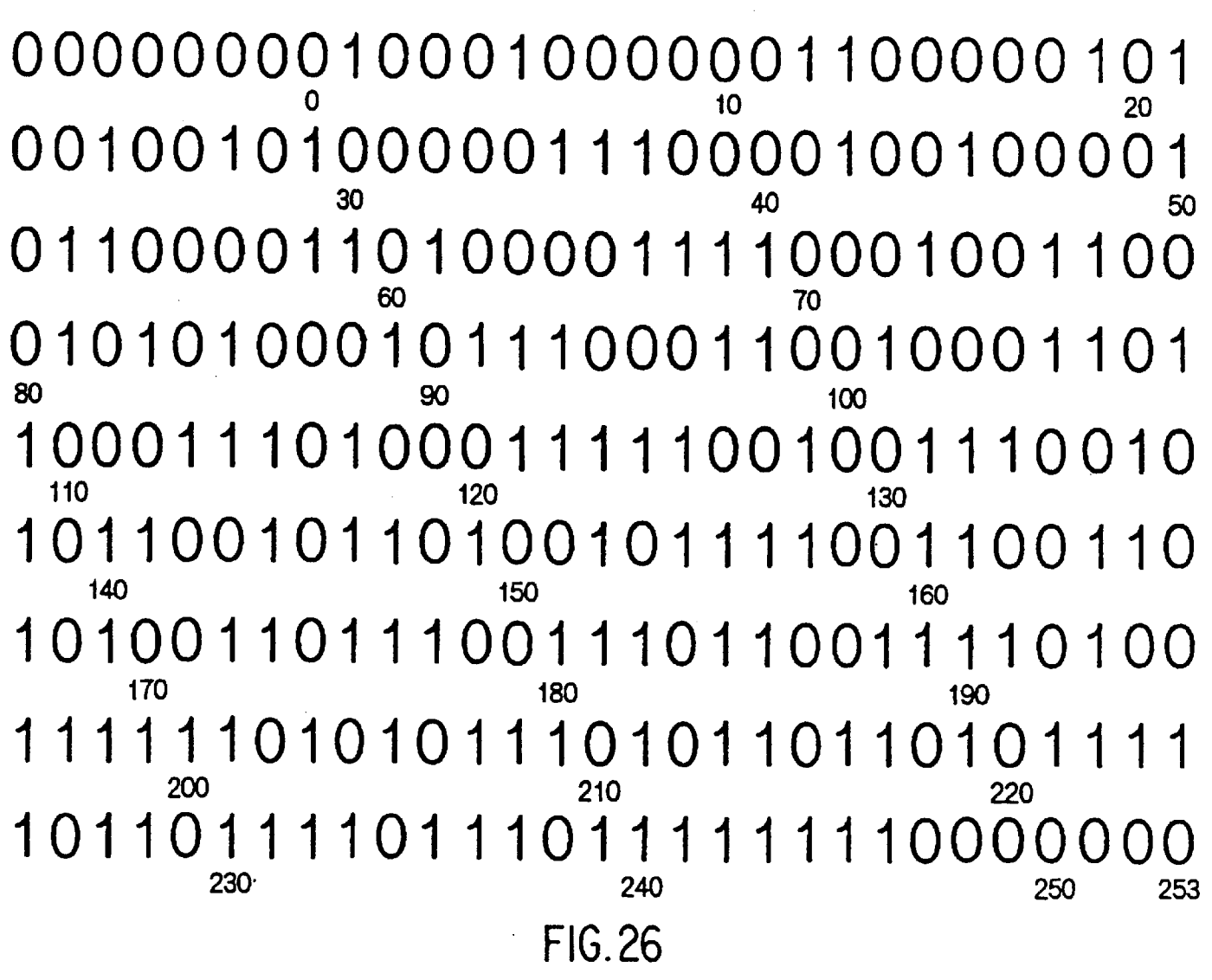

FIGS. 26 and 27 show the 8-bit pattern and the lookup table, respectively. The bit pattern shown in FIG. 26 is encoded along the code track to provide the series of "0"s and "1"s for each edge-to-edge distance 308. This 8-bit codeword does not use a start/stop marker. Thus, all eight bits in each codeword are used to define an absolute coarse position.

Therefore, the 8-bit scale pattern used in the second preferred embodiment of the scale pattern has a greater range than the 7-bit scale pattern used in the first preferred embodiment of the scale pattern. Each of the 8-bit codewords encoded in the bit pattern shown in FIG. 26 has at least one strong "1" or at least one strong "0." That is, in each 8-bit codeword, there is at least one pair of adjacent "1"s or at least one pair of adjacent "0"s.

Furthermore, an 8-bit codeword also has a greater potential range, due to the greater number of possible unique codewords. If the bit pattern is read by eight balanced pairs 427, 447 or 457, the eight balanced pairs 427, 447 or 457 will output 256 unique codewords as the read head 402 moves from one end of the scale member 404 to the other end.

Figure 28:
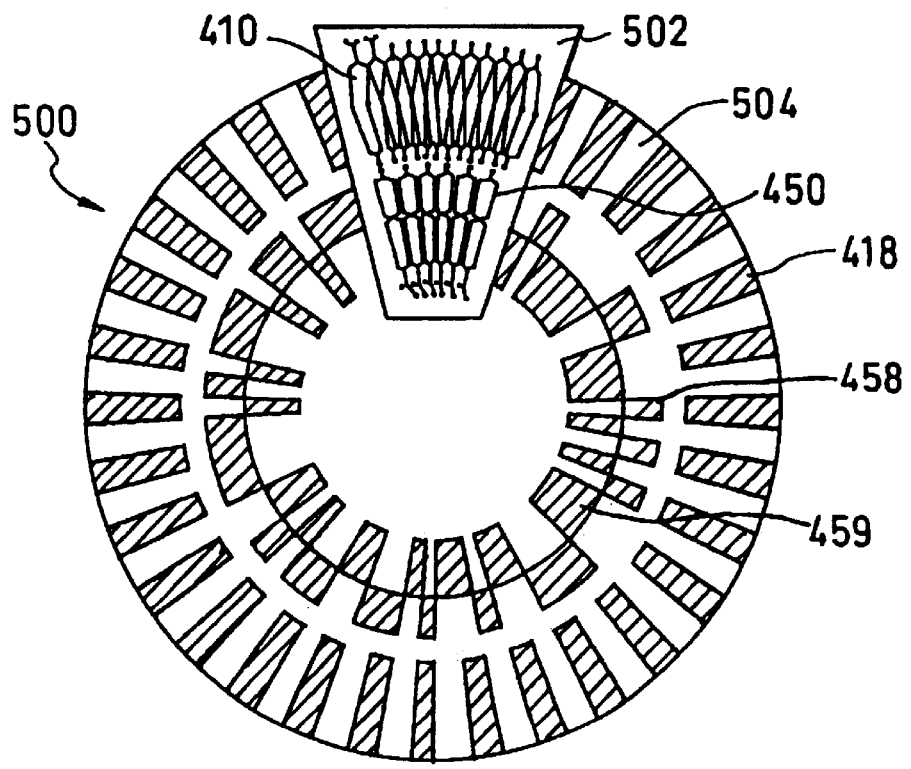
FIG. 28 is a plan view of a fifth preferred embodiment of the inductive absolute position transducer of this invention.
Figure 29:
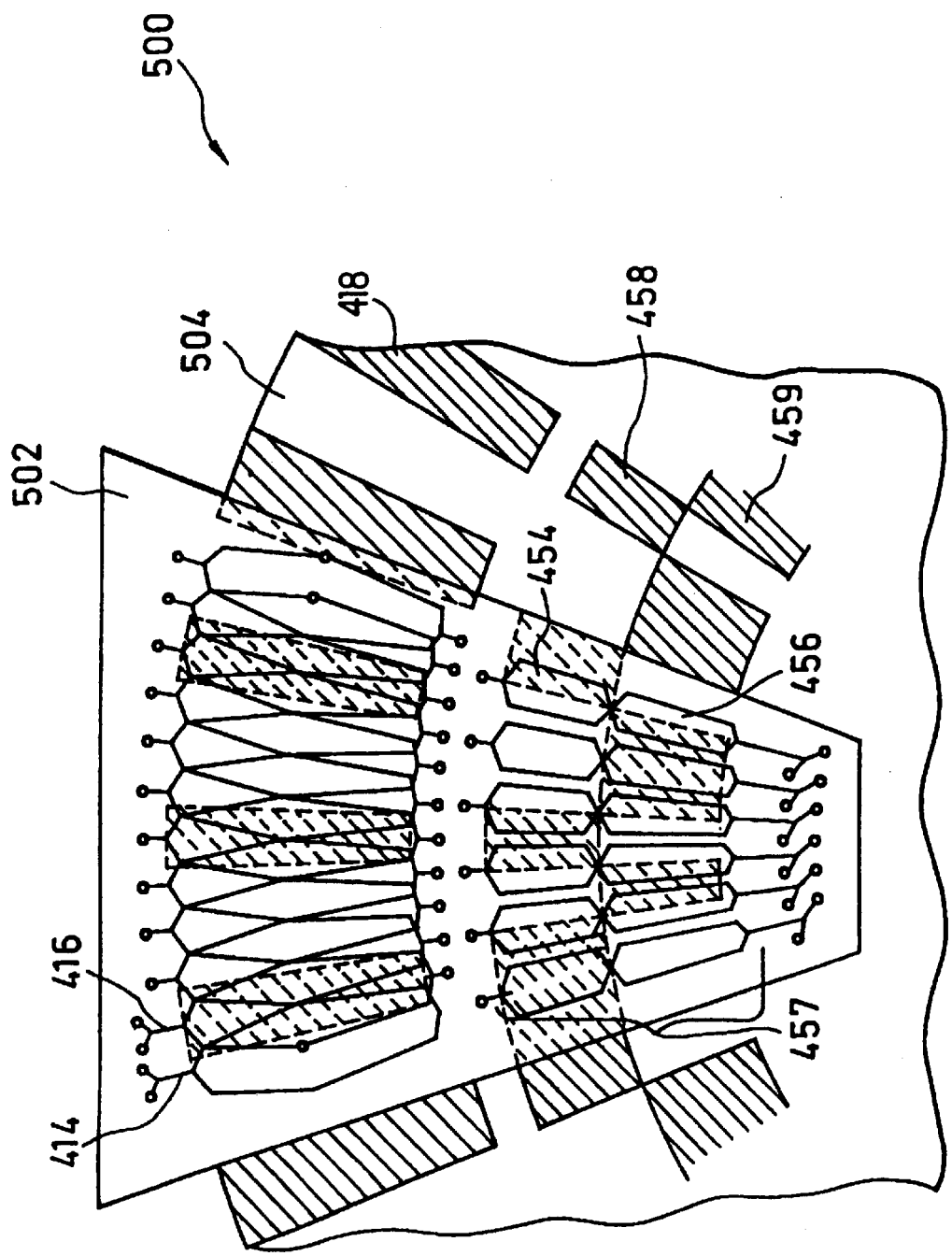
FIG. 29 is an enlarged plan view of the fifth embodiment of the inductive absolute position transducer of this invention.

As explained below, an alternating string of "0"s and "1"s can provide an ambiguous signal. Therefore, if the 8-bit numbers "01010101" and "10101010" are eliminated, 254 unique codewords remain. The bit pattern can also be made circular by joining the two ends of the binary code scale. This is one way to form a binary code scale for a rotary or cylindrical encoder, as shown in FIGS. 28 and 29. If constructed in this manner, no duplicate codewords will be read during one complete sampling of the binary code scale. It should be appreciated that, when the ends of the binary code scale are connected to form the rotary or cylindrical encoder, the eight leading "0"s and seven trailing "0"s shown in FIG. 26 will overlap, forming a single set of eight consecutive "0"s.

The absolute measurement range for an 8-bit scale pattern is equal to 254 times the edge-to-edge distance 308. For example, if the fine wavelength $\lambda_1$ is equal to 5.12 mm, the absolute range for the binary code transducer 420, 440 or 450 would be 254×(5.12 mm)=1300 mm.

A 12-bit codeword is preferably used for applications requiring a longer absolute measurement scale, such as in a tape measure. With an edge-to-edge distance 308 equal to 5.12 mm, the absolute range of a 12-bit scale pattern is equal to $(2^{12}-2) \times 5.12$ mm=20.96 m. In this example, the two codewords having alternating "0"s and "1"s are eliminated.

If the read head 402 is positioned along the binary code scale 428, 448 or 458 so that the eight balanced pairs 427, 447 or 457 are positioned and aligned with the codeword "00001100," the microprocessor interprets the binary value of this codeword as "12." From the lookup table shown in FIG. 27, the decimal code value of 12 corresponds to position 15.

If the fine wavelength $\lambda_1$ is equal to 5.12 mm, then the coarse absolute position would be approximately 76.8 mm (15×5.12 mm). If the read head 402 is moved two edge-to-edge distances 308 to the right, the read head 402 is aligned with the binary codeword "00110000." The microprocessor interprets the binary codeword "00110000" as "48." As shown in the lookup table of FIG. 27, this value corresponds to position 17. Therefore, the new coarse position is approximately 87.04 mm. It should be appreciated that, based on this detailed description, the lookup table and microprocessor 241 can be configured to recognize the absolute position of the read head 402 based on the binary codeword alone, without converting the codeword into a decimal value.

The binary scale transducers 420 and 440 require the balanced pairs to be aligned with the scale elements 174 in the binary code scales 428 and 448 to output an unambiguous binary code signal. As a result, an inductive absolute position transducer 400 using these binary scale transducers does not provide a true absolute position. This is because, at certain positions, these binary scale transducers require some movement of the read head 402 to align the read head 402 with the scale elements 174 to obtain an unambiguous output from the balanced pairs. Therefore, the inductive absolute position transducer 400 preferably uses the binary scale transducer 450, because the binary scale transducer 450 enables the absolute position transducer 400 to determine the absolute position of the read head 402 at any point along the scale member 404.

Figure 30:
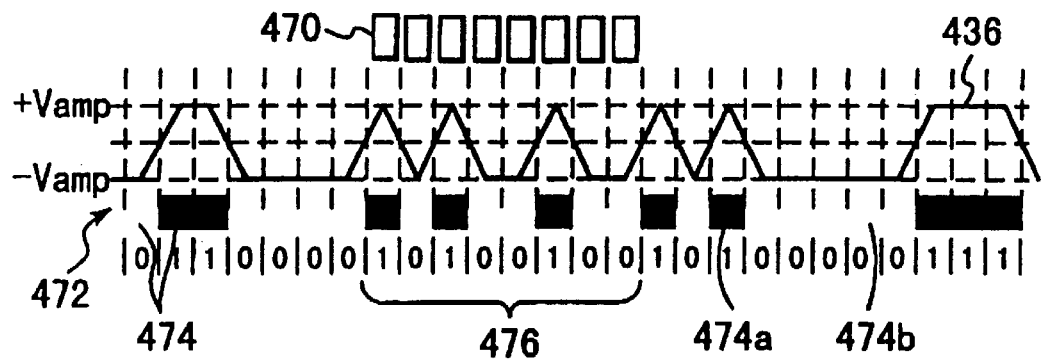
FIG. 30 is a plan view of a portion of the 8-bit code track, eight code sensor elements and the exemplary signal output.
Figure 31:
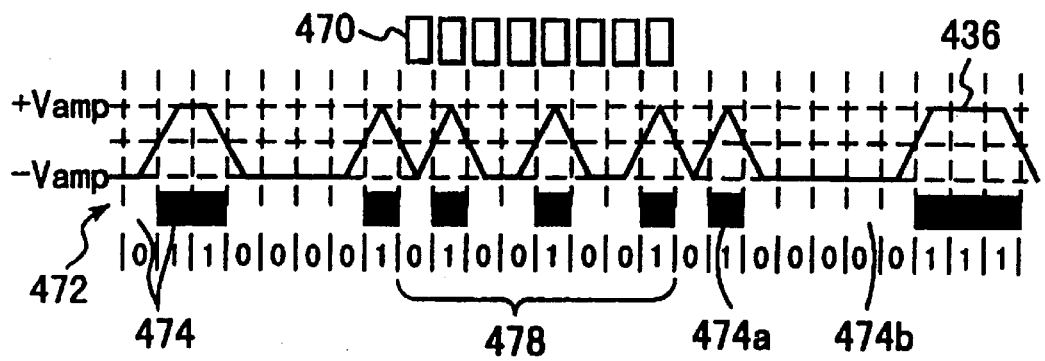
FIG. 31 is a plan view of the portion of the 8-bit code track the eight sensor elements shifted one bit to the right.
Figure 32:
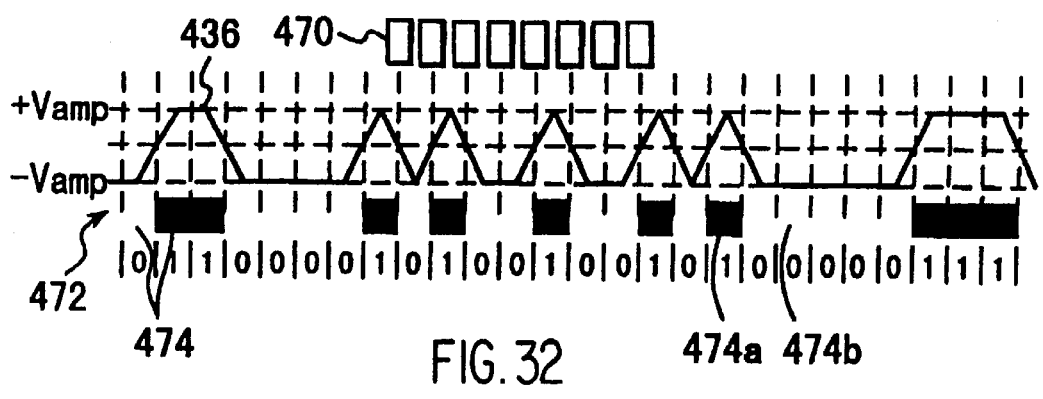
FIG. 32 is a plan view of the portion of the 8-bit code track the eight sensor elements shifted one-half-bit to the right.

FIGS. 30–32 show a portion of an exemplary binary code scale 472, eight balanced pairs 470 and a waveform 436 output by the plurality of balanced pairs 470. The binary code scale contains a plurality of scale elements 474, including a plurality of flux modulators and a plurality of spaces.

In FIGS. 30–32, the arrangement of flux modulators and spaces which create a logical "1" signal in the balanced pairs 470 are shaded and will be referred to as a flux modulator 474a, while the arrangement of flux modulators and spaces which create a logical "0" signal are not shaded and will be referred to as spaces 474b.

Positive voltage amplitudes (peaks) in the waveform 436 correspond to logical "1" values, while negative voltage amplitudes (valleys) in the waveform 436 correspond to logical "0" values. The width of each peak or valley in the waveform 436 corresponds to the number of consecutive logical "1" or "0" values in the waveform 436.

As shown in FIGS. 30–32, the eight balanced pairs 470 simultaneously sense eight bits of a codeword. In FIG. 30, the eight balanced pairs 470 are aligned with the scale elements 474 forming a codeword 476. Thus, the balanced pairs 470 sense the codeword "10100100." As the eight balanced pairs 470 move to the right along the measuring axis 300, the eight balanced pairs 470 are aligned with the scale elements 474 forming a codeword 478. Thus, the balanced pairs 470 sense the next complete codeword "01001001," as shown in FIG. 31.

The inductive absolute position transducer 400 can also interpret a codeword when the eight balanced pairs 470 are not precisely aligned with each scale element 474 in the binary code scale 472. As shown in FIG. 32, the eight balanced pairs 470 are positioned between the two positions shown in FIGS. 30 and 31. That is, the eight balanced pairs are positioned between the codewords 476 and 478. The eight balanced pairs 470 thus output signals corresponding to the codeword "uuu0uu0u," where "u" stands for an undefined or unknown value. That is, "u" indicates that the output signal is between a logical "1" value and a logical "0" value.

As shown in FIG. 32, the center of each balanced pair 470 is aligned with a transition from one scale element 474 to the adjacent scale element 474. Thus, only two of the eight balanced pairs 470 outputs a signal having a strongly defined valley, corresponding to a logical "0" value.

The microprocessor 241, however, nonetheless determine the position of the balanced pairs 470 relative to the scale 472. The microprocessor begins by recognizing that only two or more adjacent scale elements 474 of the same type (i.e., two flux modulators or two spaces) will produce unambiguous logical "1" or logical "0" values, while two adjacent scale elements 474 of different types (i.e., a flux modulator adjacent to a space) will produce an undefined or ambiguous value.

During operation, the microprocessor 241 classifies the amplitude of the signal output from each of the eight balanced pairs 470. Assuming the binary scale transducer 450 is being used to implement the balanced pairs 470, a logical "1" corresponds to a voltage value approximately equal to a positive reference voltage or value, $V_{amp}$, supplied to the A/D converter 246, such as +5V, while the logical "1" value corresponds to a negative reference voltage or value, $-V_{amp}$, supplied to the A/D converter 246, such as −5V. The positive and negative reference voltages are preferably equal to the amplitudes of the strongest positive and negative bit signals of the codeword.

The microprocessor 241 therefore classifies the amplitudes of the code signals output from the balanced pairs 470 as having either a strong or weak logical "0" or "1" value, or undefined. The microprocessor 241 interprets the code signal as a strong "0" when the corresponding balanced pair 470 is aligned with, or nearly aligned with, a space 474b, or positioned between two spaces 474b in the binary code scale 472. The microprocessor 241 interprets the code signal as a weak logical "0" when the corresponding balanced pair 470 is positioned between a space 474b and a flux modulator 474a, but is significantly closer to the space 474b.

The microprocessor 241 interprets the code signal as an undefined logical value when the corresponding balanced pair 470 is positioned nearly equally between a space 474b and a flux modulator 474a. The microprocessor 241 interprets the code signal as a weak logical "1" when the corresponding balanced pair 470 is positioned between a space 474b and a flux modulator 474a, but closer to the flux modulator 474a. The microprocessor 241 interprets the code signal as a strong logical "0" when the corresponding balanced pair 470 is aligned with, or nearly aligned with, a flux modulator 474a or positioned between two flux modulators 474a.

The A/D converter 246 converts the voltage signals output by each balanced pair 470 into a binary value. Based on Table 2, the microprocessor 241 then determines whether a given balanced pair 470 outputs a strong or weak logical "1" or "0" or an undefined logical value. In particular, Table 2 shows an exemplary interpretation of the logical values based on the voltages provided to the A/D converter 246. In particular, $V_{amp}$ is the voltage amplitude of the signals of the balanced pairs 470, i.e., these signals range between $+V_{amp}$ and $-V_{amp}$.

TABLE 2

| | | |
|---|---|---|
| $< -0.6V_{amp}$ | a strong logical "0" | |
| $\geq -0.6V_{amp}$ | a weak logical "0" | $< -0.2_{amp}$ |
| $\geq -0.2V_{amp}$ | undefined | $\leq 0.2V_{amp}$ |
| $>0.2V_{amp}$ | a weak logical "1" | $\leq 0.6V_{amp}$ |
| $>0.6V_{amp}$ | a strong logical "1" | |

Analog comparators, rather than the A/D converter 246, can be used to selectively set the limits between the five logical values shown in Table 1.

Based on the converted code signals output from the A/D converter 246, the microprocessor 241 analyzes each codeword based on the following series of steps. First, the microprocessor 241 determines whether a given code signal from one of the balanced pairs 470 is greater than 0.2 of the signal amplitude ($>0.2V_{amp}$). If so, the signal corresponds to a logical "1." Similarly, in a second step, if the converted code signal is less than −0.2 of the signal amplitude ($<-0.2V_{amp}$), then it is a logical "0." If there are only logical "0" and "1" values in the codeword, then the codeword and subsequently, the absolute position of the read head can be determined without further processing.

However, if one or more of the balanced pairs 470 output a code signal that does not fall in either of these ranges, additional processing is necessary. In this case, the microprocessor 241 more accurately determines the logical values of the code signals output by the eight balanced pairs 470.

Therefore, in a third step, if a given code signal has a value greater than 0.6 of the signal amplitude (i.e., >0.6$V_{amp}$), the microprocessor 241 determines that it is a strong logical "1." This occurs when the corresponding balanced pair 470 is positioned between two flux modulators 474a. Otherwise, if the code signal is less than or equal to 0.6 of the signal amplitude (<0.6$V_{amp}$) and greater than 0.2 of the signal amplitude (>0.2$V_{amp}$), then it is a weak logical "1."

In a fourth step, the microprocessor 241 similarly determines the strong and weak logical "0" values based on Table 2. If the code signal is neither a strong or weak "1" nor a strong or weak "0," then it is classified as "undefined." The weak logical "1" and "0" code signal values are preferably treated as undefined when determining the undefined code signals. However, the weak logical "1" and "0" values provide information about the codeword to which the read head 402 is closer.

Thus, the weak logical "1" and "0" values help the microprocessor 241 determine the intermediate position. In the final step, using the already determined strong logical "0" and "1" values, the microprocessor 241 determines the undefined code signal values. If an undefined or weak value is next to a known logical "1" value, then a logical "0" value must follow, and vice versa.

For example, as shown in FIG. 32, the microprocessor 241 receives the codeword "1uu0u10u" from the A/D converter 246. The two "0"s are defined as strong logical "0" values and the two "1" s are defined as weak logical "1" values. The microprocessor 241 knows that a strong logical "0" value corresponds to two adjacent spaces 474b.

Table 3 shows the sensor elements 0–7, which correspond to the eight balanced pairs shown in FIG. 32. The sensor element bit values shown in Table 3 are determined by the microprocessor 241 based on the code signals output by the balanced pairs 470. The code track bits correspond to the logical values encoded in the binary code scale 472. Because there are undefined sensor element bits, the balanced pairs 470 are not aligned with the binary code scale elements 474. This is indicated by the offset in Table 3.

TABLE 3

| Sensor element # | 7 | 6 | 5 | 4 | 3 | 2 | 1 | 0 |
|---|---|---|---|---|---|---|---|---|
| Sensor element bits | 1 | u | u | 0 | u | 1 | 0 | u |
| Code track bits | | | | | | | | |
| Code track bit # | 8 | 7 | 6 | 5 | 4 | 3 | 2 | 1 | 0 |

The underlined sensor element bit corresponding to sensor element 4 is a strong logical "0" value. Therefore, the microprocessor 216 recognizes that this value corresponds to two adjacent spaces 474b. This can be added to Table 3 as logical "0" values in the code track bit row for code track bits 4 and 5, as shown in Table 4.

TABLE 4

| Sensor element # | 7 | 6 | 5 | 4 | 3 | 2 | 1 | 0 |
|---|---|---|---|---|---|---|---|---|
| Sensor element bits | 1 | u | u | 0 | u | 1 | 0 | u |
| Code track bits | | | | 0 | 0 | | | |
| Code track bit # | 8 | 7 | 6 | 5 | 4 | 3 | 2 | 1 | 0 |

In the same way, logical "0" values can be added in the code track bit row for code track bits 1 and 2, as shown in Table 5.

TABLE 5

| Sensor element # | 7 | 6 | 5 | 4 | 3 | 2 | 1 | 0 |
|---|---|---|---|---|---|---|---|---|
| Sensor element bits | 1 | u | u | 0 | u | 1 | 0 | u |
| Code track bits | | | | 0 | 0 | | 0 | 0 | |
| Code track bit # | 8 | 7 | 6 | 5 | 4 | 3 | 2 | 1 | 0 |

Then, working from the known values for the code track bits 1, 2, 4 and 5, the microprocessor 241 determines the values for the code track bits 0, 3 and 6. The sensor element 0 is undefined and must lie between a code track bit that has a logical "0" value and a code track bit that has a logical "1" value. Because the code track bit 1 is already known to be have a logical "0" value, the code track bit 0 must be have a logical "1" value. Otherwise, if the code track bit 0 had a logical "0" value, the sensor element 0 would have been a strong 0, rather than undefined.

In the same way, the code track bits 3 and 6 are determined to have logical "1" value. Table 6 shows the codeword with the logical values for the code track bits 0, 3 and 6.

TABLE 6

| Sensor element # | 7 | 6 | 5 | 4 | 3 | 2 | 1 | 0 |
|---|---|---|---|---|---|---|---|---|
| Sensor element bits | 1 | u | u | 0 | u | 1 | 0 | u |
| Code track bits | | | 1 | 0 | 0 | 1 | 0 | 0 | 1 |
| Code track bit # | 8 | 7 | 6 | 5 | 4 | 3 | 2 | 1 | 0 |

The logical values for the code track bits 7 and 8 can then be determined. The sensor element 6 is undefined and must therefore be between a code track bit that has a logical "0" value and a code track bit that has a logical "1" value. Because the code track bit 6 has a logical "1" value, the code track bit 7 must have a logical "1" value. Otherwise, if the code track bit 7 had a logical "1" value, the sensor element 6 would have been a strong 1, rather than undefined. Table 7 shows the codeword with the logical value for the code track bit 7.

TABLE 7

| Sensor element # | 7 | 6 | 5 | 4 | 3 | 2 | 1 | 0 |
|---|---|---|---|---|---|---|---|---|
| Sensor element bits | 1 | u | u | 0 | u | 1 | 0 | u |
| Code track bits | | 0 | 1 | 0 | 0 | 1 | 0 | 0 | 1 |
| Code track bit # | 8 | 7 | 6 | 5 | 4 | 3 | 2 | 1 | 0 |

Then, the logical value of the code track bit 8 can be determined from the just determined logical value of the code track bit 7. The sensor element 7 has a weak "1" logical value. Therefore, the sensor element 7 must be positioned between a code track bit that has a logical "0" value and a code track bit that has a logical "1" value. Because the code track bit 7 has a logical "0" value, the code track bit 8 must have a logical "1". Table 8 shows the completely determined codeword.

TABLE 8

| Sensor element # | 7 | 6 | 5 | 4 | 3 | 2 | 1 | 0 |
|---|---|---|---|---|---|---|---|---|
| Sensor element bits | 1 | u | u | 0 | u | 1 | 0 | u |
| Code track bits | 1 | 0 | 1 | 0 | 0 | 1 | 0 | 0 | 1 |
| Code track bit # | 8 | 7 | 6 | 5 | 4 | 3 | 2 | 1 | 0 |

To test the result, the microprocessor 241 checks if all of the weak values correspond to code track bits in the same way. That is, if the sensor element 7 is a logical "1" value as a result of the sensor element 7 being closer to the code track bit 8 than to the code track bit 7 then, similarly, the sensor element 2 should have taken the value of the code track bit 3, rather than the code track bit 2. Testing confirms the above findings.

As a result, the microprocessor 241 determines that the read head 402 is positioned between the codewords 466 and 468, having the binary values "10100100" and "01001001," respectively. The microprocessor further determines that the read head 402 is actually closer to the codeword 466. Rather than using weak "0" and "1" read head bit values to determine within which code word the read head is positioned, the fine scale can be read. When the transducer is moved one fine wavelength $\lambda_F$, the fine phase $\phi_F$ varies $2\pi$ radians. The phase $\phi_F$ is assumed to vary between $-\pi$ and $\pi$ and to go through zero at the boundary between two code words of the code track scale. Where there is a choice between two adjacent code words of the code track scale, a positive fine phase $\phi_F$ means that the transducer position is within the code word with the higher position number and a negative fine phase $\phi_F$ means that the transducer position is within the code word with the lower position number.

This method for determining the undefined values applies not only to the inductive absolute position transducer described herein, but to other transducers, such as optical transducers. Such transducers may provide values centered around positive values, rather than a zero voltage, as described above. Nevertheless, this method for classifying the amplitudes of the signal outputs from the sensor elements of the binary scale transducer into five categories may be similarly used with other transducers.

When the read head 402 is in an intermediate position between code track bits, there are only two codewords that will produce all undefined values. These codewords occur with a string of alternating 0's and 1's, i.e., the codewords "01010101" and "10101010." If the read head 402 is positioned between the scale elements 474 of these codewords, all of outputs will be undefined values between the logical "1" and logical "0" values. However, recognizing that only these two codewords provide such an output, the microprocessor 241 can thus detect and interpret these codewords. Alternatively, the binary code scale 472 can omit these codewords.

As noted above, this invention can be used in encoder applications other than linear encoder applications. As mentioned above, FIGS. 28 and 29 show a fifth preferred embodiment of the inductive absolute position transducer 400 incorporating the fine wavelength transducer 410 and the binary scale transducer 450.

In this fifth preferred embodiment, the inductive absolute position transducer 400 has been adapted for a rotary encoder 500. The rotary encoder 500 includes a stationary portion or stator 502 and a rotating portion or a rotor 504. The transmitter windings 412 and 452, the receiver windings 414 and 416, and the balanced pairs 457 are formed on or attached to the stator 502. The scale 418 and the binary code scale 458 are formed in or attached to the stator 504. The stator 502 can be a small wedge-shaped portion, as shown in FIG. 28.

Alternatively, for higher accuracy and better tolerance from mechanical misalignment, the stator 502 can be formed as an entire disk-shaped member similar to the rotor 504, or can be constructed of several similar wedge-shaped portions symmetrically placed about the circle. The code track uses a continuous 6-bit codeword similar to the 8-bit codeword shown in FIGS. 26 and 27.

A 6-bit codeword provides 64 possible binary numbers. Thus, 64 coarse absolute positions can be measured per revolution. The position within the fine wavelength can be determined with an accuracy of $\frac{1}{512}$ of a wavelength. Also, the scale 418 of the fine wavelength transducer 410 provides 32 complete fine wavelengths per revolution (360°). Therefore, an overall resolution of 32×512 angular counts per revolution, or 16,384 increments per revolution, is obtained.

While the inductive absolute position transducers using the binary code transducers 420, 440 or 450 have advantages over the inductive absolute position transducers using the transducers 210–230 shown in FIG. 7, a sixth preferred embodiment of the inductive absolute position transducer of this invention, as shown in FIGS. 33–37 has certain additional benefits.

A disadvantage of the first preferred embodiment of the absolute position transducer of this invention is that it is very sensitive to movement occurring when readings from two scales are made for the medium or coarse position measurements. A small error made in the reading of one of the fine wavelength transducers 210, 220 or 230 causes a much greater error in the calculation of the medium or coarse positions. The error has a factor that is equal to the ratio of $\lambda_M/\lambda_F$ or $\lambda_C/\lambda_F$. Therefore, a movement of only 80 $\mu$m during measurements between the fine wavelength transducers 220 and 230 will cause an error of about 1.28 mm in the medium position measurement.

An error of about 1.28 mm is approximately equal to one-half of the fine wavelength $\lambda_1$ or $\lambda_3$. Because the medium position measurement determines within which particular fine wavelength the read head 202 of the inductive absolute position transducer is located, an error of one-half the fine wavelength $\lambda_1$ or $\lambda_3$ is unacceptable. For a measurement error of approximately 160 $\mu$m between two fine wavelengths, the calculated coarse position measurement could be off by as much as one-half of a medium wavelength.

Figure 33:
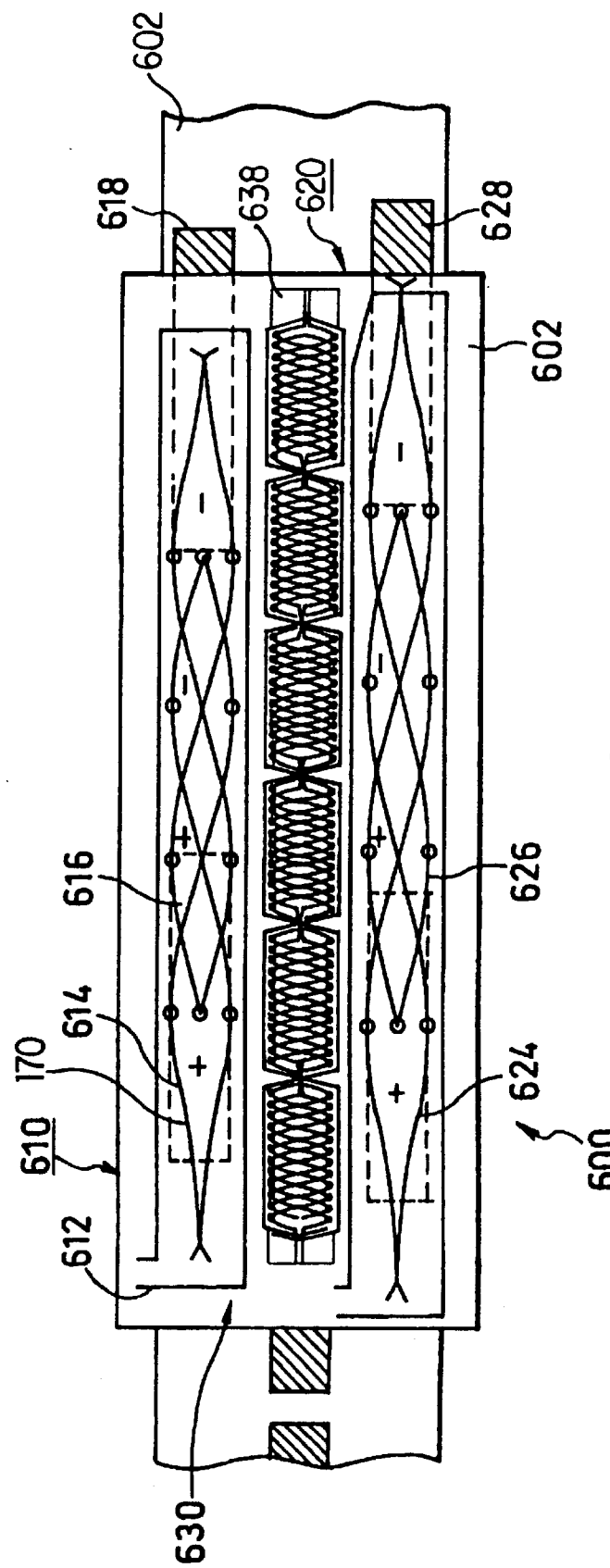
FIG. 33 is a plan view of a sixth preferred embodiment of the inductive absolute position transducer of this invention with three sets of transmitter and receiver windings and portions of three scales.

To avoid the movement error intolerance between two fine scale wavelengths of the first preferred embodiment, the sixth preferred embodiment of the inductive absolute position transducer 600, as shown in FIG. 33, uses a medium wavelength transducer 610 having a medium wavelength $\lambda_{M1}$ of 40.96 mm, instead of deriving the medium wavelength from the interaction of two fine wavelength transducers, as in the first preferred embodiment.

As a result, the medium wavelength transducer 610 has a scale 612 where each flux modulator 170 has a length approximately equal to one-half of the medium wavelength, or 20.48 mm. The read head 602 of the inductive absolute position transducer 600 has a receiver winding 614 and a receiver winding 616 of the medium wavelength transducer 610 formed on it. The receiver winding 614 has a single elongated "+" loop 191a and a single elongated "−" 191b. Similarly, the receiver winding 616 has a single elongated "+" loop 192a and a single elongated "−" 192b.

Since the medium position measurements are taken directly from the medium wavelength transducer 610, rather than from two fine wavelength transducers, the above-described movement error is practically eliminated. To provide a coarse position measurement, the inductive absolute position transducer 600 has a second medium wavelength transducer 620. The second medium wavelength transducer 620 has a medium wavelength $\lambda_{M2}$ of 35.84 mm. A phase difference between $\lambda_{M1}$ and $\lambda_{M2}$ provides a coarse wavelength of 286.72 mm. The wavelengths are preferably different integer multiples of a base wavelength, and are more preferably even integer multiples, for the reasons outlined below. The preferred wavelengths used in the inductive absolute position transducer 600 have the relationship: $\lambda_{M1}=$ 16*$\lambda_3$ and $\lambda_{M2}$=14*$\lambda_3$, where $\lambda_3$=2.56 mm, as outlined above in the first preferred embodiment.

The inductive absolute position transducer 600 avoids the error between measurements of two fine wavelengths that can occur during medium and coarse calculations in the inductive absolute position transducer 200. Since the two wavelengths $\lambda_{M1}$ and $\lambda_{M2}$ used to produce the coarse position measurement are about 15 times larger than the fine wavelength $\lambda_3$, the spatial phase position calculations are 15 times less sensitive to movement.

For example, to create a movement error of about one-half of the medium wavelength $\lambda_{M1}$, the coarse position measurement must be off by about 20 mm. This corresponds to an error of approximately 2.7 mm between the two medium wavelength transducers 610 and 620. An error of 2.7 mm is considerably easier to prevent than the 160 $\mu$m error discussed above. As a result, the inductive absolute position transducer 600 is approximately 20 times less sensitive to movement between the two wavelengths that determine the coarse position measurement.

The inductive absolute position transducer 600 also includes a fine wavelength transducer 630, using the fine wavelength $\lambda_3$, positioned between the medium wavelength transducers 610 and 620. To minimize electromagnetic and parasitic coupling between the fine wavelength transducer 630 and the medium wavelength transducers 610 and 620, the length of the flux modulators 170 in the medium scales 618 and 628 are equal to an integer multiple of a full fine wavelength. This minimizes the influence the medium wavelength transducers 610 and 620 have on the fine wavelength transducer 630.

Any coupling between the medium wavelength transducers 610 and 620 and the fine wavelength transducer 630 is minimized because the ends of the flux modulators in the medium wavelength scales 618 and 628 are always aligned with a given fine wavelength in the fine scale 638 of the fine wavelength transducer 630. When the scales 618, 628 and 638 move relative to the read head 602, any increase in coupling between the transmitter and receiver windings in the fine wavelength transducer 630 at one end, caused by a flux modulator of one of the medium scales 618 or 628, is counteracted by a decrease in coupling at the other end. Because of the symmetry between the receiver windings 614 and 616, or 624 and 626, any total parasitic coupling between the fine and medium wavelength transducers 610 620 and 630 should be close to 0.

Figure 34:
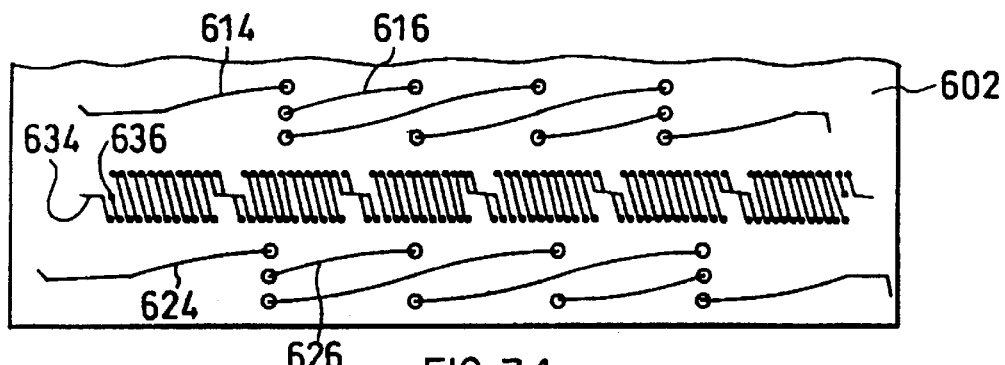
FIG. 34 is a plan view of the read head of FIG. 33, showing a first half of the conductor of the receiver windings on a first layer.
Figure 35:
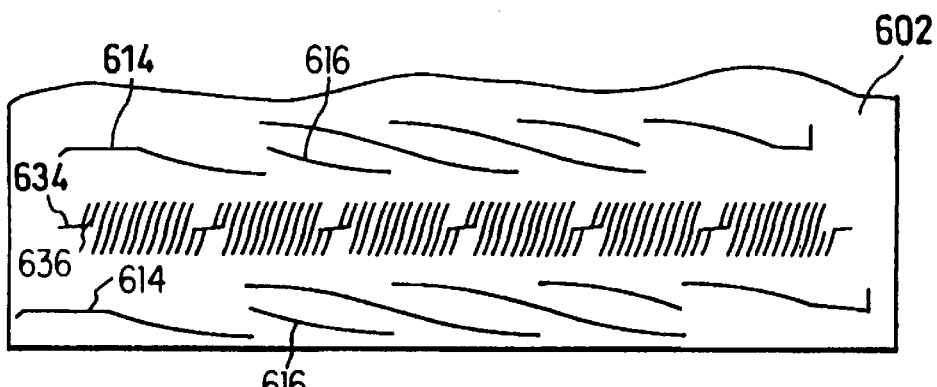
FIG. 35 is a plan view of the read head of FIG. 33, showing a second half of the conductor of the receiver windings on a second layer.

To further reduce electromagnetic coupling, the read head 602 is preferably formed as shown in FIGS. 34–37. Each of FIGS. 34–37 shows a different layer or side of the read head 602 of FIG. 33. As shown in FIGS. 34 and 35, portions of each of the receiver windings 614 and 616, 624 and 626, and 634 and 636 are formed on two layers, or on opposite sides, of the substrate 606 of the read head 602. Together, the portions form the receiver windings 614 and 616, 624 and 626, and 634 and 636 shown in FIG. 33.

Figure 36:
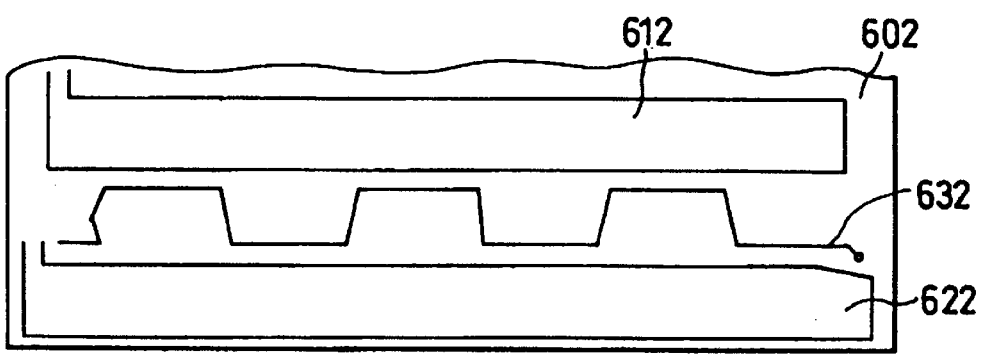
FIG. 36 is a plan view of the read head of FIG. 33, showing a first portion of the conductor of the transmitter windings on a first layer.
Figure 37:
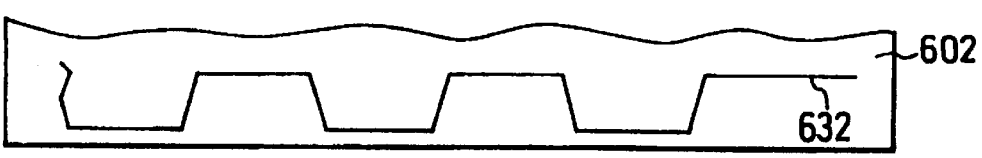
FIG. 37 is a plan view of the read head of FIG. 33, showing a second portion of the conductor of the transmitter windings on a second layer.

Similarly, FIGS. 36 and 37 show different portions of the transmitter windings 612, 622 and 632 shown in FIG. 33. The transmitter windings 612 and 622 of the medium wavelength transducers 610 and 620 are formed on one side of the substrate 606. In contrast, the transmitter winding 632 of the fine wavelength transducer 630 is formed as two portions on opposite sides of the substrate 606. As in the first preferred embodiment, the two wavelengths that are closest to each other are placed the furthest distance apart. That is, the medium wavelength transducers 610 and 620 are separated by the fine wavelength transducer 630.

The receiver windings 634 and 636 of the fine wavelength transducer 630 are reversed every 3.5 fine wavelengths. The transmitter winding 632 of the fine wavelength transducer 630 is similarly reversed every 3.5 fine wavelengths. Reversing the transmitter/receiver windings 632, 634 and 636 in the fine wavelength transducer 630 reduces the influence from the medium scales on the receiver output signal and on the resulting fine position calculation. In general, the transmitter and receiver windings 612, 614 and 616 can be reversed every z/2 fine wavelengths, where z is an odd integer.

Additionally, the flux modulators of the two medium wavelength scales 618 and 628 have a length of approximately 7 times the fine wavelength $\lambda_3$. Because the medium wavelength $\lambda_{M2}$ is substantially equal to an integer multiple of the fine "reversal" wavelength, any stray magnetic fields from the transmitter winding 632 of the fine wavelength transducer 630 are neutralized in the receiver windings 624 and 626 of the medium wavelength transducer 620, and vice versa. In general, if the fine reversal wavelength is (z*$\lambda_F$)/2, then the medium wavelength $\lambda_{M3}$ or $\lambda_{M2}$ should be an even multiple of the fine wavelength $\lambda_F$.

The flux modulators of the scale 618 of the medium wavelength transducer 610 do not have a length exactly equal to one-half of the medium wavelength $\lambda_{M1}$. Although the medium wavelength $\lambda_{M1}$ for the medium wavelength transducer 610 is not exactly equal to an integer multiple of the fine "reversal" wavelength, there is still substantial reduction in the parasitic coupling between the transducers in the sixth preferred embodiment of the inductive absolute position transducer 600 compared to the first preferred embodiment of the inductive absolute position transducer 200. The medium wavelength transducer 610 will still produce a continuous signal. However, there may be errors in deviation from a clean sinusoidal output curve. Such small errors are not significant enough to affect the medium wavelength calculations.

The medium wavelength transducer 610 must be accurate enough to identify within which fine wavelength $\lambda_3$ the read head 602 is positioned. If the medium wavelength transducer 610 fails to provide sufficient accuracy, then the other medium wavelength transducer 610 can be used as the "primary" medium wavelength transducer.

In the second-fifth preferred embodiments, the binary code scale and the fine wavelength scale are preferably placed as closely together as possible to save total scale width. The inventors have determined that the distance between the fine wavelength transducer and the binary scale transducer should be at least 0.6$\lambda_{FINE}$, where $\lambda_{FINE}$ is the wavelength of the fine wavelength transducer. At this distance, the binary scale transducer has a negligible effect on the fine wavelength transducer.

However, if the binary code scale is placed too close to the fine wavelength scale, it will disturb the fine wavelength measurement. This occurs because the fine transmitter field is modulated not only by the fine wavelength scale member but also, to a small extent, by the binary code scale elements. This extra modulation of the transmitter field introduces an error in the fine wavelength measurement. To avoid this error, the binary code scale can be moved away from the fine wavelength scale. However, this has the undesired effect of increasing both the total scale width and the width of the read head.

Figure 38:
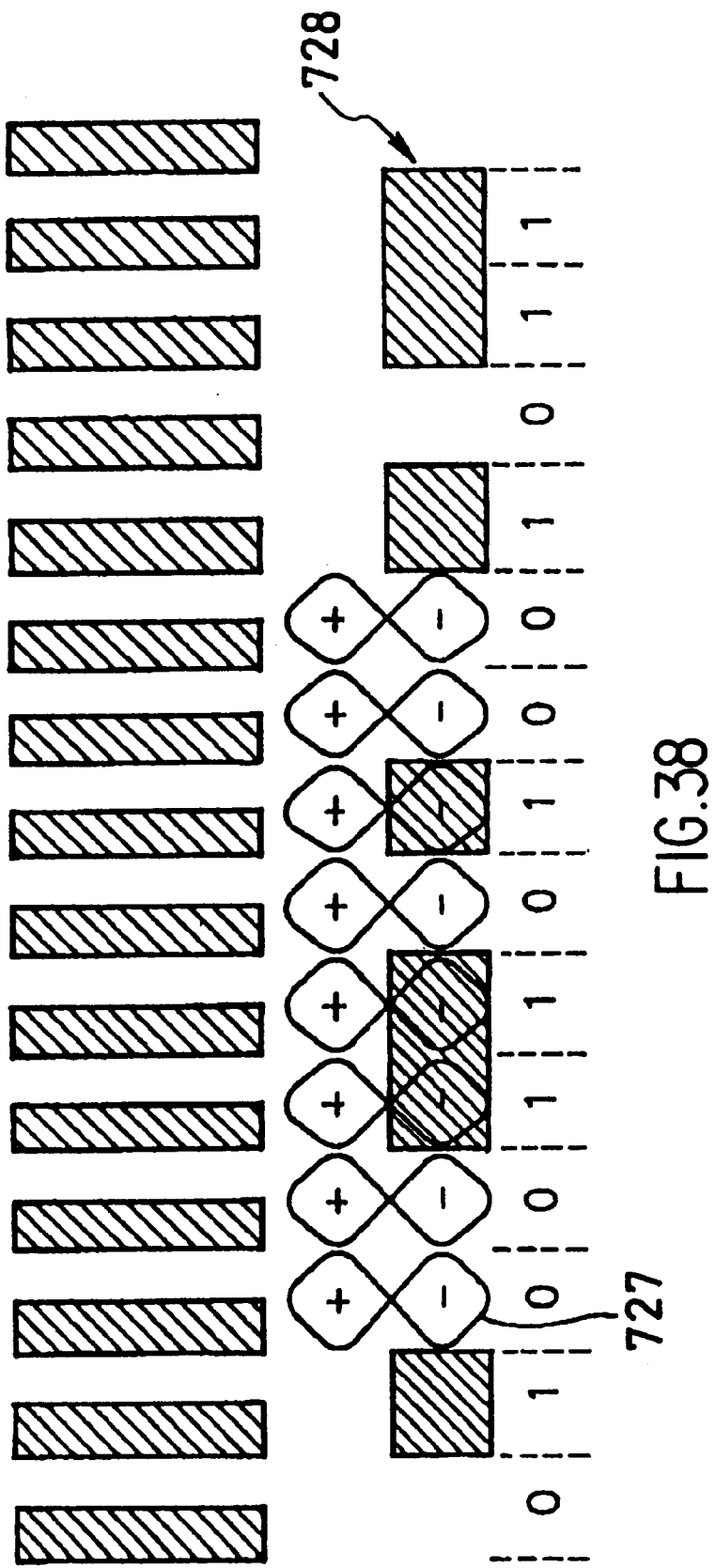
FIG. 38 is a plan view of a code track of a seventh preferred embodiment of the inductive absolute position transducer of this invention.

One method for separating the binary code scale from the fine wavelength scale without having to increase the total scale width or the width of the read head is shown in the seventh preferred embodiment of the inductive absolute position transducer shown in FIG. 38. As shown in FIG. 38, the top row of the binary code scale 458 shown in FIG. 23 is deleted, so that the binary code scale 728 has only a single row of scale elements. The zeros and ones below the binary code scale indicate the binary values associated with the scale elements.

To decode this single row binary code scale, the scale words need to be arranged so that there are at least two "1"s in a row within every 8-bit codeword. This ensures that there is at least one strong "1" in the code signals output from the balanced pairs 727 should the balanced pairs happen to be positioned between two code words, as in the example shown in FIG. 32.

In a more preferred binary code scale 728, each codeword contains at least two "1"s and two "0"s in a row. This ensures that each codeword has both at least one strong "1" and one strong "0." Thus, for each codeword, it is then always possible to measure the signal offset of the codeword bits and their signal amplitude. This makes reading the binary code scale 728 more robust because the binary code scale 728 is self calibrating regarding signal offset and signal amplitude.

That is, at each position, the code signal offset $S_{Off}$ and the code signal amplitude $S_{AMP}$ are measured. The code signal offset $S_{Off}$ is defined as the minimum of all code signals output from the balanced pairs 727. The code signal amplitude $S_{AMP}$ is defined as the maximum of code signals $S_{MAX}$ output by the balanced pairs 727 less the minimum of all code signals $S_{MIN}$ output from the balanced pairs 727. That is:

$$S_{AMP}=(S_{MAX}-S_{MIN}).$$

The code signal offset SOFF is then subtracted from each code signal $S_x$ and the result is divided by the code signal amplitude $S_{AMP}$ to get normalized code signal values $S_N$ for each of the balanced pairs 727. That is:

$$S_{Nx}=(S_x-S_{OFF})/S_{AMP}.$$

Thus, the normalized signal values $S_N$ vary between 0 and 1. The normalized code signal values $S_N$ are sorted into, for example, five categories generally corresponding to the categories shown in Table 2:

Strong 0: $0.0 \leq S_N < 0.2$;
Weak 0: $0.2 \leq S_N < 0.4$;
Undefined $0.4 \leq S_N \leq 0.6$;
Weak 1: $0.6 < S_N \leq 0.8$;
Strong 1: $0.8 < S_N \leq 1.0$.

The coarse position is then decoded as outlined above relative to Tables 3–8. This method can be used also for the binary code scales that use two rows, as in the second-fifth embodiments shown in FIGS. 16–26, as well as for serial code tracks in general absolute position transducers, such as optical code tracks of optical transducers.

The classification of the bit signals, as described above, is preferably performed by a microprocessor after analog to digital conversion of the code signals. Finding the code signal offset and code signal amplitude can also be done before analog to digital conversion. The code signal amplitude can then be used as the reference voltage to the A/D converter. This automatically normalized the output of the A/D converter. Thus, the microprocessor does not need to perform the time consuming division of the code signals by the code signal amplitude.

Figure 39:
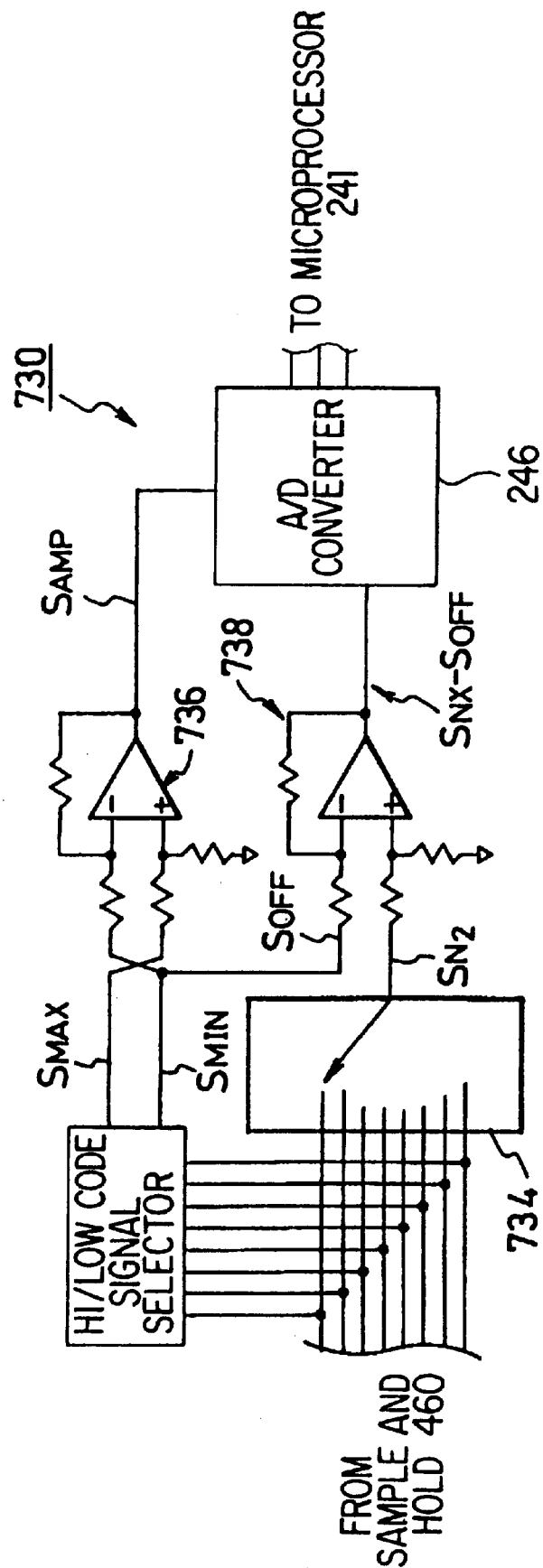
FIG. 39 is a block diagram of an analog signal processing circuit.

FIG. 39 shows a preferred embodiment of the analog signal processing circuit 730 for obtaining a normalized digital output from the A/D converter 246 shown in FIG. 24. As shown in FIG. 39, the outputs of each of the buffer amplifiers 462 of the sample and hold circuit 460 shown in FIG. 24 are connected to both a high/low code signal selector 732 and to a code signal selector switch 734. The high/low code signal selector 732 selects the code signals having the highest and lowest signal amplitudes.

These highest and lowest signal amplitudes are input from the high/low code signal selector 732 to a differential amplifier 736. In particular, the highest amplitude code signal is input to the non-inverting input of the differential amplifier 736. The lowest amplitude code signal is input to the inverting input of the differential amplifier 736. The differential amplifier outputs the amplitude difference between the highest and lowest amplitude code signals. The code signal amplitude difference is used as the reference voltage for the A/D converter 246. This normalizes the digital values for the code signal output from the A/D converter 246 between 0 and 1.

The code signal selector switch 734 selects and outputs the code signals to the A/D converter 246 one at a time through a subtracting circuit 738. In particular, the output from the code signal selector switch 734 is connected to the non-inverting input of the operational amplifier of the subtracting circuit 738. The lowest amplitude code signal is input to the inverting input of the operational amplifier of the subtracting circuit 738. The output of the subtracting circuit is input to the A/D converter 246. The subtracting circuit subtracts the lowest amplitude code signal from the current code signal before the current code signal is input to the A/D converter 246.

Figure 40:
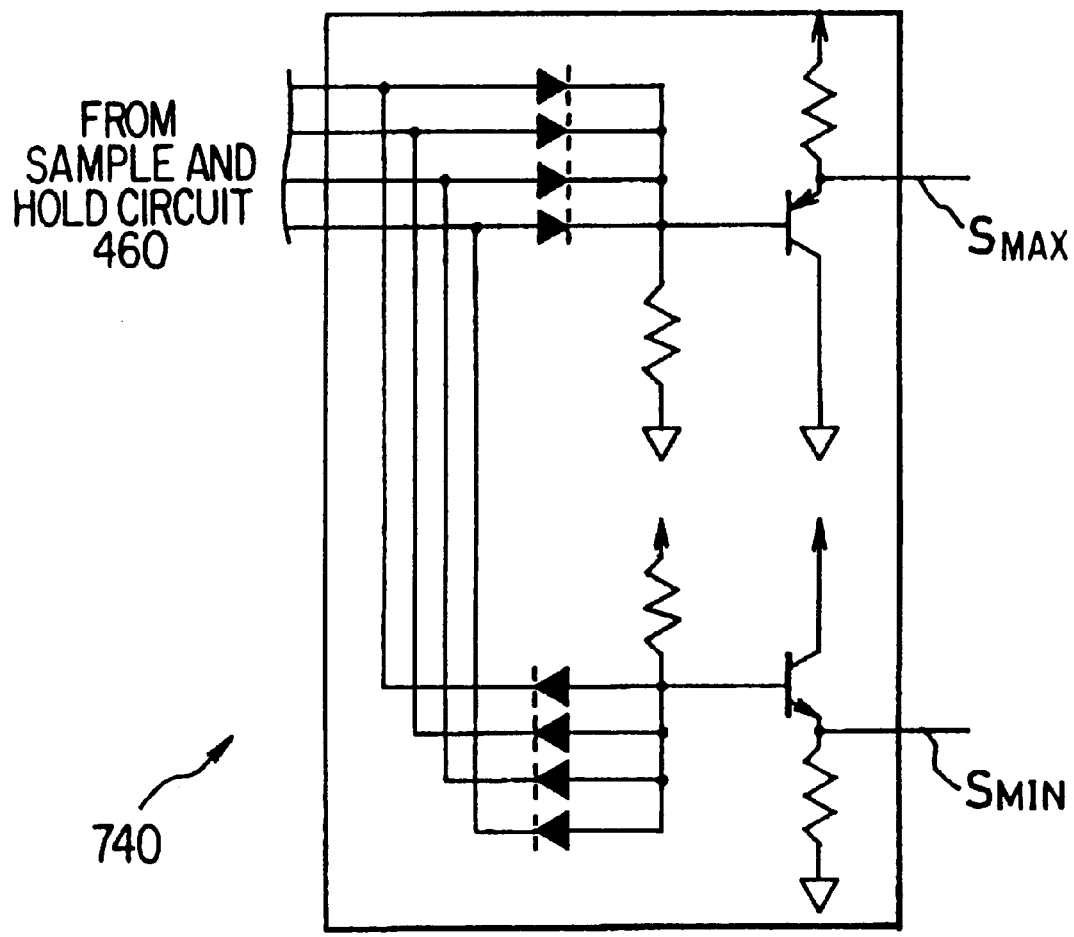
FIG. 40 is a circuit diagram of an analog high/low signal amplitude determining circuit.

FIG. 40 shows an exemplary circuit 740 for the high/low bit signal selector circuit 732. This circuit is used to determine the high and low signals for four signal inputs. It should be appreciated that this circuit 740 can be expanded for any number of signals.

The various binary code scales have been discussed above with a constant number of bits in the codewords. Table 9 shows the number of available codewords for the different design rules and for different numbers of bits per codeword.

TABLE 9

| Number of bits/ codeword | Full Range | Two "0"s or Two "1"s in a row | Two "1"s in a row | Two "0"s and Two "1"s in a row |
|---|---|---|---|---|
| 6 | 64 | 62 | 46 | 30 |
| 7 | 128 | 128 | 99 | 70 |
| 8 | 256 | 254 | 209 | 164 |
| 9 | 512 | 512 | 436 | 360 |
| 10 | 1024 | 1022 | 901 | 780 |
| 11 | 2048 | 2048 | 1849 | 1650 |
| 12 | 4096 | 4094 | 3774 | 3454 |

Table 10 shows the available range, assuming a scale wavelength of 3.2 mm, for the different design rules and the different number of bits per codeword used in Table 9.

TABLE 10

| Number of bits/ codeword | Full Range | Two "0"s or Two "1"s in a row | Two "1"s in a row | Two "0"s and Two "1"s in a row |
|---|---|---|---|---|
| 6 | 205 | 198 | 147 | 96 |
| 7 | 410 | 410 | 317 | 224 |
| 8 | 819 | 813 | 669 | 525 |
| 9 | 1638 | 1638 | 1395 | 1152 |
| 10 | 3277 | 3270 | 2883 | 2496 |

TABLE 10-continued

| Number of bits/ codeword | Full Range | Two "0"s or Two "1"s in a row | Two "1"s in a row | Two "0"s and Two "1"s in a row |
|---|---|---|---|---|
| 11 | 6554 | 6554 | 5917 | 5280 |
| 12 | 13107 | 13101 | 12077 | 11053 |

As discussed above, when reading the binary code scale, some of the balanced pairs may output signals which are ambiguous or undefined. This occurs when the read head is positioned between the scale elements, rather than being aligned with the scale elements. This problem is overcome in the methods described above with respect to Tables 2–10 by ensuring that at least one of the balanced pairs is able to output an unambiguous code signal. However, this places fairly stringent requirements on the code signals and the signal processing circuits regarding amplitude matching and offset matching of the code signals.

Figure 41:
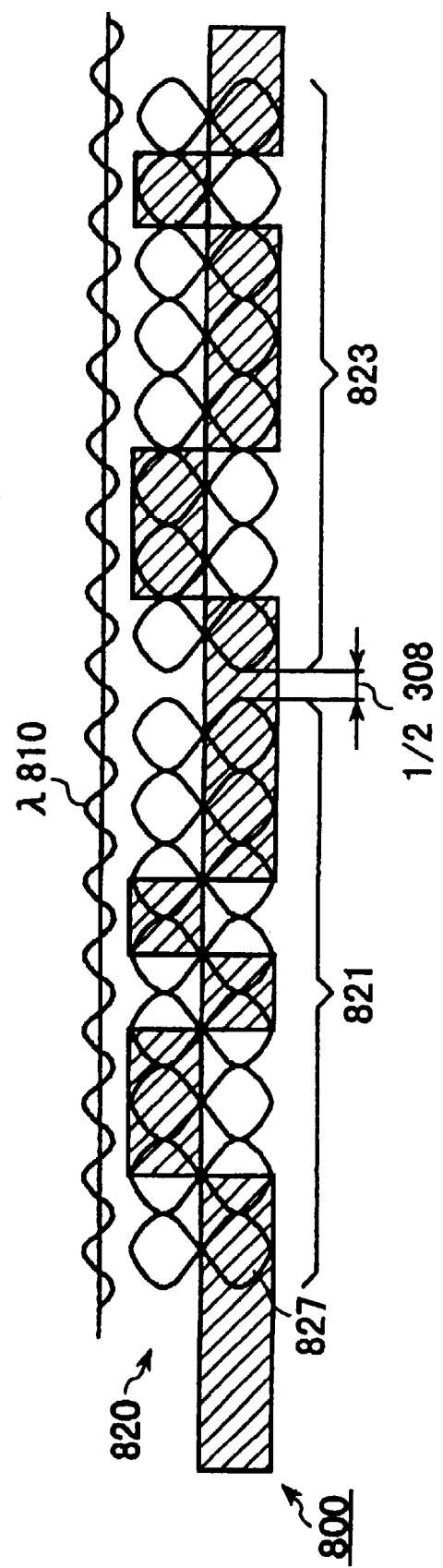
FIG. 41 is a plan view of a code track of an eighth preferred embodiment of the inductive absolute position transducer of this invention.

FIG. 41 shows an eighth preferred embodiment of the inductive absolute position transducer of this invention. In this eighth preferred embodiment, the binary scale transducer 820 has a first set 821 of balanced pairs 827 and a second set 823 of balanced pairs 827. In particular, the first set 821 and the second set 823 are offset by one-half of the edge-to-edge distance 308 or an odd numbered multiple of the edge-to-edge distance 308.

Thus, if one of the sets 821 or 823 is positioned between the scale elements 174, the other sets 821 or 823 will be aligned with the scale elements 174. Thus, while one of the groups 821 or 823 will have undefined code signals, the other group 821 or 823 will have all of its code signals properly defined.

Furthermore, the fine wavelength transducer 810 can be used to determine which one of the sets 821 or 823 should be used. The fine wavelength is assumed to be equal to the edge-to-edge distance 308. Thus, when the voltage amplitude of one of the receiver windings is positive, a first one of the sets 821 or 823 should be used. In contrast, when the amplitude of that receiver winding is negative, the other one of the sets 821 or 823 should be used.

One drawback to the eighth preferred embodiment of the inductive absolute position transducer of this invention is that the read head must be twice as long. This additional space is needed both for the second set of balanced pairs and for the additional connections needed to the electronic signal processing circuit. However, the majority of the additional space is required by the second set of balanced pairs.

Figure 42:
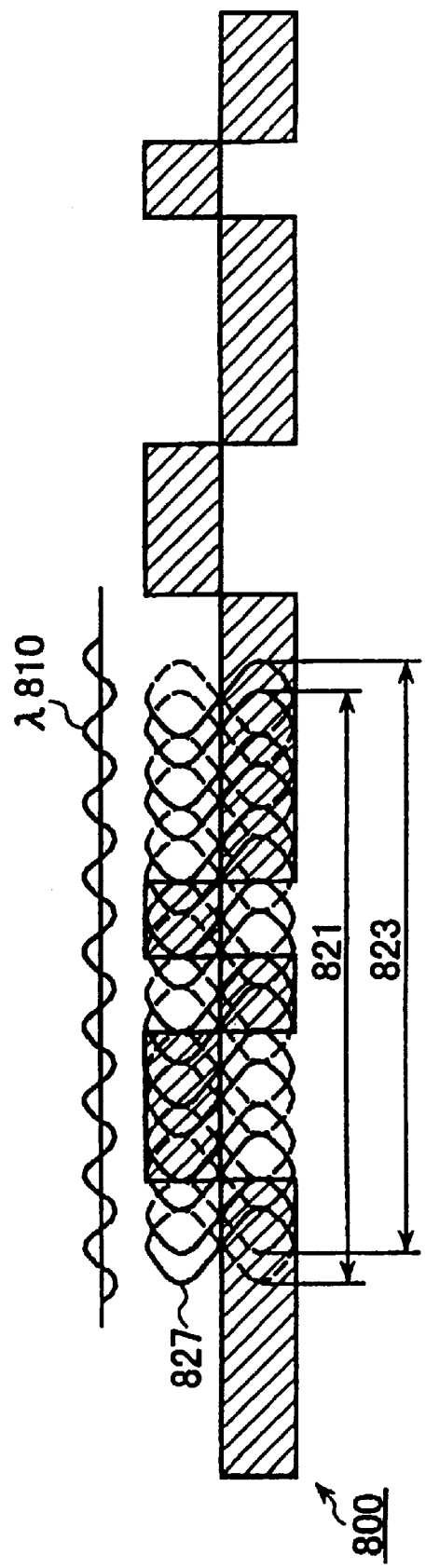
FIG. 42 is a plan view of a variation of the code track of the eighth preferred embodiment of the inductive absolute position transducer of this invention.

This disadvantage can be offset to a significant degree by interleaving together the two sets of balanced pairs, as shown in FIG. 42. The two sets of balanced pairs remain offset by one-half of the edge-to-edge distance. However, only a small amount of additional space is now required. This alternative to the eighth preferred embodiment of the inductive absolute position transducer of this invention instead requires that the first and second sets of balanced pairs are distributed on both sides of a thin insulating layer. That is, these sets of balanced pairs are interleaved in the same way that the receiver windings are interleaved, as described above.

Furthermore, this alternative is not limited to just two sets of balanced pairs. Rather, any number of sets of balanced pairs can be used. In this case, for n number of sets of balanced pair, the sets will be offset by the edge-to-edge distance 308 divided by the number n. Thus, for four sets of balanced pairs, the sets will be offset by one-fourth of the edge-to-edge distance 308. In this case, the proper set of balanced pair will be selected based on the quadrant indicated by the two receiver windings which are in quadrature.

Figure 43:
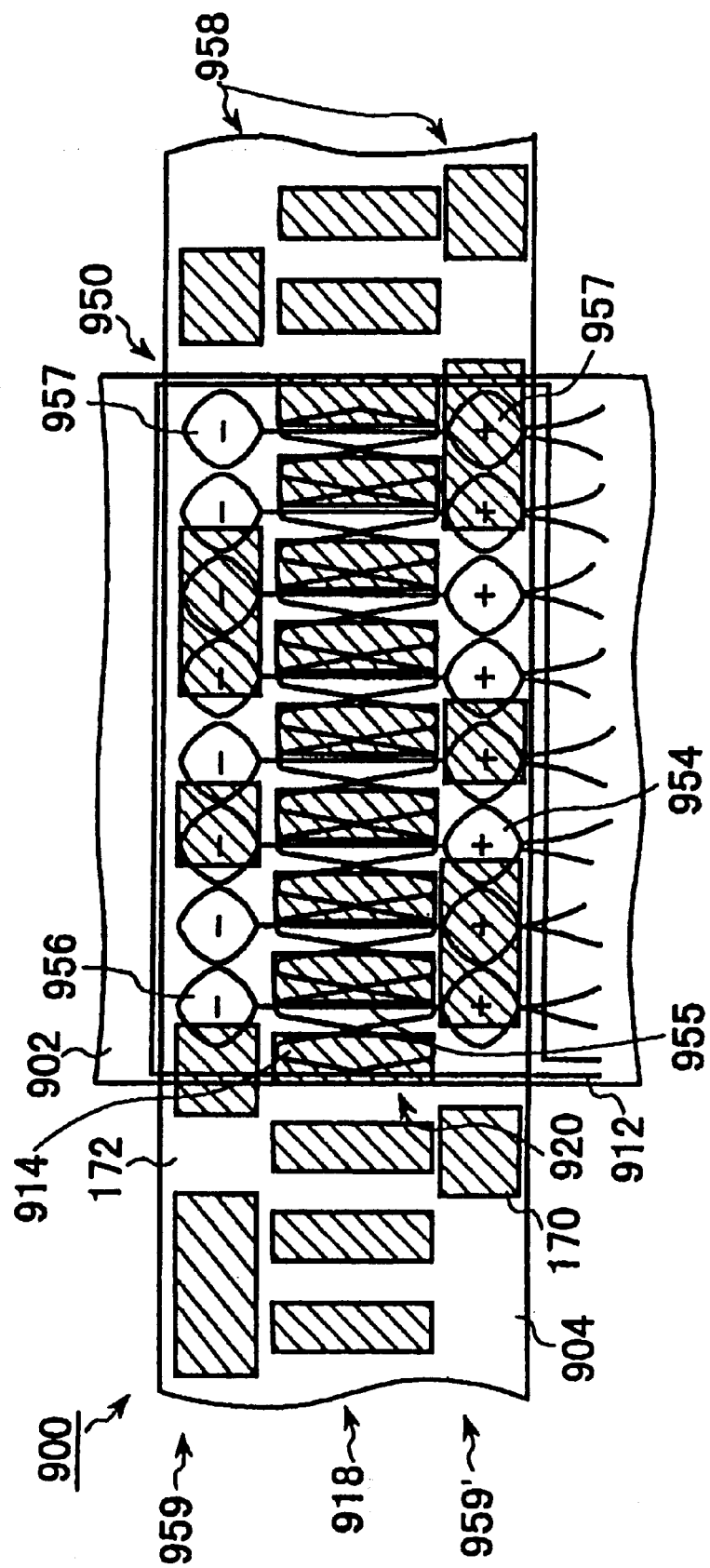
FIG. 43 shows a ninth preferred embodiment of the inductive absolute position transducer of this invention.

FIG. 43 shows a ninth preferred embodiment of the inductive absolute position transducer of this invention. In particular, the inductive absolute position transducer shown in FIG. 43 is a modification of the fourth preferred embodiment of the inductive absolute position transducer showing in FIGS. 21–23. As shown in FIG. 43, the binary code transducer 950 brackets the fine wavelength transducer 920. That is, in each of the eight balanced pairs 957 of the binary code transducer 950 formed on the read head 902, the negative polarity windings 956 are positioned on one side of the fine wavelength transducer 920, while the positive polarity windings 954 are positioned on the other side of the fine wavelength transducer 920. The negative polarity winding 956 and the positive polarity winding 954 of each balanced pair 957 are connected by a long pair of parallel connecting wires 955.

Similarly, the upper and lower portions 959 and 9591 of the binary code scale 958 bracket the fine wavelength scale 918 on the scale member 904. Finally, a single transmitter winding 912 is formed on the read head 902. The single transmitter winding 912 completely encircles both the transmitter winding 914 of the fine scale transducer 920 and the positive polarity loops 954 and the negative polarity loops 956 of each of the eight balanced pairs 957 of the binary code transducer 950.

Compared to the fourth preferred embodiment, in the inductive absolute position transducer 900 of this ninth preferred embodiment, the binary code transducer 950 can be more closely positioned relative to the fine wavelength transducer 920 without disturbing the fine wavelength measurement. This saves space in the read head 902, and thus saves space in the overall inductive absolute position 900. In addition, since only one transmitter winding 912 is required, the drive circuitry can be simplified. Eliminating one transmitter winding and simplifying the drive circuitry saves additional space.

Finally, because a single transmitter winding 912 can be used, the fine wavelength transducer 920 and the binary code transducer 950 can be driven and sampled simultaneously. Thus, compared to the fourth preferred embodiment, there is no time lag between the fine wavelength measurement and the binary code measurement. This increases the accuracy of the inductive absolute position transducer 900 compared to the fourth preferred embodiment of the inductive absolute position transducer shown in FIGS. 21–23.

FIGS. 44 and 45 show a tenth preferred embodiment of the inductive position transducer of this invention. In particular, FIGS. 44 and 45 show only a schematic view of a scale 1058 and a number of balanced pairs 1057 of the inductive position transducer 1000. It should be appreciated that this tenth preferred embodiment of the inductive position transducer can use the same structure for the transmitter and receiver windings as in any of the previous embodiments of the binary code transducer.

However, the scale 1058 is not a binary code scale. Rather, the scale 1058 is an incremental scale. That is, in the inductive position transducer 1000, while the scale 1058 extends along the measuring access 300, each of the individual receiver windings formed by the balanced pairs 1057 extend perpendicular to the measuring axis. This is in contrast to all of the previous fine and medium wavelength transducers, which have the receiver windings extending in a direction parallel to the measuring axis 300.

As the balanced pairs 1057 move along the measuring axis 300, each of the balanced pairs outputs a maximum positive-amplitude incremental position signal when the negative polarity loops 1056 are aligned with the flux disrupters 170 and the positive polarity loops are aligned with the spaces 172. Each of the balanced pairs outputs a maximum negative output amplitude signal when the positive polarity loops 1054 are aligned with the flux disrupters 170 and the negative polarity loops 1056 are aligned with the spaces 172.

Thus, the tenth preferred embodiment of the position transducer 1000 shown in FIGS. 44 and 45 can be used in place of the fine wavelength transducer shown in each of the first-ninth embodiments of this invention. For example, the three fine wavelengths inductive incremental position transducers 210, 220 and 230 can each be replaced by an incremental inductive position transducer 1000 having a corresponding wavelength.

It should be appreciated that the flux modulators 170, which can either be flux disrupters or flux enhancers, and the spaces 172 of the scale 1058 have identically shaped elements positioned alternately in a "0" position and a "1" position. The balanced pairs 1057 of the read head of the incremental inductive position transducer 1000 are connected in series, so that the winding directions have the positive and negative polarities shown in FIGS. 44 and 45.

It should be appreciated that the embodiment shown in FIG. 44 is extremely sensitive to non-symmetrical field distributions in the direction perpendicular to the measuring axis 300. Thus, if the field distribution is not symmetrical about the center line 301 of the scale 1058, the output signal will have an offset that causes a measurement error.

In contrast, the embodiment shown in FIG. 45 does not have this problem. In the embodiment shown in FIG. 45, the receiver windings are again connected in series, so that the winding directions have the alternating positive and negative polarities shown in FIG. 45. Furthermore, each pair 1059 of adjacent balanced loop pairs 1057 lie within a single wavelength 1 of the scale 1058. Each pair 1059 of adjacent balanced loop pairs 1057 is thus balanced relative to any non-symmetrical field distributions both along the measuring axis 300 and perpendicular to the measuring axis 300. Therefore, the offset in the output signal is nominally zero.

Furthermore, the offset in the output signal will generally not vary with pitch or roll misalignments. This is true even when the scale 1058 is mounted on a conductive scale base. It should also be appreciated that the signal amplitude of the embodiment shown in FIG. 45 is twice the signal amplitude of the embodiment shown in FIG. 44.

It should also be appreciated that in each of FIGS. 43–45, while only a signal receiver winding or set of receiver windings of the fine scale transducers 920 and 1000 is shown, and only a single set of balanced pairs 957 of the binary code transducer 950 is shown, two or more fine scale receiver windings can be used, as shown in the first-eighth embodiments. Furthermore, as shown in the eighth embodiment, two or more sets of balanced pairs can be used in the binary code transducer 950.

FIGS. 46A–46C show an eleventh preferred embodiment of the inductive absolute position transducer of this invention. In particular, as shown in FIG. 46A, the fine wavelength transducer 1120 and the binary code transducer 1150, rather than being side by side, as in the second-fifth and seventh-ninth embodiments, are superimposed over each other. Thus, the binary scale 1158 of the binary code transducer 1150 is used both as the binary code scale and the fine wavelength scale. As in the ninth preferred embodiment, the inductive absolute position transducer 1100 allows a single transmitter winding 1120 to be used to drive both the fine wavelength receiver winding 1114 and each of the balanced pairs 1157 of the binary code transducer 1150.

FIGS. 46B and 46C show the fine wavelength receiver winding 114 and the balanced pairs 1157, respectively, separately from each other to more easily see the relationship between these windings and the binary code scale 1158. In particular, as shown in FIGS. 46A–46C, the widths of the flux modulators 170 and the spaces 172 extending along the measuring axis 300 are one-half the fine wavelength $\lambda_F$. In contrast, the width of the windings of the balanced pairs 1157 extending along the measuring axis 300 is approximately equal to the fine wavelength $\lambda_F$. Similarly, the wavelength of the fine scale receiver winding 1114 is also approximately equal to the fine wavelength $\lambda_F$.

Thus, when the positive polarity loops of the fine wavelength transducer 1120 are aligned with the flux modulators 170, the negative polarity loops of the fine wavelength transducer 1120 are aligned with the unmodulated gaps 173 between the flux modulators 170, and vise versa. In contrast, in the binary code transducer 1150, when the negative polarity loops 1156, for example, are aligned with the flux modulators 170 or the spaces 172, the positive polarity loops 1154 are aligned with the other of the spaces 172 or the flux modulators 170.

In this manner, the fine wavelength transducer 1120 is able to output a continuous spatially modulated inductive coupling that is further modulated by the flux modulators 170 and the spaces 172. However, the signal amplitude range of this embodiment, compared to the other embodiments, is reduced by approximately one-half. At the same time, the binary scale transducer 1150 is able to output signal amplitudes corresponding to strong 1's to strong 0's. However, the signal amplitude range of this embodiment is again approximately one-half that of the other embodiments of the binary code transducer.

Since only one transmitter winding 1112 is required, the drive circuitry is again simplified, and the fine wavelength transducer 1120 and the binary code transducer 1150 can be driven and sampled simultaneously. Furthermore, since the two transducers are superimposed, significant amounts of additional space are saved, even compared to the ninth preferred embodiment described above. It should also be appreciated that, while FIGS. 46A–46C show only a single fine wavelength receiver winding 114 and a single set of balanced pairs 1157, multiple fine wavelength receiver windings 1114 and multiple sets of the balanced pairs 1157 can be used, as described in the first and eighth embodiments.

FIGS. 47A–47C show a twelfth preferred embodiment 1200 of the inductive absolute position transducer. The twelfth preferred embodiment shown in FIGS. 47A–47C generally corresponds to the eleventh preferred embodiment shown in FIGS. 46A–46C. However, rather than using a single binary code scale for both the fine wavelength transducer and the binary scale transducer, as shown in FIGS. 46A–46C, in the twelfth preferred embodiment the binary code scale 1258 is also superimposed over a fine wavelength scale 1228. Otherwise, the twelfth preferred embodiment shown in FIGS. 47A–47C is generally identical to the eleventh preferred embodiment shown in FIGS. 46A–46C. Thus, no further description of this twelfth preferred embodiment is provided.

FIGS. 48A–48D show a thirteenth preferred embodiment of the inductive absolute position transducer of this invention. In general, the thirteenth preferred embodiment is identical to the twelfth preferred embodiment shown in FIGS. 47A–47C. However, as shown in FIGS. 48A and 48C, the flux modulators 170 and spaces 172 of the binary code scale 1258, as shown in FIG. 47C, are replaced with a winding 1374 which forms enclosed areas 1370 and unenclosed areas 1372. The enclosed areas 1370 correspond to the flux modulators 170, while the unenclosed areas 1372 correspond to the spaces 172. In all other respects, the thirteenth preferred embodiment shown in FIGS. 48A–48C is identical to the twelfth preferred embodiment shown in FIGS. 47A–47C.

FIG. 48D shows a variation of the thirteenth preferred embodiment, wherein each of the flux modulators 170 of the fine wavelength scale 1328 of the fine wavelength transducer 1320 is replaced with a single independent loop winding 1376. Otherwise, this variation of the thirteenth preferred embodiment shown in FIG. 48D is identical to the thirteenth preferred embodiment shown in FIGS. 48A–48C.

While the preferred embodiments of this invention are generally described as using the inductive transducer of this invention, the binary code transducers can be implemented using any known transducer configuration, such as an optical encoder. With an optical encoder, the flux modulators 170 will instead be reflectors having a reflectance different than that of the spaces between the reflectors. The reflectors thus represent the logical "1" values, while the spaces represent the logical "0" values. The read head would include a photodetector that senses one bit at a time as either a logical "1" or "0" value, depending upon its reflectance. Additionally, while this invention preferably uses the binary code transducer with a fine wavelength transducer, the absolute position transducer of this invention can simply use the binary code transducer alone, without using the fine linear encoder. However, the position measurements will be less accurate.

As explained above, this invention provides an inductive absolute position transducer capable of providing high accuracy position signals and which can be inexpensively produced using present printed circuit board manufacturing technology. This invention is insensitive to contamination by particles, including ferromagnetic particles, as well as oil, water and other fluids. As a result, the transducer of the present invention can be used in most shop and other outdoor environments. This invention does not require sophisticated or costly seals to prevent contamination from entering the transducer.

A fairly large gap, up to 2 mm between the elements and the read head, can be used for the incremental transducer, while still providing acceptable receiver output signals and high accuracy. Furthermore, the binary code transducer can tolerate an even greater gap. Consequently, precise manufacturing tolerances are not critical in this inductive absolute position transducer. Therefore, it may be manufactured more inexpensively than other types of absolute position transducers.

The read head in this invention may be formed within a thin zone that has a height substantially less than the width or length of the zone. As a result, this invention can be adapted to many applications as it requires substantially less volume than conventional absolute position transducers. The receiver windings of the transducers of this invention are not driven by active electronics, and are therefore passive. The receiver windings simply generate an EMF at their output. This EMF is analyzed by an appropriate analyzing circuit to measure the displacement of the read head along the measuring axis with respect to the scale.

The scales and code tracks of this invention are also passive. Therefore, they do not need to be electrically coupled to the active portion, i.e., the transmitter winding of the read head. As a result, the absolute position transducer of this invention can be more easily incorporated into handheld measurement tools than other inductive-type encoders. This invention also provides a low-power driving circuit that further enables the inductive absolute position transducer of this invention to be readily incorporated in battery-powered hand-held tools. The inductive absolute position transducer of this invention provides a unique, or absolute, position over the longest wavelength or the longest distance allowable for a given length codeword. As a result, the inductive absolute position transducer of this invention can be powered down or turned off and then turned on again and still provide the same position measurement.

Those skilled in the art will recognize that the above-described invention provides an absolute position inductive transducer that may be incorporated into various applications. Although specific embodiments of, and examples for, this invention have been described for purposes of illustration, various equivalent modifications can be made without departing from the spirit and scope of this invention. For example, while sinusoidal receiver windings and balanced pairs are shown and described, various other geometries are possible, including different geometries for different phases in a given read head. Similarly, while generally rectangular flux modulators are shown and described herein, other geometries can be used. Should these geometries lead to non-sinusoidal functions of signal out versus displacement, then the actual function can be modeled in a lookup table, or by other means known to those skilled in the art. Thus, the position calculating equations described herein can be modified or replaced according to well-known signal processing techniques.

In addition to the various sensor elements described above, this invention can also use sensor elements having only a single loop coupled to a threshold detection circuit to sense the flux modulators in the binary code scale. In this case, the flux modulators have a length equal to the edge-to-edge distance. Therefore, the single loop receiver will provide a strong signal. Although this invention is generally described above as using two or more transmitter windings, a single transmitter winding can be used that substantially encloses all of the receiver windings and all of the sensor elements.

Furthermore, although a binary code track has been described as a preferred embodiment, where each code track receiver winding provides one bit of a binary codeword, those skilled in the art will recognize that higher resolution measurements can be taken from each code track receiver winding. In this case, the size of each flux modulator may be selected from a set of various sizes. Thus, each codeword element corresponding to a code track receiver winding may indicate one of three or more states. Those skilled in the art will also recognize that while "balanced" windings are preferred for the code track receiver windings, simple unbalanced loops will also suffice under many circumstances.

Accordingly, this invention is not limited by the disclosure. Rather, its scope is to be determined entirely by reference to the following claims.

What is claimed is:

1. A method for determining an absolute position of a first member relative to a second member in an inductive position transducer, comprising:

taking a coded first-resolution absolute position measurement between the first and second members at a first resolution, comprising:

inputting a set of n adjacent code element measurements, each code element measurement responsive to at least one of a plurality of flux modulating code elements positioned along the measuring axis of one of the first and second members, converting each of the n code element measurements into an output value, combining the n output values into a multi-bit codeword, and determining the first-resolution absolute position measurement from the multi-bit codeword.

2. The method of claim 1, further comprising:

taking a second-resolution incremental position measurement between the first and second members at a second resolution; and determining a second-resolution absolute position measurement between the first and second members from the first-resolution absolute position measurement and the second-resolution incremental position measurement;

wherein the first resolution is coarser than the second resolution.

3. The method of claim 2, wherein the second-resolution incremental position measurement taking step comprises:

determining a phase $\phi_F$ of the second resolution incremental position measurement, and determining the second-resolution incremental position measurement from the phase $\phi_F$ and an incremental scale wavelength $\lambda_F$ of the scale electrodes.

4. The method of claim 1, wherein, within any set of n adjacent code element measurements, at least two adjacent flux modulating code elements are identical to each other, such that at least one of the n code elements measurements produces an extreme measurement value independently of the relative positions of the first and second members along the measuring axis.

5. The method of claim 4, wherein the step of converting each of the n code elements includes adjusting at least one conversion limit for converting the n code elements using the extreme measurement value.

6. The method of claim 1, wherein, within any set of n adjacent code element measurements, at least two adjacent flux modulating code elements are identical to each other such that at least one of the n code elements measurements produces a maximum extreme measurement value independently of the relative positions of the first and second members along the measuring axis and at least two adjacent flux modulating code elements are identical to each other such that at least one of the n code elements measurements produces a minimum extreme measurement value independently of the relative positions of the first and second members along the measuring axis.

7. The method of claim 6, wherein the step of converting each of the n code elements includes adjusting conversion limits for converting the n code elements using the minimum and maximum extreme measurement values.

8. The method of claim 1, wherein the step of converting each of the n code elements includes:

identifying code elements measurements having an unambiguous output value, identifying a position within the set of n code element measurements for each code element measurement having an unambiguous output value, and determining an output value for each code element measurement that does not have an unambiguous output value based on the output values of the code element measurements having unambiguous output values and the identified positions within the set of n code element measurements for each code element measurement having an unambiguous output value.

9. The method of claim 1, wherein taking the coded first-resolution absolute position measurement further comprises inductively sensing a plurality of code elements positioned along the measuring axis.

10. The method of claim 1, wherein taking the coded first-resolution absolute position measurement further comprises independently sensing a plurality of code elements positioned along the measuring axis.

11. The method of claim 1, wherein taking the coded first-resolution absolute position measurement further comprises:

generating a magnetic field; and spatially modifying the magnetic field.

12. The method of claim 11, wherein taking the coded first-resolution absolute position measurement further comprises sensing a strength of each of at least one portion of the spatially modified magnetic field.

13. The method of claim 12, wherein taking the coded first-resolution absolute position measurement further comprises:

outputting a first voltage signal if the strength of the spatially modified magnetic field has a first pattern; and outputting a second voltage signal if the strength of the spatially modified magnetic field has a second pattern.

14. The method of claim 11, wherein taking the coded first-resolution absolute position measurement further comprises independently sensing the strength of at least one portion of the spatially modified magnetic field.

15. The method of claim 14, wherein taking the coded first-resolution absolute position measurement further comprises:

outputting a first voltage signal if the strength of the spatially modified magnetic field has a first pattern; and outputting a second voltage signal if the strength of the spatially modified magnetic field has a second pattern.

* * * * *